US011334356B2

(12) United States Patent
Chen et al.

(10) Patent No.: US 11,334,356 B2
(45) Date of Patent: May 17, 2022

(54) APPARATUSES, METHODS, AND SYSTEMS FOR A USER DEFINED FORMATTING INSTRUCTION TO CONFIGURE MULTICAST BENES NETWORK CIRCUITRY

(71) Applicant: Intel Corporation, Santa Clara, CA (US)

(72) Inventors: Jian-Guo Chen, Basking Ridge, NJ (US); David T. Dougherty, Allentown, PA (US); Steven Pinault, Allentown, PA (US); Parakalan Venkataraghavan, Bangalore (IN); Joseph Williams, Holmdel, NJ (US); Meng-Lin Yu, Morganville, NJ (US); Kamran Azadet, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/457,994

(22) Filed: Jun. 29, 2019

(65) Prior Publication Data

US 2020/0409701 A1    Dec. 31, 2020

(51) Int. Cl.
*G06F 9/30*     (2018.01)
*H04L 49/25*    (2022.01)
*H04L 49/201*   (2022.01)
*G06F 9/54*     (2006.01)

(52) U.S. Cl.
CPC ........ *G06F 9/3016* (2013.01); *G06F 9/30003* (2013.01); *G06F 9/542* (2013.01); *H04L 49/201* (2013.01); *H04L 49/25* (2013.01)

(58) Field of Classification Search
CPC .... G06F 9/3016; G06F 9/30003; G06F 9/542; G06F 9/3001; G06F 9/30032; G06F 9/30036; H04L 49/25; H04L 49/201
See application file for complete search history.

(56) References Cited

U.S. PATENT DOCUMENTS 5,276,516 A * 1/1994 Bramley ............... H04N 5/211
                                        348/614
9,621,130 B2   4/2017 Venkataraghavan et al.
                        (Continued)

OTHER PUBLICATIONS

Hilewitz Y., et al., "A New Basis for Shifters in General-Purpose Processors for Existing and Advanced Bit Manipulations," IEEE Transactions on Computers, vol. 58, No. 8, Aug. 2009, Downloaded from https://ieeexplore.ieee.org/stamp/stamp.jsp?tp=&arnumber= 4721365, pp. 1035-1048.

(Continued)

*Primary Examiner* — Farley Abad
(74) *Attorney, Agent, or Firm* — Nicholson De Vos Webster & Elliott LLP

(57) ABSTRACT

Systems, methods, and apparatuses relating to a user defined formatting instruction to configure multicast Benes network circuitry are described. In one embodiment, a processor includes a decoder to decode a single instruction into a decoded single instruction, the single instruction having fields that identify packed input data, packed control data, and a packed data destination; and an execution unit to execute the decoded single instruction to: send the packed control data to respective control inputs of a circuit that comprises an inverse butterfly circuit coupled in series to a butterfly circuit, wherein the inverse butterfly circuit comprises a first plurality of stages of multicast switches and the butterfly circuit comprises a second plurality of stages of multicast switches, read, once from storage separate from the circuit, each element of the packed input data as respective inputs of the circuit, route the packed input data through the circuit according to the packed control data, and store resultant packed data from the circuit into the packed data destination.

21 Claims, 31 Drawing Sheets

(56) References Cited

U.S. PATENT DOCUMENTS

| | | | | |
|---|---|---|---|---|
| 10,459,723 | B2 * | 10/2019 | Mahurin | G06F 9/30032 |
| 2002/0031220 | A1 * | 3/2002 | Lee | G06F 9/30032 380/37 |
| 2005/0065990 | A1 * | 3/2005 | Allen | G06F 9/45504 708/495 |
| 2014/0201502 | A1 * | 7/2014 | Ould-Ahmed-Vall | G06F 9/30018 712/221 |

OTHER PUBLICATIONS

Hilewitz Y., et al., "Fast Bit Gather, Bit Scatter and Bit Permutation Instructions for Commodity Microprocessors," Journal of Signal Processing Systems, vol. 53, issue 1-2: Springer New York, Nov. 2008, Downloaded from https://rd.springer.com/article/10.1007/s11265-008-0212-8, pp. 145-169.

Lawrie D.H., "Access and Alignment of Data in an Array Processor," IEEE Transactions on Computers. vol. C-24, No. 12, Dec. 1975, Downloaded from https://ieeexplore.ieee.org/stamp/stamp.jsp?tp=&arnumber=1672750, pp. 1145-1155.

Lee T.T., "Nonblocking Copy Networks for Multicast Packet Switching," IEEE, Proceedings of 1988 International Zurich Seminar on Digital Communications, retrieved from https://ieeexplore.ieee.org/stamp/stamp.jsp?tp=&arnumber=4709, vol. 6 (9), Dec. 1988, pp. 221-229.

Shi Z., et al., "Arbitrary Bit Permutations in One or Two Cycles," Proceedings of IEEE 14th International Conference on Application-Specific Systems, Architectures and Processors, Jun. 2003, 11 Pages.

\* cited by examiner

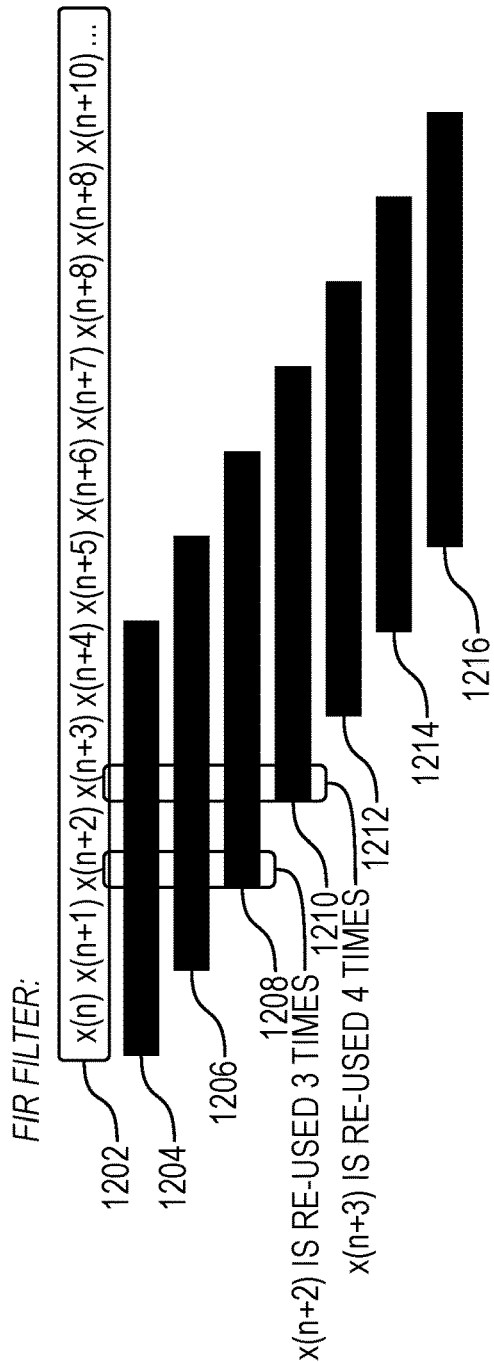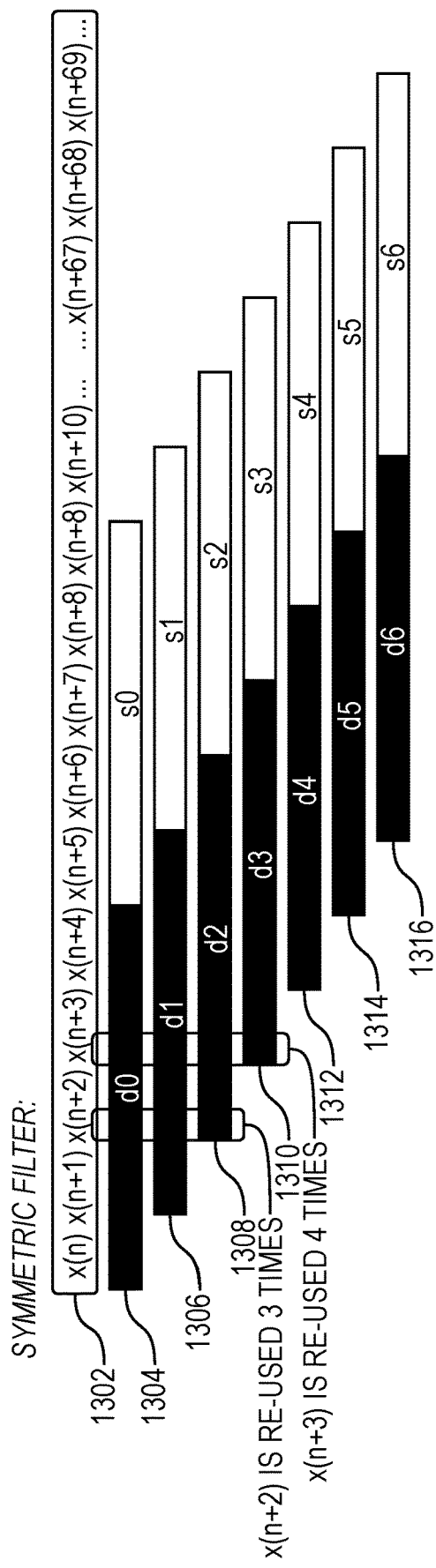

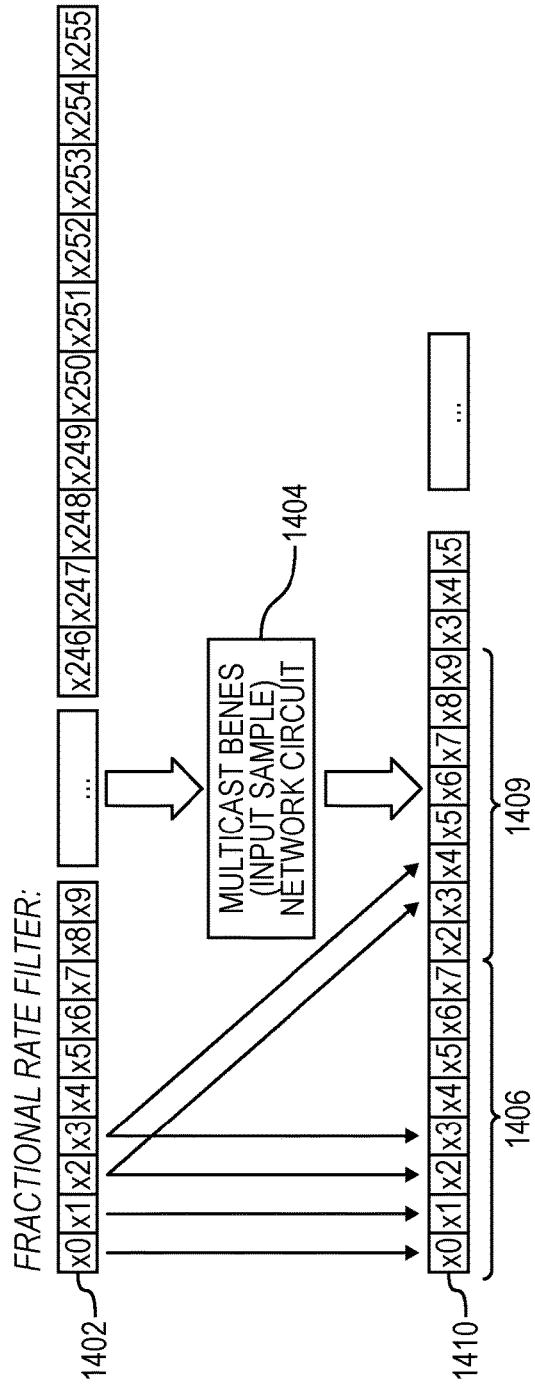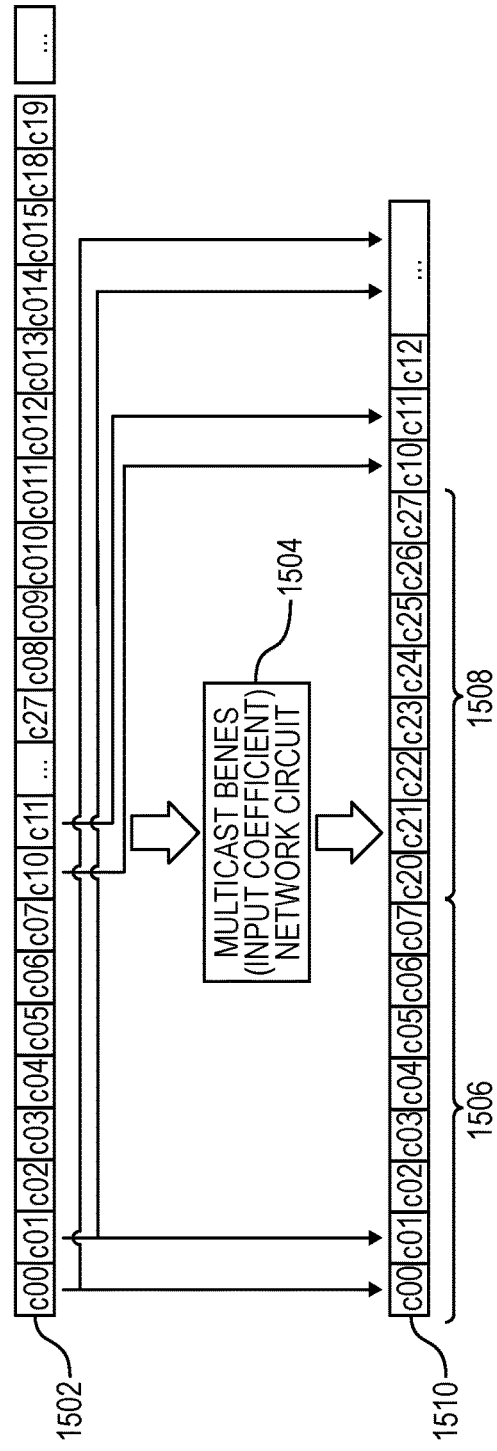

$y0 = c0*x0+c1*x1+c2*x3+c3*x4+c4*x6+c5*x8+c6*x13+c7*x15$
$y1 = c0*x1+c1*x2+c2*x4+c3*x5+c4*x7+c5*x9+c6*x14+c7*x16$

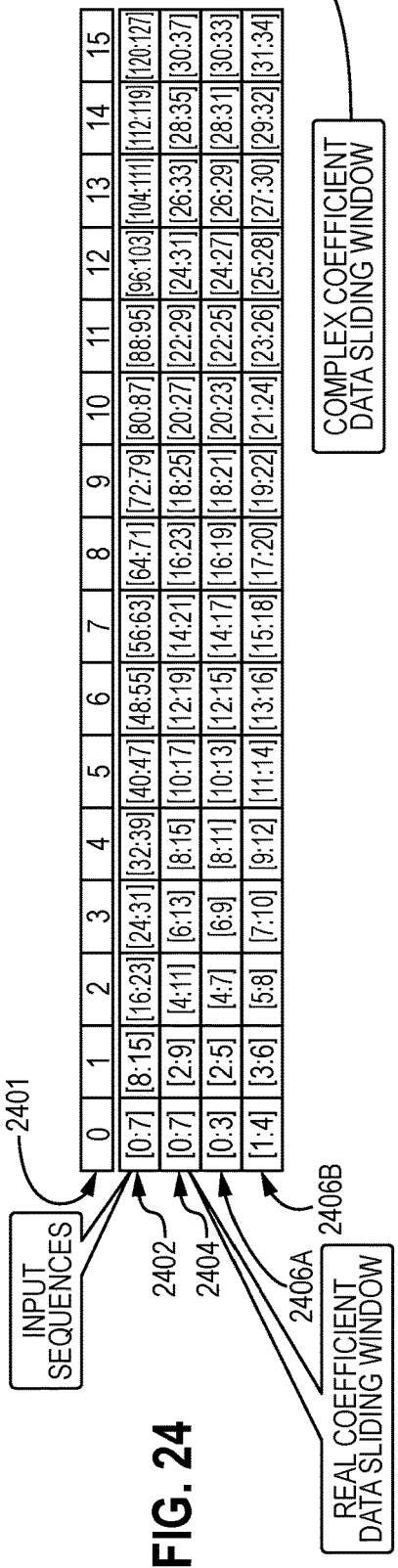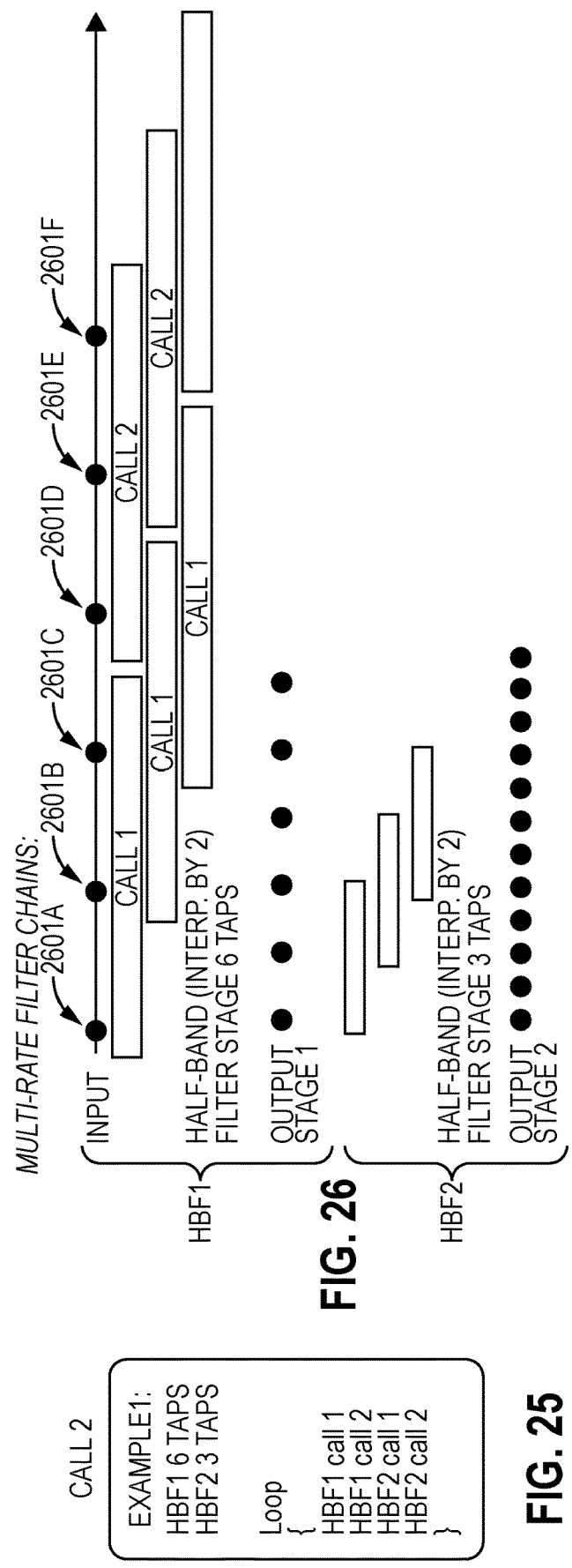

| | COARSE OFFSET = 0 | | | | | | | |
|---|---|---|---|---|---|---|---|---|
| INPUT VECTOR | 0 | 1 | 2 | 3 | 4 | 5 | 6 | 7 |
| STAGE 0 OUTPUT | 0 | 1 | 2 | 3 | 0 | 1 | 2 | 3 |
| STAGE 1 OUTPUT | 0 | 1 | 0 | 1 | 0 | 1 | 0 | 1 |

FIG. 28

| | COARSE OFFSET = 2 | | | | | | | |
|---|---|---|---|---|---|---|---|---|
| INPUT VECTOR | 0 | 1 | 2 | 3 | 4 | 5 | 6 | 7 |
| STAGE 0 OUTPUT | 0 | 1 | 2 | 3 | 0 | 1 | 2 | 3 |
| STAGE 1 OUTPUT | 2 | 3 | 2 | 3 | 2 | 3 | 2 | 3 |

FIG. 29

| | COARSE OFFSET = 1 | | | | | | | |
|---|---|---|---|---|---|---|---|---|
| INPUT VECTOR | 0 | 1 | 2 | 3 | 4 | 5 | 6 | 7 |
| STAGE 0 OUTPUT | 0 | 1 | 2 | 3 | 0 | 1 | 2 | 3 |
| STAGE 1 OUTPUT | 2 | 1 | 2 | 1 | 2 | 1 | 2 | 1 |

FIG. 30

| | COARSE OFFSET = 3 | | | | | | | |
|---|---|---|---|---|---|---|---|---|
| INPUT VECTOR | 0 | 1 | 2 | 3 | 4 | 5 | 6 | 7 |
| STAGE 0 OUTPUT | 4 | 1 | 2 | 3 | 4 | 1 | 2 | 3 |
| STAGE 1 OUTPUT | 4 | 3 | 4 | 3 | 4 | 3 | 4 | 3 |

FIG. 31

FIG. 32 COARSE SELECT = 2  FINE SELECT = 3, 7

FIG. 33 COARSE SELECT = 1  FINE SELECT = 3, 7

FIG. 34 COARSE SELECT = 2  FINE SELECT = 7, 3

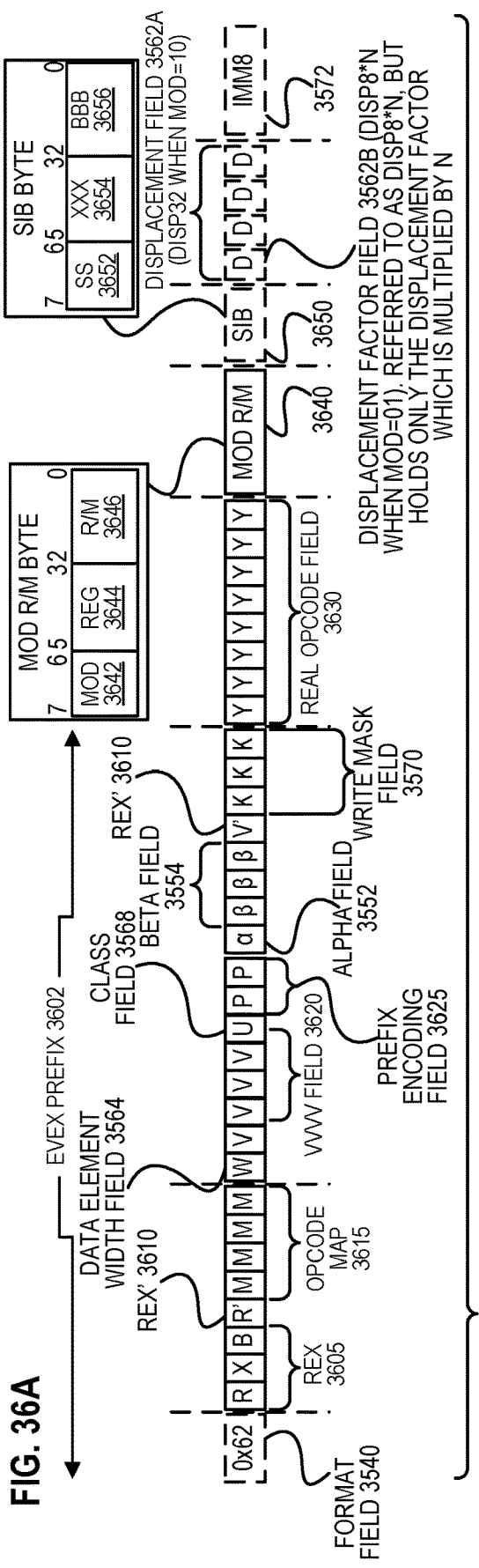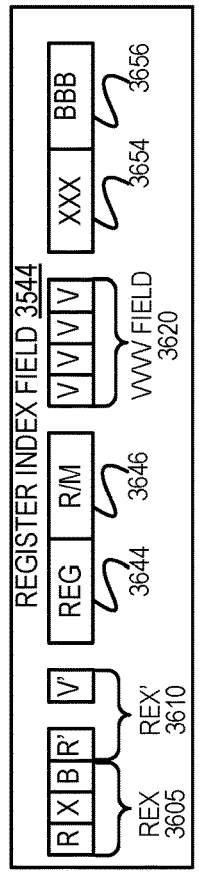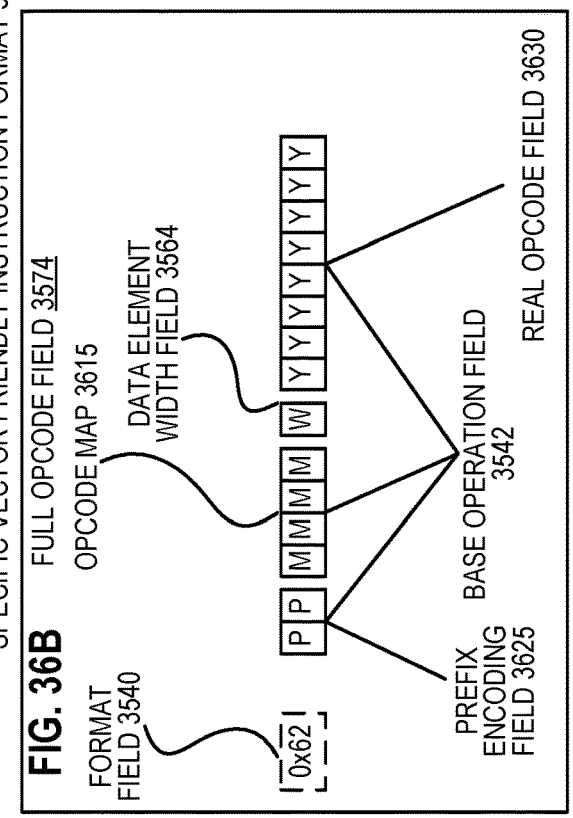

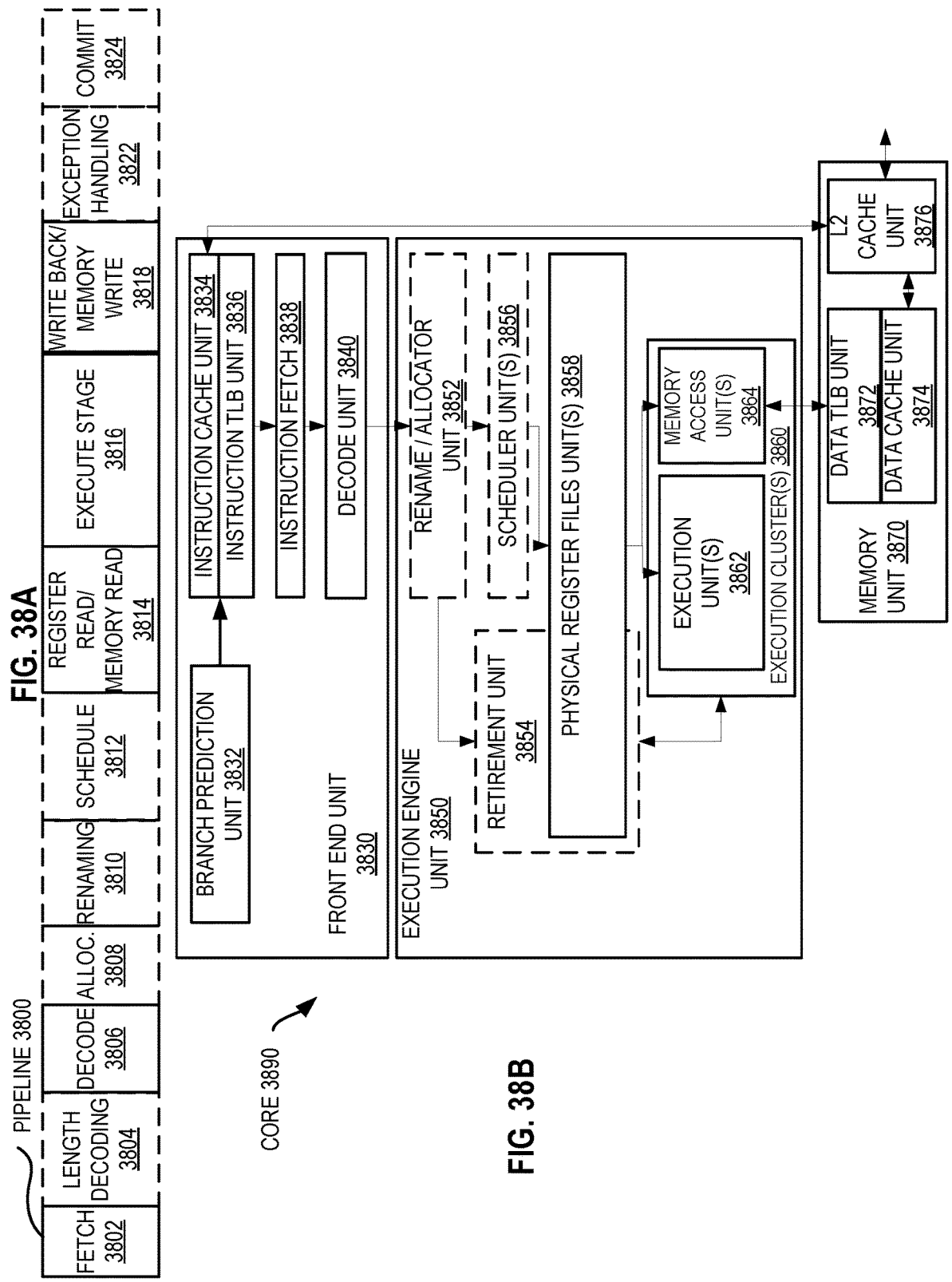

APPARATUSES, METHODS, AND SYSTEMS FOR A USER DEFINED FORMATTING INSTRUCTION TO CONFIGURE MULTICAST BENES NETWORK CIRCUITRY

TECHNICAL FIELD

The disclosure relates generally to electronics, and, more specifically, an embodiment of the disclosure relates to circuitry to implement a user defined formatting instruction to configure multicast Benes network circuitry.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 12 illustrates a finite impulse response (FIR) filter mode for multicast Benes network circuitry according to embodiments of the disclosure.

FIG. 13 illustrates a symmetric filter mode for multicast Benes network circuitry according to embodiments of the disclosure.

FIG. 14 illustrates a fractional rate filter mode for input samples for multicast Benes network circuitry according to embodiments of the disclosure.

FIG. 15 illustrates a fractional rate filter mode for input coefficients for multicast Benes network circuitry according to embodiments of the disclosure.

FIG. 24 illustrates a formatting mode for real number sliding windows for input coefficients and a formatting mode for complex number sliding windows for input coefficients for multicast Benes network circuitry according to embodiments of the disclosure.

FIG. 25 illustrates pseudocode for multi-rate filter chains to be performed on multicast Benes network circuitry according to embodiments of the disclosure.

FIG. 26 illustrates input taps and output stages for the multi-rate filter chains pseudocode of FIG. 25 performed on multicast Benes network circuitry according to embodiments of the disclosure.

FIG. 28 illustrates performing a two sample, coarse offset of zero with cloning on the butterfly circuit of FIG. 27A according to embodiments of the disclosure.

FIG. 29 illustrates performing a two sample, coarse offset of two with cloning on the butterfly circuit of FIG. 27A according to embodiments of the disclosure.

FIG. 30 illustrates performing a two sample, coarse offset of one with cloning and reversal on the butterfly circuit of FIG. 27A according to embodiments of the disclosure.

FIG. 31 illustrates performing a two sample, coarse offset of three with cloning and reversal on the butterfly circuit of FIG. 27A according to embodiments of the disclosure.

FIG. 32 illustrates performing a coarse offset of two and fine offsets of three and seven with cloning on the butterfly circuit of FIG. 27A according to embodiments of the disclosure.

FIG. 33 illustrates performing a coarse offset of one and fine offsets of three and seven with cloning and reversal on the butterfly circuit of FIG. 27A according to embodiments of the disclosure.

FIG. 34 illustrates performing a coarse offset of two and fine offsets of seven and three with cloning on the butterfly circuit of FIG. 27A according to embodiments of the disclosure.

FIG. 36A is a block diagram illustrating fields for the generic vector friendly instruction formats in FIGS. 35A and 35B according to embodiments of the disclosure.

FIG. 36B is a block diagram illustrating the fields of the specific vector friendly instruction format in FIG. 36A that make up a full opcode field according to one embodiment of the disclosure.

FIG. 36C is a block diagram illustrating the fields of the specific vector friendly instruction format in FIG. 36A that make up a register index field according to one embodiment of the disclosure.

FIG. 38A is a block diagram illustrating both an exemplary in-order pipeline and an exemplary register renaming, out-of-order issue/execution pipeline according to embodiments of the disclosure.

FIG. 38B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
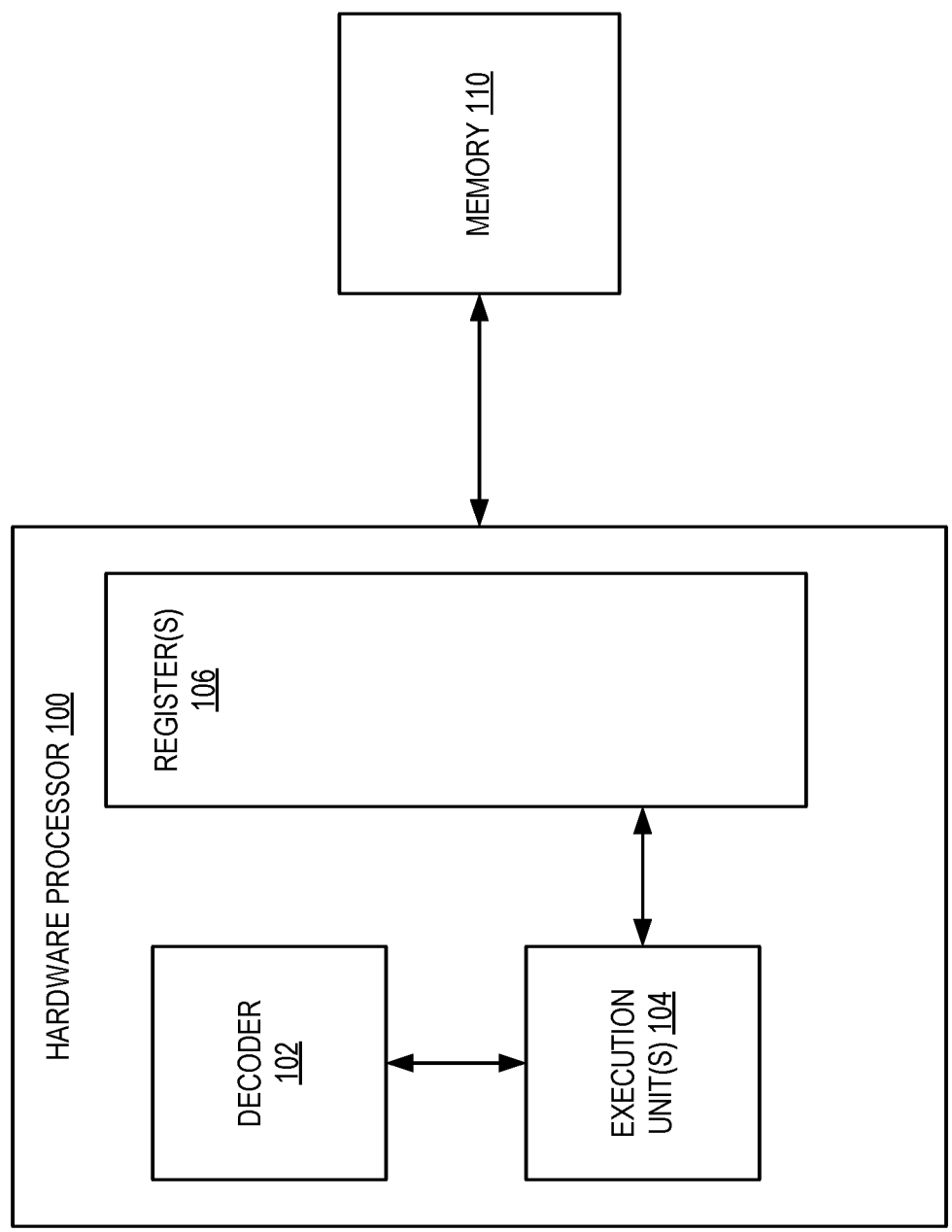
FIG. 1 illustrates a hardware processor coupled to a memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Non-limiting examples of operations are radio signal processing operations. Radio signal processing operations may be filtering operations, such as filtering operations that perform interpolation, decimation, modulation, clipping and power amplifier (PA) linearization using digital pre-distortion (DPD), DPD adaptation, or etc. Operations may include vector rotation, insertion, extraction, concatenation, interleaving, reversal, cloning, sparse vector scatter/gather, arbitrary element permutations computed off-line, generation of a plurality of sets of sliding windows for filters with symmetry, and generation of a plurality of sets of variable offset windows for nonlinear filters.

The operations may be performed on packed data (e.g., a plurality of elements packed into a source). In certain embodiments, the hardware to perform an operation operates on a plurality of elements in parallel, for example, as vector circuitry (e.g., a vector engine) of a processor. In certain embodiments, the hardware disclosed herein is programmed by a formatting instruction. The instructions disclosed herein are improvements to the functioning of a processor (e.g., of a computer) itself. Instruction decode circuitry (e.g., a decoder) not having such an instruction as a part of its instruction set would not decode as discussed herein. An execution circuit not having such an instruction as a part of its instruction set would not execute as discussed herein. In certain embodiments, a formatting instruction reuses input data such that multiple loads (e.g., reads) are avoided, which can take a large number of cycles to complete. Thus, certain embodiments herein perform one load of packed data (e.g., vector) of input or coefficient data and perform multiple operations on that packed data, e.g., to compute as many output samples as possible. Certain embodiments herein are directed to a formatting instruction that is flexible to support a variety of applications efficiently on the hardware (e.g., a Benes network circuit as discussed herein), for example, to maximize the usage of multipliers of a multiply circuit receiving the resultants of that hardware.

FIG. 1 illustrates a hardware processor 100 coupled to a memory 110 according to embodiments of the disclosure. Depicted hardware processor 100 includes a hardware decoder 102 (e.g., decode unit or decode circuit) and a hardware execution unit 104 (e.g., execution circuit). Depicted hardware processor 100 includes register(s) 106. Registers may include one or more of registers to access (e.g., load and/or store) data, e.g., additionally or alternatively to access of (e.g., load and/or store) data in memory 110. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware decoder 102 may receive an (e.g., single) instruction (e.g., macro-instruction) and decode the instruction, e.g., into micro-instructions and/or micro-operations. Hardware execution circuit 104 may execute the decoded instruction (e.g., macro-instruction) to perform an operation or operations. For example, an instruction to be decoded by decoder 102 and for the decoded instruction to be executed by execution circuit 104 may be any instruction discussed herein, e.g., in reference to FIGS. 2-34. Hardware execution unit 104 may be any of the execution circuits in FIGS. 9-11. Certain embodiments herein are directed to a processor that includes an instruction in its instruction set that formats a Benes network circuit to provide a desired output sequence (e.g., in addition to inputting that data into the formatted Benes network circuit and producing the desired output sequence).

The decoder 102, execution unit 104, and registers 106 may be of a single core of the processor, e.g., and multiple cores each with an instance of the circuitry may be included. The processor (e.g., and core thereof) may be a processor and/or core according to any of the disclosure herein. The executing unit 104 may include a Benes network circuit or it may a separate component, e.g., within processor 100.

Figure 2:
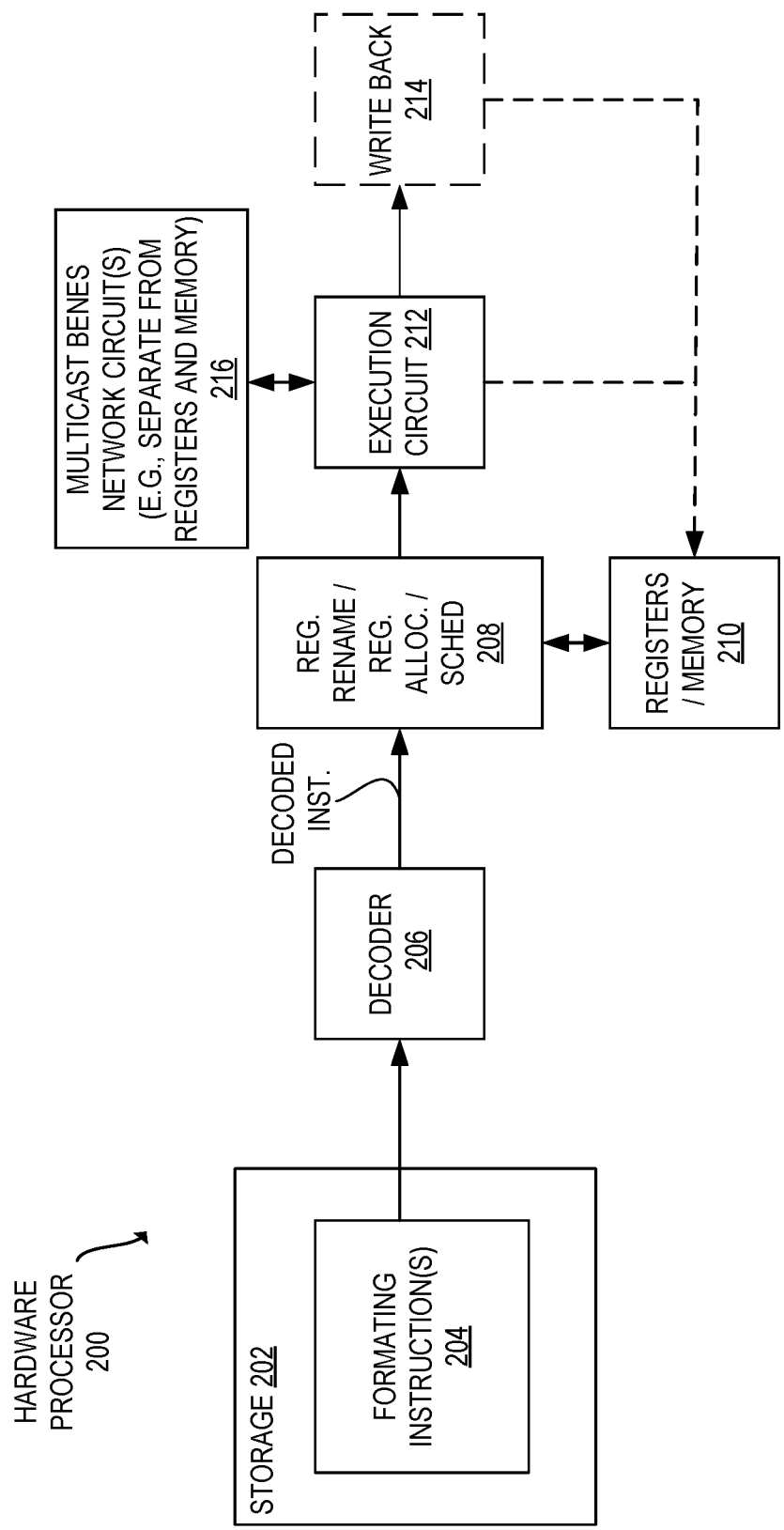
FIG. 2 illustrates a hardware processor coupled to storage that includes one or more formatting instructions for a multicast Benes network circuit according to embodiments of the disclosure.

FIG. 2 illustrates a hardware processor 200 coupled to storage 202 that includes one or more (e.g., user) formatting instructions for a (e.g., multicast) Benes network circuit according to embodiments of the disclosure. In certain embodiments, a formatting instruction is according to any of the disclosure herein. In one embodiment, e.g., in response to a request to perform an operation, the instruction (e.g., macro-instruction) is fetched from storage 202 and sent to decoder 206. In the depicted embodiment, the decoder 206 (e.g., decoder circuit) decodes the instruction into a decoded instruction (e.g., one or more micro-instructions or micro-operations). The decoded instruction is then sent for execution, e.g., via scheduler circuit 208 to schedule the decoded instruction for execution.

In certain embodiments, (e.g., where the processor/core supports out-of-order (OoO) execution), the processor includes a register rename/allocator circuit coupled to register file/memory circuit 210 (e.g., unit) to allocate resources and perform register renaming on registers (e.g., vector registers associated with a logical operation and test instruction). In certain embodiments, (e.g., for out-of-order execution), the processor includes one or more scheduler circuits 208 coupled to the decoder. The scheduler circuit(s) may schedule one or more operations associated with decoded instructions, including one or more operations decoded from a logical operation and test instruction, for execution on the execution circuit 212.

In certain embodiments, a write back circuit 214 is included to write back results of an instruction to a destination (e.g., write them to a register(s) and/or memory), for example, so those results are visible within a processor (e.g., visible outside of the execution circuit that produced those results). In the depicted embodiment, hardware processor 200 includes one or more (e.g., multicast) Benes network circuits 216. In one embodiment, the one or more (e.g., multicast) Benes network circuits 216 are separate from registers and memory 210. In one embodiment, the one or more (e.g., multicast) Benes network circuits 216 are coupled to (or a part of) executing circuit 212. In one embodiment, a first multicast Benes network circuit is included for data samples and a second multicast Benes network circuit is included for coefficients.

One or more of these components (e.g., decoder 206, register rename/register allocator/scheduler 208, execution circuit 212, (e.g., multicast) Benes network circuit 216, register file/memory 210, or write back circuit 214) may be in a single core of a hardware processor (e.g., and multiple cores each with an instance of these components).

In certain embodiments, a formatting instruction switches a multicast Benes network circuit to one of a plurality of modes. In one embodiment, each mode provides unique control for alignment and cloning of input samples and/or coefficients, e.g., such that the same Benes network circuit is programmed to work for each of these modes. A mode may include any one or combination of: finite impulse response (FIR) filter mode, symmetric FIR filter mode, fractional rate filter mode, digital pre-distortion (DPD) filter mode, or half-band FIR filter mode. Modes may include a real number (e.g., coefficient) mode and a complex number (e.g., coefficient) mode. In certain embodiments, a plurality of formatting instructions in a loop switches a multicast Benes network circuit to a respective one of a plurality of modes for each instruction without exiting the loop.

Figure 3:
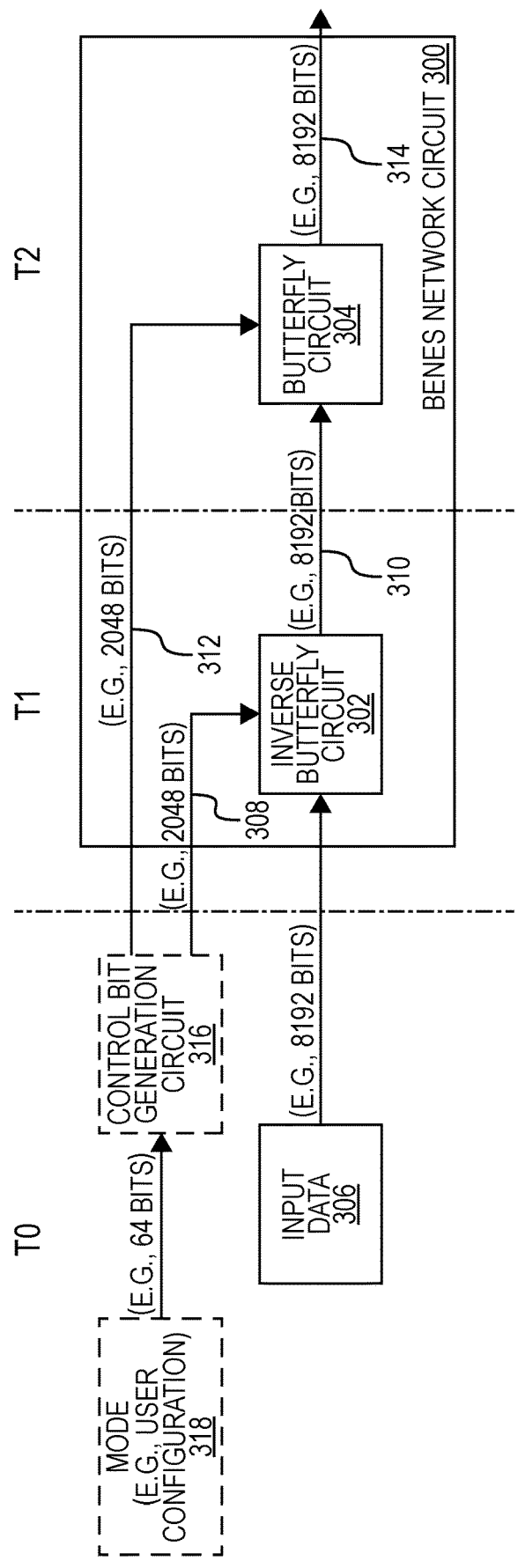
FIG. 3 illustrates a multicast Benes network circuit according to embodiments of the disclosure.

FIG. 3 illustrates a multicast Benes network circuit 300 according to embodiments of the disclosure. In the depicted embodiment, the multicast Benes network circuit 300 includes an inverse butterfly circuit 302 coupled to a butterfly circuit 304. In the depicted embodiment, the inverse butterfly circuit 302 receives an input of input data 306 (e.g., packed input data) (e.g., as provided by an instruction) and an input of respective control data 308 (e.g., packed control data). In the depicted embodiment, the output 310 of inverse butterfly circuit 302 is provided as input to butterfly circuit 304 and an input of respective control data 312 (e.g., packed control data) is also provided to butterfly circuit 304. In the depicted embodiment, butterfly circuit 304 generates an output of output data 314 from the multicast Benes network circuit 300. In another embodiment, the inverse butterfly circuit 302 and butterfly circuit 304 are swapped in position (e.g., in series), for example, such that the output of butterfly circuit 304 is provided as input to inverse butterfly circuit 302 and the output of the multicast Benes network circuit 300 is the output from the inverse butterfly circuit 302. Control data 308 and control data 312 may be provided by an instruction itself (e.g., from a register) or, optionally, from control bit generation circuit 316.

In one embodiment, control bit generation circuit 316 receives a value (e.g., less than the total number of control bits of control data 308 and control data 312) that indicates a particular mode 318 (e.g., a user configuration) of a plurality of modes that multicast Benes network circuit 300 is capable of implementing. In this embodiment, the control bit generation circuit 316 outputs control data 308 and control data 312 to configure the individual components (e.g., switches) of inverse butterfly circuit 302 and butterfly circuit 304, respectively, to implement the indicated mode. In certain embodiments, execution of an instruction utilizes one or more of the components depicted in FIG. 3.

Figure 4:
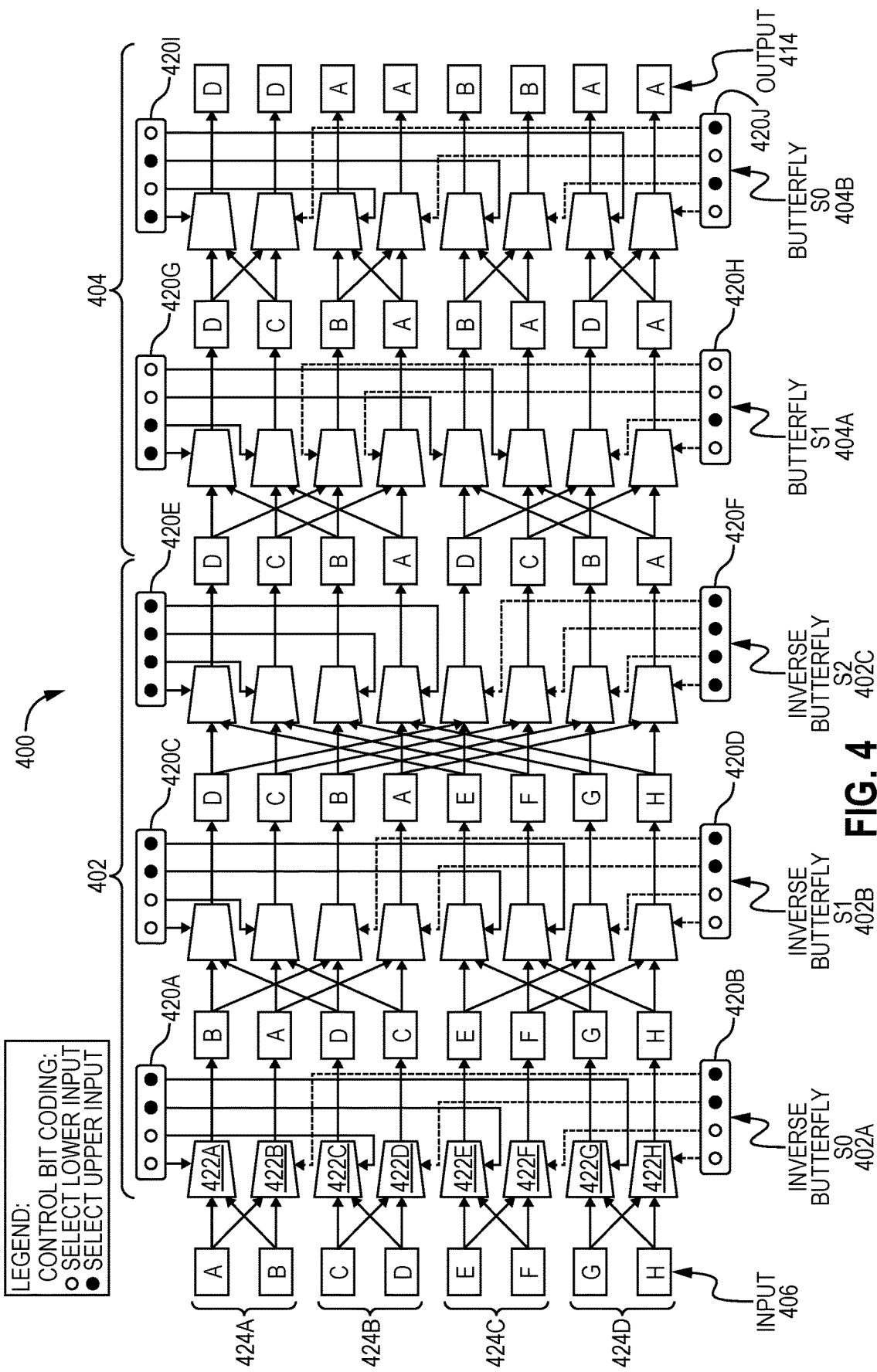
FIG. 4 illustrates a multicast Benes network circuit having an inverse butterfly circuit that comprises a first plurality of stages of multicast switches and a butterfly circuit that comprises a second plurality of stages of multicast switches according to embodiments of the disclosure.

FIG. 4 illustrates a multicast Benes network circuit 400 having an inverse butterfly circuit 402 that comprises a first plurality of stages 402A-402C of multicast switches and a butterfly circuit 404 that comprises a second plurality of stages 404A-404B of multicast switches according to embodiments of the disclosure. In one embodiment, an inverse butterfly circuit and/or butterfly circuit has any number (or proper subset of numbers) of stages. In certain embodiments, each stage includes a plurality of inputs in parallel and a plurality of outputs in parallel (e.g., feeding a downstream component(s)).

In the depicted embodiment, (e.g., packed) input data (depicted as respective elements A-H) is received and routed according to control data 420A-420J to produce output data 414 (with the depicted example as respective elements: D, D, A, D, B, B, A, and A). In certain embodiments each switch (e.g., switches 424A-424D of the first inverse butterfly circuit stage 402A) of a stage includes two inputs and two outputs, e.g., as discussed in reference to FIG. 6 below. Each switch may include a plurality of multiplexers, for example, multiplexers 422A-422B in switch 424A, multiplexers 422C-422D in switch 424B, multiplexers 422E-422F in switch 424C, and multiplexers 422G-422H in switch 424D. In one embodiment, the control bits (e.g., 420A and 420B) are stored in a single location. As one of ordinary skill in the art will understand, the configuration shown in FIG. 4 is merely an example and other configurations are utilized, e.g., to set the circuit 400 to a different mode. In one embodiment, a multicast Benes network circuit includes at least about 256 inputs (e.g., parallel input ports), at least about 256 outputs (e.g., parallel output ports), and/or each input-to-output element data path is at least about 32 bits wide.

Figure 5:
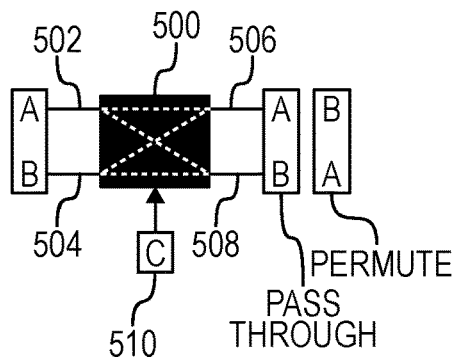
FIG. 5 illustrates a unicast switch according to embodiments of the disclosure.

FIG. 5 illustrates a unicast switch 500 according to embodiments of the disclosure. In the depicted embodiment, the unicast switch 500 is only capable of two different output patterns (e.g., and thus uses a single control bit 510 for a single switch). For example, when the control bit is set to a first (e.g., pass-through selection) value (e.g., 0), the switch 500 passes through the inputs without change (e.g., element A from input 1 502 is output on output 1 506 and element B from input 2 504 is output on output 2 508) and when the control bit is set to a different, second (e.g., permute selection) value (e.g., 1), the switch 500 swaps the inputs as outputs (e.g., element A from input 1 502 is output on output 2 508 and element B from input 2 504 is output on output 1 506). In certain embodiments, one or more (e.g., all) switches of a Benes network circuit are unicast switches.

Figure 6:
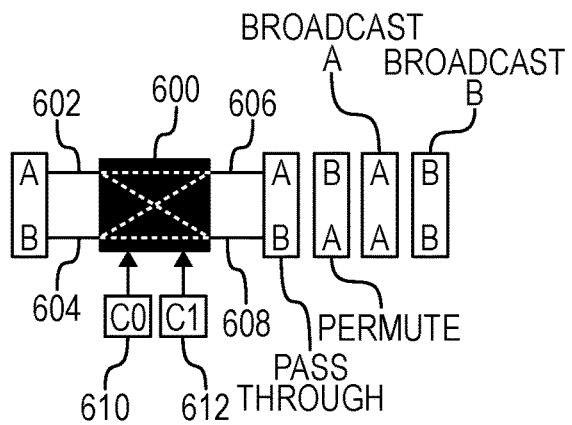
FIG. 6 illustrates a multicast switch according to embodiments of the disclosure.

FIG. 6 illustrates a multicast switch 600 according to embodiments of the disclosure.

Figure 7:
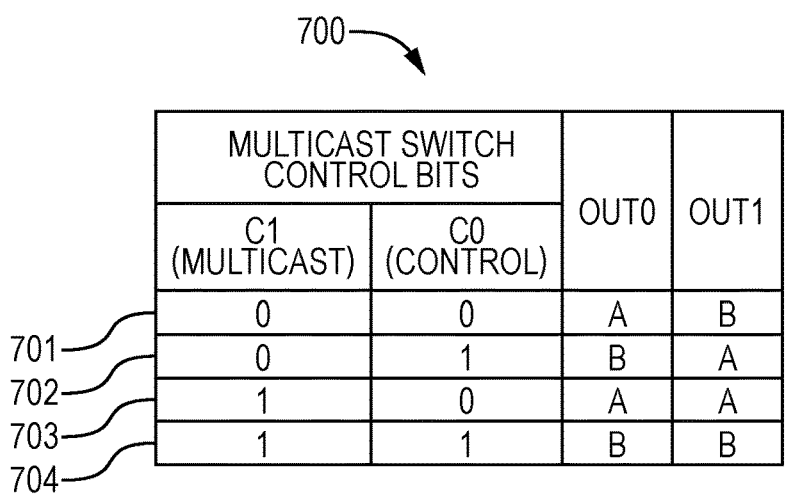
FIG. 7 illustrates example control values for a multicast switch according to embodiments of the disclosure.

FIG. 7 illustrates example control values 700 for a multicast switch 600 in FIG. 6 according to embodiments of the disclosure.

In the depicted embodiment in FIG. 6, the multicast switch 600 is capable of more than two (e.g., capable of four) different output patterns (e.g., and thus uses a plurality of control bits 610 and 612 for a single switch). For example, (i) when the first control bit 610 is set to a first value (e.g., 0) and the second (e.g., multicast) control bit is set to a first value (e.g., 0), the switch 600 passes through the inputs without change (e.g., element A from input 1 602 is output on output 1 606 and element B from input 2 604 is output on output 2 608 as shown in entry 701 in FIG. 7), (ii) when the first control bit 610 is set to a second, different value (e.g., 1) and the second (e.g., multicast) control bit is set to a first value (e.g., 0), the switch 600 swaps the inputs as outputs (e.g., element A from input 1 602 is output on output 2 608 and element B from input 2 604 is output on output 1 606 as shown in entry 702 in FIG. 7), (iii) when the first control bit 610 is set to a first value (e.g., 0) and the second (e.g., multicast) control bit is set to a second, different value (e.g., 1), the switch 600 broadcasts the first input as both outputs (e.g., element A from input 1 602 is output on both output 1 606 and output 2 608 as shown in entry 703 in FIG. 7), and (iv) when the first control bit 610 is set to a second, different value (e.g., 1) and the second (e.g., multicast) control bit is set to a second, different value (e.g., 1), the switch 600 broadcasts the second input as both outputs (e.g., element B from input 2 604 is output on both output 1 606 and output 2 608 as shown in entry 704 in FIG. 7). In certain embodiments, one or more (e.g., all) switches of a Benes network circuit are multicast switches. In certain embodiments, all switches in a single stage of a Benes network circuit are multicast switches. In one embodiment, all switches in a butterfly circuit of a Benes network circuit are multicast switches and/or all switches in an inverse butterfly circuit of a Benes network circuit are multicast switches. In one embodiment, only a first subset of stages (e.g., stages 402A-402C in FIG. 4) includes multicast switches and the rest are (e.g., single control bit) unicast switches.

In certain embodiments, each mode provides (e.g., unique) alignment and cloning of input samples and/or coefficients with a same, multicast Benes network circuit. In certain embodiments, a multicast Benes network circuit supports different modes to perform one or more operations that includes permutations, rotations, cloning of input values used to create the required output, supplying input to a multiplier (e.g., multiply circuit), and/or grouping multiplier inputs according to which products are summed to create the output samples. In certain embodiments, the configuration parameters to implement a fractional rate filter mode include numerator, denominator, sample phase, start address, and/or position within the partial sum. In certain embodiments, the configuration parameters to implement a digital pre-distortion (DPD) filter mode include a starting address, sample offset values for each coefficient, and/or position within the partial sum.

A circuit (e.g., hardware unit of a processor, such as, but not limited to, a vector engine (VE)) may use a multiple (e.g., 128) way single instruction, multiple data (SIMD) (e.g., with 4096 bits) datapath to achieve high performance required for radio Digital Front-End (DFE), e.g., instead of an application-specific integrated circuit (ASIC) or hard-wired solution. Data formatting operations at sample level (e.g., 32 bits per sample) may be required to achieve high SIMD parallelism/efficiency in VE. Like a general purpose processor, commonly used formatting functions, which only use a subset of the formatting capabilities of an underlying broadcast enhanced Benes Network, may be provided as VE intrinsics. However, new algorithms/applications may need special formatting in the critical path not directly supported by this instruction set. Achieving such formatting with a long sequence of formatting instructions may degrade performance too much to be an acceptable solution.

With a wide (e.g., greater than about 8192 bits) SIMD processor, in order to reduce latency and/or to reduce hardware cost (e.g., number of wide accumulators with guard bits, amount of nonlinear function table lookup memory, etc.), several functions (e.g., 8), for example, taps in finite impulse response (FIR) filters or nonlinear functions in Digital Pre-Distortion (DPD) in radio Digital Front-End, may need to be grouped and processed together in order to achieve high performance with high hardware utilization. Since, in certain embodiments, each tap/function requires its input sample sequence starting with a particular offset with respect to the beginning of data buffer, several different input sequences may need to be generated and packed together in a vector before they can be fed to a downstream component, e.g., a multiply-accumulate (MAC) hardware circuit. In certain embodiments, a problem may be to generate/extract all input sequences with a programmable offset for each sequence from a common data buffer and to pack them into a vector before feeding it to the MAC hardware circuit.

Certain embodiments herein provide a special instruction with all a multicast Benes network circuits' control bits accessible, e.g., accessible to a vector register loadable from memory. In certain embodiments, this effectively allows a user to define and/or customize their own data formatting intrinsics and to fully utilize the formatting power of the underlying multicast enhanced Benes network circuit.

Certain embodiments herein allow for a read in of a wide window of data (e.g., enough data to cover all input data sequences used in a cycle) and feed it to a data formatter with an embodiment of an (e.g., "xselect") (e.g., macro) instruction. In certain embodiments, the instruction then extracts all sequences with unique (e.g., programmable) offset for each sequence and packs them in a vector. The instruction may then be implemented with a multicast enhanced Benes network circuit. The (e.g., decoding and executing of the) instruction may also include generation of any required Benes control bits for the instruction in real time. For VE using N-way SIMD, a broadcast enhanced Benes network circuit complexity of $O(p*N*\log(N))$ is discussed below, e.g., where p is 32 bits for complex data samples and is thus much less costly than an $O(p*N2)$ crossbar switch.

Certain embodiments herein provide to programmers a (e.g., macro) instruction with a user-defined-formatting intrinsic for a multicast Benes network circuit. In one embodiment, a Benes network circuit includes an inverse butterfly circuit followed by a (non-inverse) butterfly circuit with total 2*log 2N−1 stages, where N is the number of inputs. In one embodiment, a Benes network circuit includes has 256 (e.g., 32 bits each) inputs. As discussed above, FIG. 4 depicts an exemplary multicast Benes network circuit of eight inputs with the same number (eight) of control bits for each stage. In certain embodiments, the multicast switches allows broadcasting from left or right input and use two control bits per switch instead of one. For example, with all (e.g., 2 log 2N-stages*N/2 switches*2 bits=3840) control bits available to programmers in embodiments of this instruction.

Figure 8:
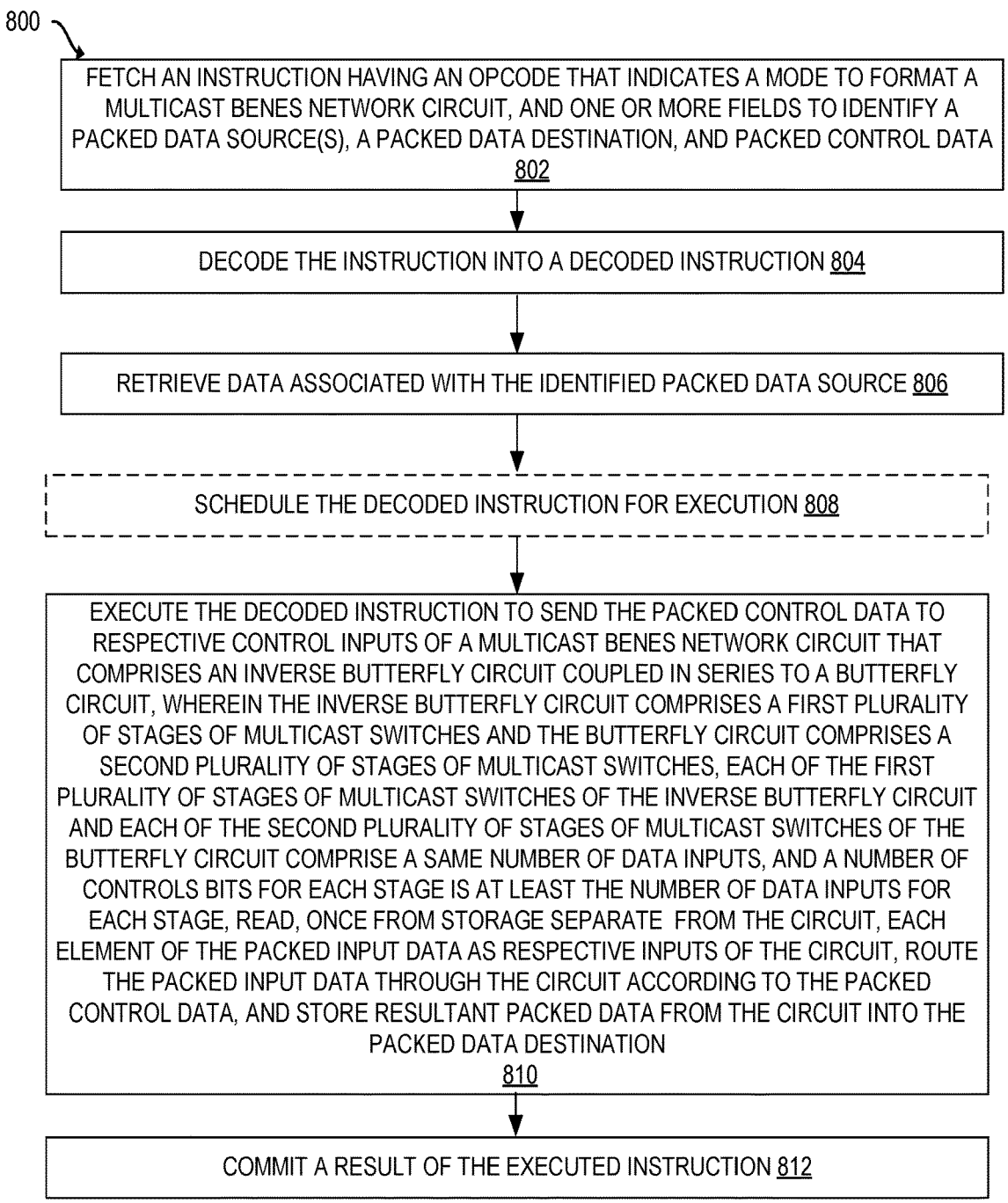
FIG. 8 illustrates a method of processing a formatting instruction for a multicast Benes network circuit according to embodiments of the disclosure

FIG. 8 illustrates a method of processing a formatting instruction for a multicast Benes network circuit according to embodiments of the disclosure. A processor (e.g., or processor core) may perform method 800, e.g., in response to receiving a request to execute an instruction from software. Depicted method 800 includes processing a packed data sorting instruction by: fetch an instruction having an opcode that indicates a mode to format a multicast Benes network circuit, and one or more fields to identify a packed data source(s), a packed data destination, and packed control data 802, decode the instruction into a decoded instruction 804, retrieve data associated with the identified packed data source 806, (optionally) schedule the decoded instruction for execution 808, execute the decoded instruction to send the packed control data to respective control inputs of a multicast Benes network circuit that comprises an inverse butterfly circuit coupled in series to a butterfly circuit, wherein the inverse butterfly circuit comprises a first plurality of stages of multicast switches and the butterfly circuit comprises a second plurality of stages of multicast switches, each of the first plurality of stages of multicast switches of the inverse butterfly circuit and each of the second plurality of stages of multicast switches of the butterfly circuit comprise a same number of data inputs, and a number of controls bits for each stage is at least the number of data inputs for each stage, read, once from storage separate from the circuit, each element of the packed input data as respective inputs of the circuit, route the packed input data through the circuit according to the packed control data, and store resultant packed data from the circuit into the packed data destination 810, and commit a result of the executed instruction 812.

In certain embodiments, an instruction includes a format of having an opcode (e.g., a vector opcode (vopcode)) that indicates which mode a multicast Benes network circuit is to be placed into. In certain embodiments, an instruction includes a format of having a vector opcode (vopcode) that indicates how the instruction is to configure each multicast switch of a multicast Benes network.

In one embodiment, the width of each element in the input packed data is a single byte (8 bits) or multiple bytes (e.g., 16 bits or 32 bits). In the Figures herein, e.g., FIGS. 2-34, data may be loaded from a register/memory and/or stored in a register or memory (e.g., only at the end of execution of the instruction). In certain embodiments, the packed data source (input) and the packed data destination (output) each have the same number of bits and/or elements. In certain embodiments, some or all of the data may be accessed in (e.g., system) memory. In certain embodiments, only the data storage circuitry within an execution circuit (e.g., unit) (e.g., and within a multicast Benes network circuit) is used to perform the operations of the execution of the instruction (e.g., the operations other than the loading of the packed data input values from a register/memory and the storing of the final (e.g., not interim) packed data resultant value in register/memory). In one embodiment, the input storage (e.g., buffer) (e.g., input 406 in FIG. 4) is separate from any registers and/or memory, e.g., where the time to access the buffer is less than the time to access the register and/or memory for a same width of data being accessed. The input and output values and sizes herein are also examples, and other values and sizes may be utilized. The data (e.g. the sorted data) may be according to big-endian or little-endian order.

In one embodiment (e.g., for a new formatting operation not directly supported by processor's existing instruction set), a programmer can precompute the required control bit patterns for the desired use (e.g., filter) and store them in memory. When the new formatting is needed, a control bit pattern can then be read from memory before calling the user-defined-formatting instruction. The input data to the user-defined-formatting instruction can then be formatted in an efficient way and the desired output can be sent (e.g., to a MAC circuit) for processing. For example, vector_deinterleave_by_2(inA, inB) is one example of an instruction format in a packed data (e.g., vector) instruction set. However, a user may want to perform deinterleave by another number (e.g., by 16) extensively, which may not be supported directly by the instruction. So instead of doing the following sequence of pseudocode to achieve deinterleave by 16:

```
//inA, inB, A1, A2, A3, B1, B2, B3, Out1, Out2: 4096b vectors
A1, B1 = vec_deinterleave_by_2(inA, inB);  //inA, inB deinterleaved by 2 A2, B2 =
vec_deinterleave_by_2(A1, B1);             //deinterleaved by 4 now A3, B3 =
vec_deinterleave_by_2(A2, B2);             //deinterleaved by 8 now Out1, Out2 =
vec_deinterleave_by_2(A3, B3);             //deinterleaved by 16.
```

It may be desirable to not execute more than one instruction, so certain embodiments herein provide for a single instruction that achieves deinterleave by a certain number (e.g., 16) with the following format where a user defines their own instruction by loading Benes network control bits (e.g., in a register) for achieving deinterleave by that number (e.g., by 16), and thus replace the above sequence of code with the following instruction: Output (e.g., Out1, Out2) =user_defined_formatting(inA, inB, BControl); where inA is a first input location, inB is a second input location, and BControl is a location storing the Benes control data (e.g., a 4096 bits of data), and Output is the output location (e.g., a first output location Out1 and a second output location Out2). The following FIGS. 9-11 illustrate execution circuitry that includes multicast Benes network circuitry, multiply circuitry, and accumulate circuitry, but it should be understood that in other embodiments, any combination of that circuitry may be utilized, e.g., only multicast Benes network circuitry in an execution circuit.

Figure 9:
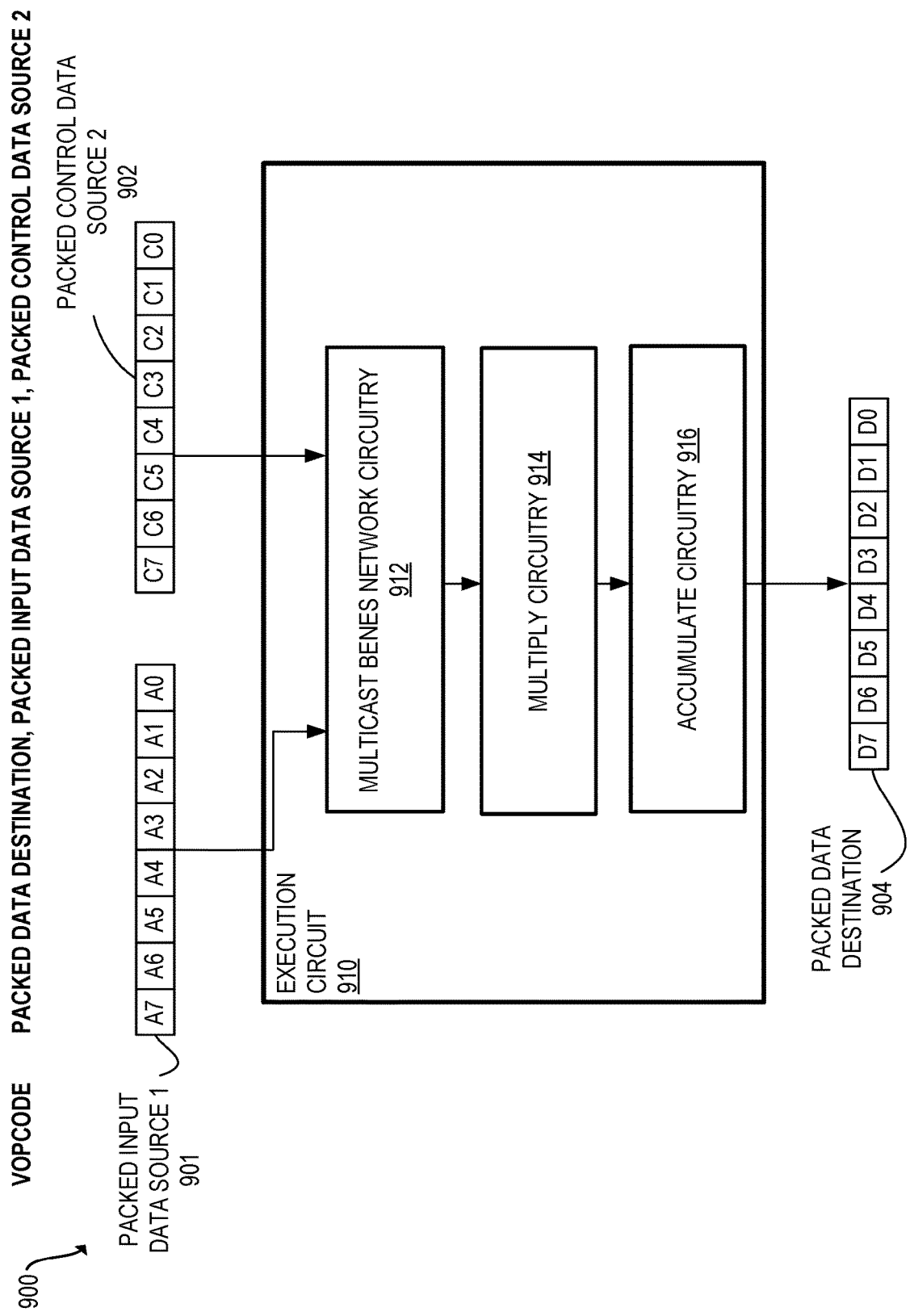
FIG. 9 illustrates circuitry including an execution circuit with multicast Benes network circuitry, multiply circuitry, and accumulate circuitry according to embodiments of the disclosure.

FIG. 9 illustrates circuitry including an execution circuit 910 with multicast Benes network circuitry 912, multiply circuitry 914, and accumulate circuitry 916 according to embodiments of the disclosure. In certain embodiments, decoder (e.g., decoder 102 in FIG. 1 or decoder 206 in FIG. 2) decodes an instruction into a decoded instruction that causes execution circuit 910 to perform filtering operations (e.g., by configuring and performing operations with multicast Benes network circuit 912 by execution of the single instruction) with multicast Benes network circuitry 912, multiply circuitry 914, and accumulate circuitry 916 (for example, the decoded instruction indicate to execution circuit 910 which components to use, e.g., here to use multicast Benes network circuitry 912, multiply circuitry 914, and accumulate circuitry 916). In the depicted embodiment, an instruction format may include one or more fields that identifies the packed data destination 904 and first packed input (data) source 901, and second packed input (control) source 902. In the depicted embodiment, the packed input data source 901 includes eight elements (indexed 0-7). In the depicted embodiment, the packed control data source 902 includes eight elements (indexed 0-7). However, it should be understood that any number of elements, or a proper subset of any numbers, may be utilized with the instruction(s) disclosed herein. In certain embodiments, each element in a packed data source has a same bit width (e.g., a byte or bytes) as the other elements in that data source. In certain embodiments, the number of elements (e.g., and their bit width) are different in the packed input data source 901 and the packed data destination 904. In certain embodiments, the number of elements (e.g., and their bit width) are different in the packed input data source 901 and the packed control data source 902.

In certain embodiments, multicast Benes network circuitry 912 (e.g., as an instance of multicast Benes network circuitry 400 in FIG. 4) performs a filtering operation on the elements of the packed input data source 901 according to the bits of the packed control data source 902. The filtering operation may be according to FIGS. 12-34 herein. In certain embodiments, the execution circuit 910 then causes the resultant filtered data to be sent to multiply circuitry 914 (for example, to multiply an element of the resultant filtered data by another element for the resultant filtered packed data (e.g., the other element being a respective element from the accumulate circuitry 916) to produce a respective product. In certain embodiments, the execution circuit 910 then causes the product generated by multiplication circuitry 914 to be sent to the accumulate (e.g., adder) circuitry 916 (e.g., to add each element of the product to a respective, previous element to produce an updated element). In certain embodiments, the execution circuit 910 selects a mode (e.g., a filtering mode) of the multicast Benes network circuitry 912 by applying the packed control data from source 902 to the respective multicast switches of the multicast Benes network circuitry 912. In one embodiment, the vopcode indicates to the execution circuit 910 to source the packed control data from source 902 to the respective multicast switches of the multicast Benes network circuitry 912. The packed data result from accumulate circuitry 916 may then be stored into destination 904, e.g., with each of D7-D0 storing a respective single element.

Figure 10:
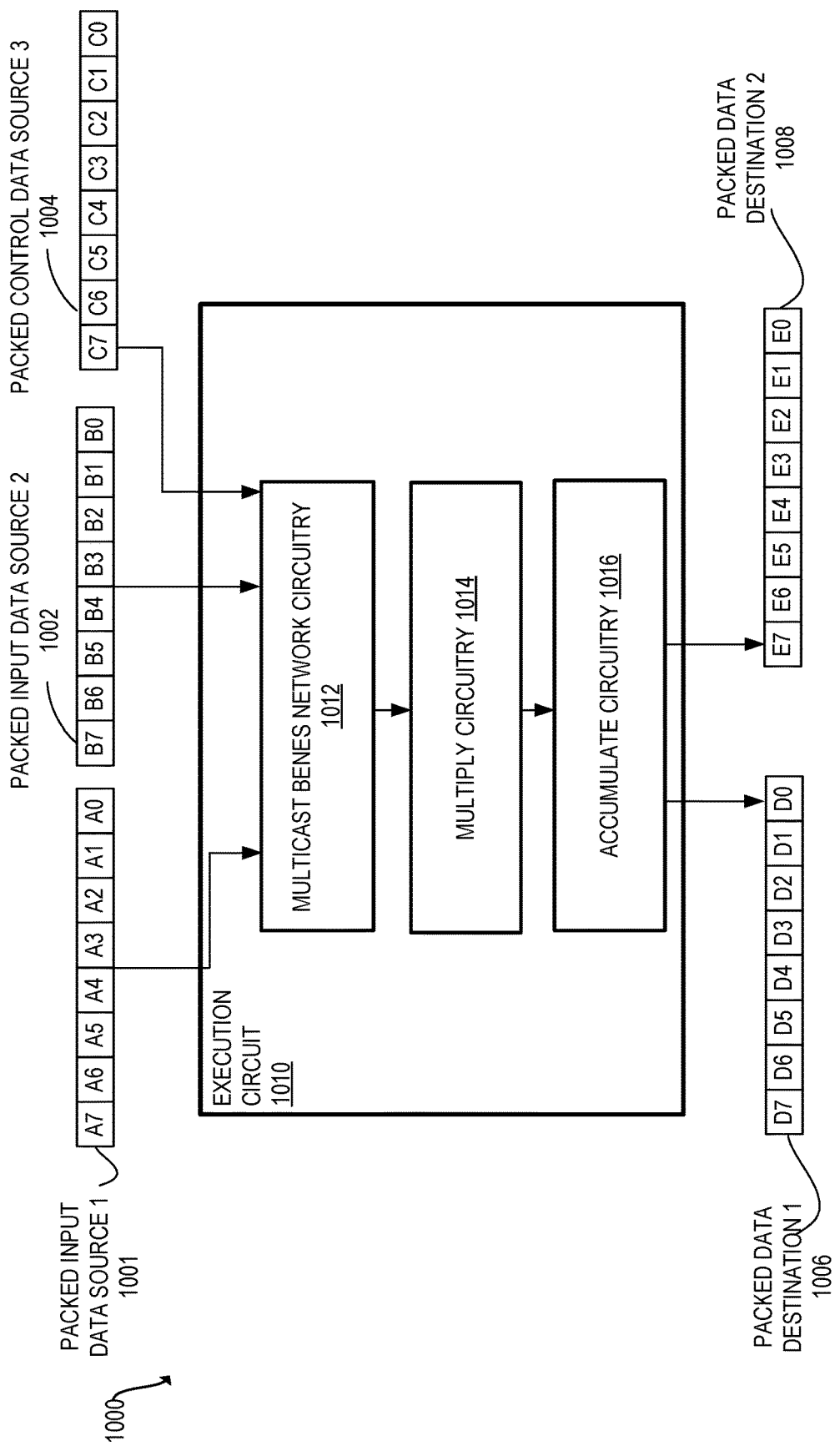
FIG. 10 illustrates circuitry including an execution circuit with multicast Benes network circuitry, multiply circuitry, and accumulate circuitry according to embodiments of the disclosure.
Figure 11:
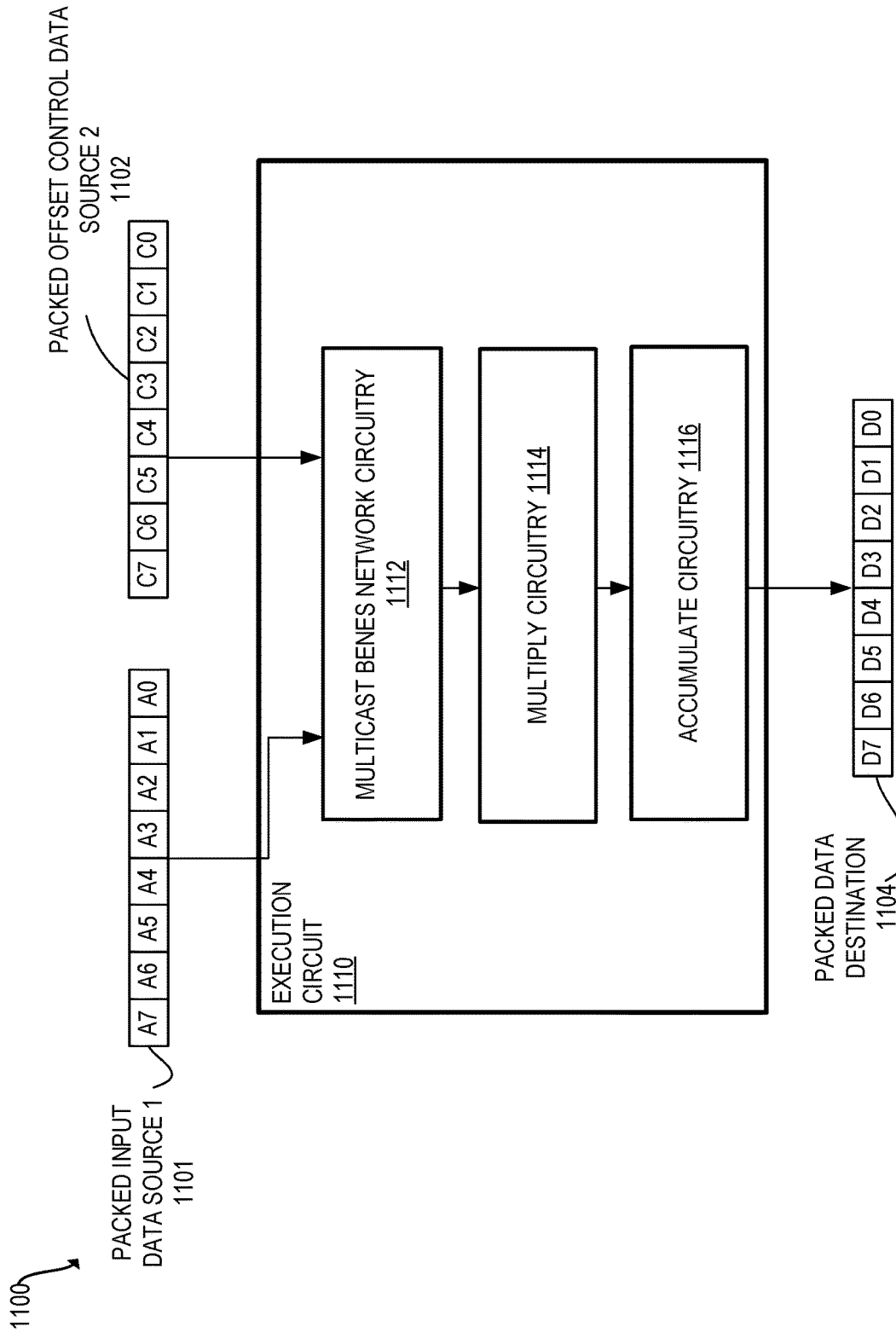
FIG. 11 illustrates circuitry including an execution circuit with multicast Benes network circuitry according to embodiments of the disclosure.

FIG. 10 illustrates circuitry including an execution circuit 1010 with multicast Benes network circuitry 1012, multiply circuitry 1014, and accumulate circuitry 1016 according to embodiments of the disclosure. In certain embodiments, decoder (e.g., decoder 102 in FIG. 1 or decoder 206 in FIG. 2) decodes an instruction into a decoded instruction that causes execution circuit 1010 to perform filtering operations (e.g., by configuring and performing operations with multicast Benes network circuit 1012 by execution of the single instruction) with multicast Benes network circuitry 1012, multiply circuitry 1014, and accumulate circuitry 1016 (for example, the decoded instruction indicate to execution circuit 1010 which components to use, e.g., here to use multicast Benes network circuitry 1012, multiply circuitry 1014, and accumulate circuitry 1016). In the depicted embodiment, an instruction format may include one or more fields that identifies a first packed data destination 1006, a second packed data destination 1008, a first packed input (data) source 1001, a second packed input (data) source 1002, and a third packed data input (control) source 1004. In the depicted embodiment, the packed input data source 1001 and packed input data source 1002 each include eight elements (indexed 0-7). In the depicted embodiment, the packed control data source 1004 includes eight elements (indexed 0-7). However, it should be understood that any number of elements, or a proper subset of any numbers, may be utilized with the instruction(s) disclosed herein. In certain embodiments, each element in a packed data source has a same bit width (e.g., a byte or bytes) as the other elements in that data source. In certain embodiments, the number of elements (e.g., and their bit width) are different in the packed input data source 1001 and/or 1002 and the packed data destination 1006 and/or 1008. In certain embodiments, the number of elements (e.g., and their bit width) are different in the packed input data source 1001 and 1002 and the packed control data source 1004.

In certain embodiments, multicast Benes network circuitry 1012 (e.g., as an instance of multicast Benes network circuitry 400 in FIG. 4) performs a filtering operation on the elements of the first packed input data source 1001 and the second packed input data source 1002 according to the bits of the packed control data source 1004. The filtering operation may be according to FIGS. 12-34 herein. In certain embodiments, the execution circuit 1010 then causes the resultant filtered data to be sent to multiply circuitry 1014 (for example, to multiply an element of the resultant filtered data by another element for the resultant filtered packed data (e.g., the other element being a respective element from the accumulate circuitry 1016) to produce a respective product. In certain embodiments, the execution circuit 1010 then causes the product generated by multiplication circuitry 1014 to be sent to the accumulate (e.g., adder) circuitry 1016 (e.g., to add each element of the product to a respective, previous element to produce an updated element). In certain embodiments, the execution circuit 1010 selects a mode (e.g., a filtering mode) of the multicast Benes network circuitry 1012 by applying the packed control data from source 1002 to the respective multicast switches of the multicast Benes network circuitry 1012. In one embodiment, the vopcode indicates to the execution circuit 1010 to source the packed control data from source 1002 to the respective multicast switches of the multicast Benes network circuitry 1012. The packed data result from accumulate circuitry 1016 may then be stored into destination 1006, e.g., with each of D7-D0 storing a respective single element, and destination 1008, e.g., with each of E7-E0 storing a respective single element.

In certain embodiments, the first packed input (data) source 1001 is (e.g., at least) about 4096 bits wide, the second packed input (data) source 1002 is (e.g., at least) about 4096 bits wide, and/or the third packed data input (control) source 1004 is (e.g., at least) about 4096 bits wide. In certain embodiments, the third packed data input (control) source 1004 is (e.g., at least) about 3840 bits. In certain embodiments, the first packed data destination 1006 is (e.g., at least) about 4096 bits wide and/or the second packed data destination 1008 is (e.g., at least) about 4096 bits wide.

In one embodiment, the instruction performs outA, outB=Any_Benes_capable_formatting(inA, inB, BenesControl), where inA and inB are each input data registers (e.g., having 128 elements of 32 bits each (words) totaling 4096 bits), outA and outA are each output data registers (e.g., having 128 elements of 32 bits each (words) totaling 4096 bits), and BenesControl is a control data registers (e.g., storing 4096 bits of control data for multicast Benes network circuitry). Additionally or alternatively to an instruction with user defined, multicast Benes network circuitry formatting, certain embodiments herein provide an instruction that extracts multiple data sequences with programmable starting offsets.

FIG. 11 illustrates circuitry including an execution circuit 1100 with multicast Benes network circuitry 1112, multiply circuitry 1114, and accumulate circuitry 1116 according to embodiments of the disclosure. In certain embodiments, decoder (e.g., decoder 102 in FIG. 1 or decoder 206 in FIG. 2) decodes an instruction into a decoded instruction that causes execution circuit 1110 to extract multiple data sequences with programmable starting offsets (e.g., by configuring and performing operations with multicast Benes network circuit 1112 by execution of the single instruction) with multicast Benes network circuitry 1112, multiply circuitry 1114, and accumulate circuitry 1116 (for example, the decoded instruction indicate to execution circuit 1110 which components to use, e.g., here to use multicast Benes network circuitry 1112, multiply circuitry 1114, and accumulate circuitry 1116). In the depicted embodiment, an instruction format may include one or more fields that identifies the packed data destination 1104 and first packed input (data) source 1101, and second packed input (control) source 1102. In the depicted embodiment, the packed input data source 1101 includes eight elements (indexed 0-7). In the depicted embodiment, the packed control data source 1102 includes eight elements (indexed 0-7). However, it should be understood that any number of elements, or a proper subset of any numbers, may be utilized with the instruction(s) disclosed herein. In certain embodiments, each element in a packed data source has a same bit width (e.g., a byte or bytes) as the other elements in that data source. In certain embodiments, the number of elements (e.g., and their bit width) are different in the packed input data source 1101 and the packed data destination 1104. In certain embodiments, the number of elements (e.g., and their bit width) are different in the packed input data source 1101 and the packed control data source 1102.

In certain embodiments, multicast Benes network circuitry 1112 (e.g., as an instance of multicast Benes network circuitry 400 in FIG. 4) generates an input sequence (e.g., for multiply circuitry 1114) on the elements of the packed input data source 1101 according to the bits of the packed control data source 1102. The filtering operation may be according to FIGS. 12-34 herein. In certain embodiments, the execution circuit 1110 then causes the resultant input sequence of data to be sent to multiply circuitry 1114 (for example, to multiply an element of the resultant input sequence of data by another element for the resultant packed data (e.g., the other element being a respective element from the accumulate circuitry 1116) to produce a respective product. In certain embodiments, the execution circuit 1110 then causes the product generated by multiplication circuitry 1114 to be sent to the accumulate (e.g., adder) circuitry 1116 (e.g., to add each element of the product to a respective, previous element to produce an updated element). In certain embodiments, the execution circuit 1110 selects a mode (e.g., not a filtering mode) of the multicast Benes network circuitry 1112 by applying the packed control data from source 1102 to the respective multicast switches of the multicast Benes network circuitry 1112. In one embodiment, the vopcode (e.g., having a mnemonic of XSELECT) indicates to the execution circuit 1110 to source the packed control data from source 1102 to the respective multicast switches of the multicast Benes network circuitry 1112. The packed data result from accumulate circuitry 1116 may then be stored into destination 1104, e.g., with each of D7-D0 storing a respective single element.

In one embodiment, the instruction performs the following (on 128 bits of input as an example, but may be any other number):

```
//in128: input data
Seq0[0:15] = in128[s0: s0+15]; // where s0 is starting data position for function0
Seq1[0:15] = in128[s1: s1+15]; // where s1 is starting data position for function1
Seq2[0:15] = in128[s2: s2+15]; // where s2 is starting data position for function2
```

-continued

```
Seq3[0:15] = in128[s3: s3+15]; // where s3 is starting data position for function3
Seq4[0:15] = in128[s4: s4+15]; // where s4 is starting data position for function4
Seq5[0:15] = in128[s5: s5+15]; // where s5 is starting data position for function5
Seq6[0:15] = in128[s6: s6+15]; // where s6 is starting data position for function6
Seq7[0:15] = in128[s7: s7+15]; // where s7 is starting data position for function7
Out128 = concatenate(seq0, seq1, seq2, seq3, seq4, seq5, seq6, seq7).
```

In certain embodiments, utilizing an instruction that extracts multiple data sequences with programmable starting offsets includes two parts. The first part is to provide the discussed functionality with an instruction, e.g., as shown in FIG. 11. In this embodiment, the decode and execution of the instruction generates (e.g., extracts) all input sequences needed with a programmable offset for each sequence from a common data buffer per cycle and packs them into a vector (e.g., before feeding them to the multiply circuitry 1114 and/or accumulate circuitry 1116, which may form what is referred to as a multiply and accumulate circuit (MAC)). Providing this instruction achieves high performance with K-fold improvement in certain embodiments, e.g., where K is the number of functions to run in parallel (e.g., K=8) for a crucial DPD function in certain DFE embodiments.

A simplified DPD example code with 8 functions is shown below to illustrate instruction usage:

```
//coeff_starting_offset8, data_starting_offset8 are loaded into registers.
//Both coefficients and data are to do xselect with different starting offsets.
//coefficient sequence uses vector Look Up Table (LUT) and linear interpolation for
// computing the nonlinear function output values.
    load coeff128;  //LD_ST issue slot
    load indata128; //LD_ST
    loop 8 times { //16 samples each iteration
        coeff_raw_8x16 = xselect (coeff128, coeff_starting_offset8);   //VFORM
        coeff_high_and_low_val = LUT(coeff_raw_8x16);                   //LD_ST
        coeff_8x16 = MAC_interpolate(coeff_high_and_low_val, coeff_raw_8x16);
                                                                        //MAC
        data_8x16 = xselect (indata128, data_starting_offset8);         //VFORM
        output16 = MAC_reduce_by_8(coeff_8x16, data_8x16);              //MAC
        store_unaligned(output16);                                       //LD_ST
    }
// This loop uses operations of all 6 vector issue slots, 2 VFORM, 2MAC and 2 LD_ST;
// With software pipelining, the loop becomes a single cycle loop in the disclosed processor
(e.g.,
and its instruction(s) as disclosed herein).
```

The second part includes implementing the instruction with a multicast (e.g., broadcast) enhanced Benes network circuit and with functionality to generate any required Benes control bits to implement an instruction that extracts multiple data sequences with programmable starting offsets (e.g., in real time). In certain embodiments, this reduces the hardware complexity to O(p*N*log 2(N)) where p=32 bits for complex samples, for example, and is over an order of magnitude improvement over an alternative O(p*N2) crossbar switch implementation (e.g., for N=128).

Certain embodiments herein are directed to an instruction that switches multicast Benes network circuitry to a mode of a plurality of modes, e.g., to configure the multicast Benes network circuitry to perform a desired filtering operation. Modes may include any combination of the modes discussed herein, e.g., any of the modes discussed below in reference to FIGS. 12-34.

FIG. 12 illustrates a finite impulse response (FIR) filter mode for multicast Benes network circuitry according to embodiments of the disclosure. In certain embodiments, multicast Benes network circuitry is multicast Benes network circuitry 400 in FIG. 4, although the width of the inputs may be greater (or less) than the eight shown in FIG. 4. In one embodiment, multicast Benes network circuitry includes at least 256 inputs (e.g., of 32 bits wide for each input). In the depicted embodiment, the decoding and execution of an instruction causes multicast Benes network circuitry to be configured to a finite impulse response (FIR) filter mode, and to thus output each of output sequences 1204, 1206, 1208, 1210, 1212, 1214, and 1216, for example, output in parallel to a single storage location (e.g., register) from the input sequence 1202 of x(n) to x(N), where n is the starting index and N is the ending index. In certain embodiments, the configuring of the multicast Benes network circuitry is to produce a plurality of output sequences 1204, 1206, 1208, 1210, 1212, 1214, and 1216 from a single input sequence 1202 (and thus a single load of the input sequence 1202 into the multicast Benes network circuitry, e.g., input 406 in FIG. 4). As an example, the multicast capability of the multicast Benes network circuitry thus allows the x(n+2) element to be output three times into output sequences 1204, 1206, 1208 for a single load of the input sequence 1202 into the multicast Benes network circuitry and not three separate loads of that input sequence 1202.

FIG. 13 illustrates a symmetric filter mode for multicast Benes network circuitry according to embodiments of the disclosure. In certain embodiments, multicast Benes network circuitry is multicast Benes network circuitry 400 in FIG. 4, although the width of the inputs may be greater (or less) than the eight shown in FIG. 4. In one embodiment, multicast Benes network circuitry includes at least 256 inputs (e.g., of 32 bits wide for each input). In the depicted embodiment, the decoding and execution of an instruction causes multicast Benes network circuitry to be configured to a symmetric filter mode, and to thus output each of output sequences 1304, 1306, 1308, 1310, 1312, 1314, and 1316, for example, output in parallel to a single storage location (e.g., register) from the input sequence 1302 of x(n) to x(N), where n is the starting index and N is the ending index. In certain embodiments, the configuring of the multicast Benes network circuitry is to produce a plurality of output sequences 1304, 1306, 1308, 1310, 1312, 1314, and 1316 from a single input sequence 1302 (and thus a single load of the input sequence 1302 into the multicast Benes network circuitry, e.g., input 406 in FIG. 4). As an example, the multicast capability of the multicast Benes network circuitry thus allows the x(n+2) element to be output three times into output sequences 1304, 1306, 1308 for a single load of the input sequence 1302 into the multicast Benes network circuitry and not three separate loads of that input sequence 1302. In the depicted embodiment, each output sequence includes a main data path sequence (d) and a symmetric data path sequence (s), e.g., where d0-d6 are main data path sequences for indices (i) 0-6, and s0-s6 are the respective symmetric data path sequences for indices (i) 0-6. In one embodiment, a filter operation is (di+si)*coefficient sequence, e.g., where the relative distance between d0 and s0 are determined by filter tap (e.g., input) number. Note that symmetric data sequence is in the reversed order of the original data sequence in certain embodiments (e.g., if d0 is x(n) to x(n+4), then s0 is x(n+4) to x(n)) (from left to right in FIG. 13).

FIG. 14 illustrates a fractional rate filter mode for input samples for multicast Benes network circuitry 1404 according to embodiments of the disclosure. In certain embodiments, multicast Benes network circuitry 1404 is multicast Benes network circuitry 400 in FIG. 4, although the width of the inputs may be greater (or less) than the eight shown in FIG. 4. In one embodiment, multicast Benes network circuitry includes at least 256 inputs (e.g., of 32 bits wide for each input). In the depicted embodiment, the decoding and execution of an instruction causes multicast Benes network circuitry 1404 to be configured to a fractional rate (e.g., input sequence) filter mode, and to thus generate output 1410 of each of output data sequences 1406, 1408, etc., for example, output in parallel to a single storage location (e.g., register) from the input (sample) sequence 1402 of x(0) to x(N), where N is the ending index (e.g., 255). In certain embodiments, the configuring of the multicast Benes network circuitry is to produce the plurality of (e.g., consecutive) output sequences in output from a single input sequence 1402 (and thus a single load of the input sequence 1402 into the multicast Benes network circuitry, e.g., input 406 in FIG. 4). As an example, the multicast capability of the multicast Benes network circuitry thus allows the x2 element to be output two times into output sequences 1406 and 1408 for a single load of the input sequence 1402 into the multicast Benes network circuitry 1404 and not two separate loads of that input sequence 1402. In one embodiment, the instruction is to output every fourth input sample.

FIG. 15 illustrates a fractional rate filter mode for input coefficients for multicast Benes network circuitry 1504 according to embodiments of the disclosure. In certain embodiments, multicast Benes network circuitry 1504 is multicast Benes network circuitry 400 in FIG. 4, although the width of the inputs may be greater (or less) than the eight shown in FIG. 4. In one embodiment, multicast Benes network circuitry includes at least 256 inputs (e.g., of 32 bits wide for each input). In the depicted embodiment, the decoding and execution of an instruction causes multicast Benes network circuitry 1504 to be configured to a fractional rate (e.g., coefficients) filter mode, and to thus generate output 1510 of each of output coefficients sequences 1506, 1508, etc., for example, output in parallel to a single storage location (e.g., register) from the input (coefficients) sequence 1502 of c0 to cNX, where NX is the ending index (e.g., 22). In certain embodiments, the configuring of the multicast Benes network circuitry is to produce the plurality of (e.g., consecutive) output sequences in output from a single input sequence 1502 (and thus a single load of the input sequence 1502 into the multicast Benes network circuitry, e.g., input 406 in FIG. 4). As an example, the multicast capability of the multicast Benes network circuitry thus allows the c10 element to be output two times into output sequences for a single load of the input sequence 1502 into the multicast Benes network circuitry 1504 and not two separate loads of that input sequence 1502. Input sequence 1502 jumps from c07 to c10 because there is a phase change here, as well as from c015 to c18, e.g., where c00 to c07 are the first 8 taps (0:7) of phase 0; c10 to c17 are the first 8 taps (0:7) of phase 1; c20 to c27 are the first 8 taps (0:7) of phase 2; c08, c09, c010 to c015 are the second 8 taps (8:15) of phase 0; and c18, c19, c110 to c115 are the second 8 taps (8:15) of phase 1. For example, where numbering format is c[phase][tap], e.g., c010 means tap 10 of phase 0, c110 means tap 10 of phase 1, etc.

Figure 16:
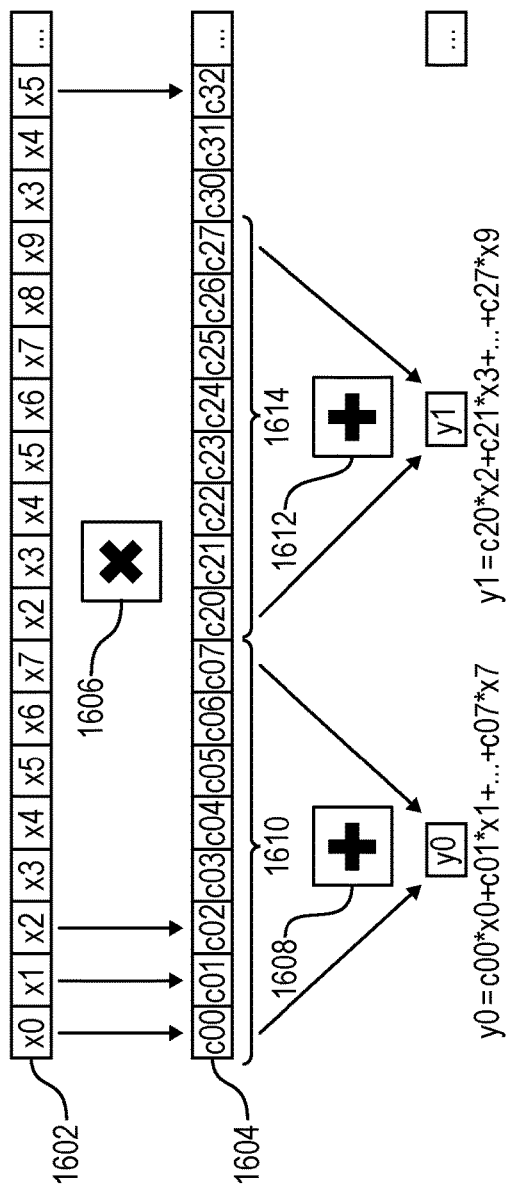
FIG. 16 illustrates a fractional rate filter operation on input samples and input coefficients from multicast Benes network circuitry according to embodiments of the disclosure.

FIG. 16 illustrates a fractional rate filter operation on input samples 1602 and input coefficients 1604 from multicast Benes network circuitry according to embodiments of the disclosure. In one embodiment, decoding and executing of a first single instruction causes the generation of the output 1410 in FIG. 14 as input samples 1602 and decoding and executing of a second single instruction causes the generation of the output 1510 in FIG. 15 input coefficients 1604. In another embodiment, decoding and executing of a single instruction causes the generation of both of the outputs in FIGS. 14 and 15 as input samples 1602 and input coefficients 1604. As depicted, elements of input samples 1602 are multiplied by respective elements of input coefficients 1604 with multiplier circuit 1606 to form a product for each element location (e.g., index), adder circuitry 1608 produces a resultant element (e.g., y0) for a first proper subset 1610 of element locations, adder circuitry 1612 produces a resultant element (e.g., y1) for a second proper subset 1614 of element locations, etc. for the entire width of the input samples 1602 and input coefficients 1604 into a packed data destination. In one embodiment, the resultant packed data is a plurality of (e.g., 32) elements (e.g., output samples y0 . . . y31) with partial sums over a plurality of (e.g., 8) coefficients. In certain embodiments, if there are more than a threshold number (e.g., 8) coefficients per phase, the partial sum is continued in the next instruction execution.

Figure 17:
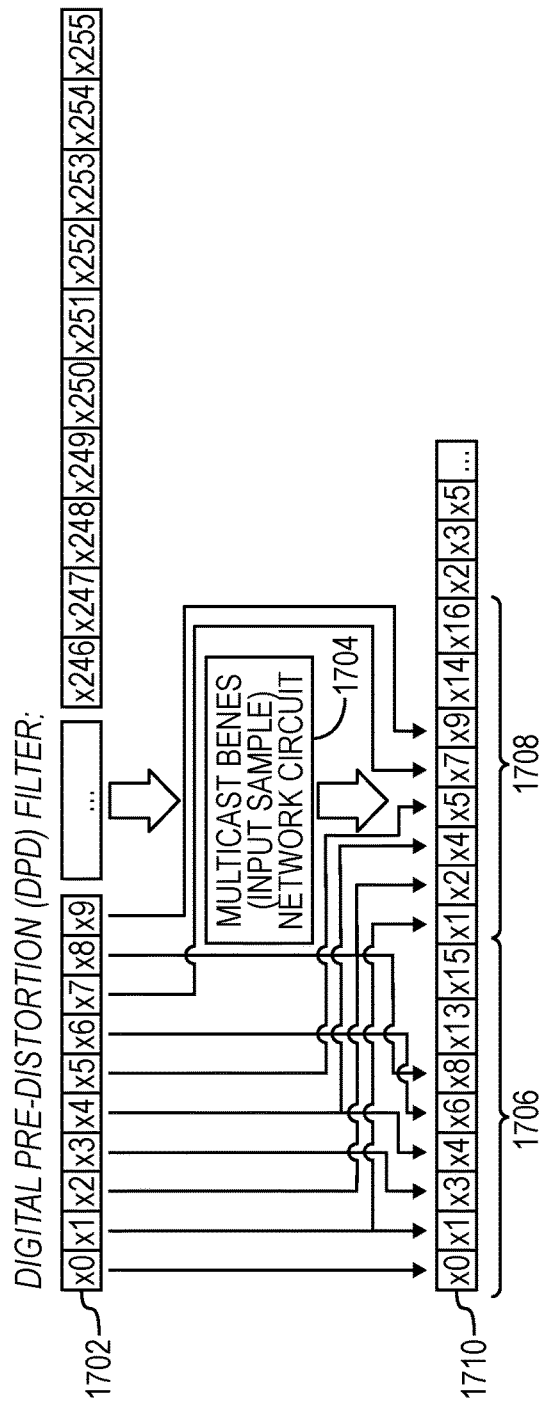
FIG. 17 illustrates a digital pre-distortion (DPD) filter mode for input samples for multicast Benes network circuitry according to embodiments of the disclosure.

FIG. 17 illustrates a digital pre-distortion (DPD) filter mode for input samples for multicast Benes network circuitry according to embodiments of the disclosure. In certain embodiments, multicast Benes network circuitry is multicast Benes network circuitry 400 in FIG. 4, although the width of the inputs may be greater (or less) than the eight shown in FIG. 4. In one embodiment, multicast Benes network circuitry includes at least 256 inputs (e.g., of 32 bits wide for each input). In the depicted embodiment, the decoding and execution of an instruction causes multicast Benes network circuitry to be configured to a digital pre-distortion (DPD) filter mode, and to thus generate output 1710 of each of output data sequences 1706, 1708, etc., for example, output in parallel to a single storage location (e.g., register) from the input (sample) sequence 1702 of x(0) to x(N), where N is the ending index (e.g., 255). In certain embodiments, the configuring of the multicast Benes network circuitry is to produce the plurality of (e.g., consecutive) output sequences in output from a single input sequence 1702 (and thus a single load of the input sequence 1702 into the multicast Benes network circuitry, e.g., input 406 in FIG. 4). As an example, the multicast capability of the multicast Benes network circuitry thus allows the x1 element to be output two times into output sequences 1706 and 1708 for a single load of the input sequence 1702 into the multicast Benes network circuitry 1704 and not two separate loads of that input sequence 1702. In one embodiment, the instruction receives an input of unevenly spaced input samples (e.g., where the corresponding coefficients (c) are nonlinear functions of the input signal).

Figure 18:
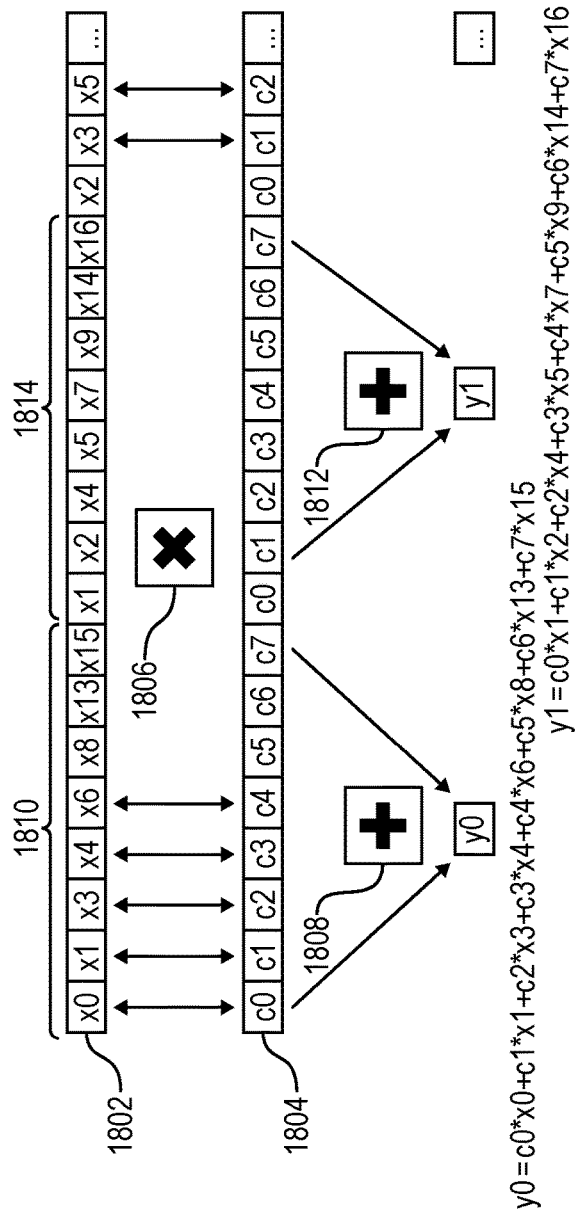
FIG. 18 illustrates a digital pre-distortion (DPD) filter operation on input samples from multicast Benes network circuitry according to embodiments of the disclosure.

FIG. 18 illustrates a digital pre-distortion (DPD) filter operation on input samples 1802 from multicast Benes network circuitry according to embodiments of the disclosure. In one embodiment, decoding and executing of a single instruction causes the generation of the output 1710 in FIG. 17 as input samples 1802. As depicted, elements of input samples 1802 are multiplied by respective elements of input coefficients 1804 (e.g., c0-c7, repeated multiple times within the packed data) with multiplier circuit 1806 to form a product for each element location (e.g., index), adder circuitry 1808 produces a resultant element (e.g., y0) for a first proper subset 1810 of element locations, adder circuitry 1812 produces a resultant element (e.g., y1) for a second proper subset 1814 of element locations, etc. for the entire width of the input samples 1802 and input coefficients 1804 into a packed data destination. In one embodiment, the resultant packed data is a plurality of (e.g., 32) elements (e.g., output samples y0, . . . , y31) with partial sums over a plurality of (e.g., 8) coefficients. In certain embodiments, if there are more than a threshold number (e.g., 8) coefficients per phase, the partial sum is continued in the next instruction execution.

Figure 19:
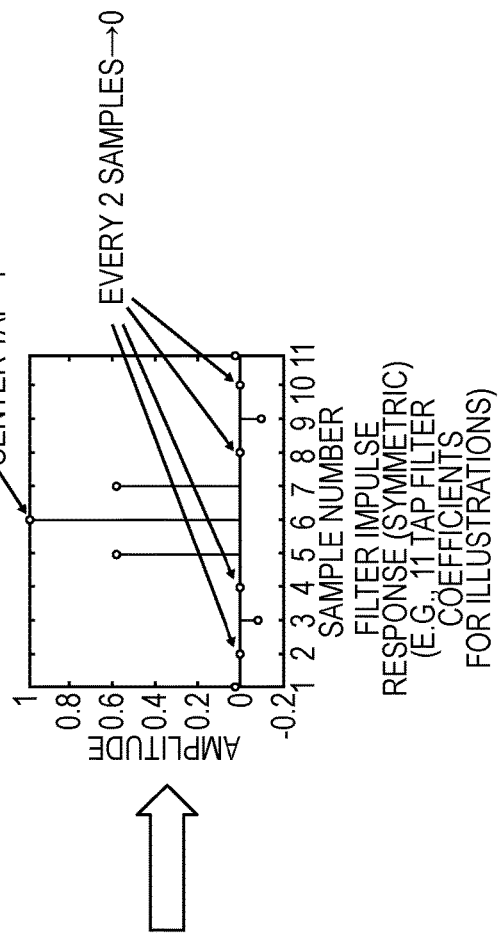
FIG. 19 illustrates a filter impulse response for magnitude versus frequency according to embodiments of the disclosure.

FIG. 19 illustrates a filter impulse response for magnitude versus frequency according to embodiments of the disclosure. The Fs indicates the sampling frequency.

Figure 20:
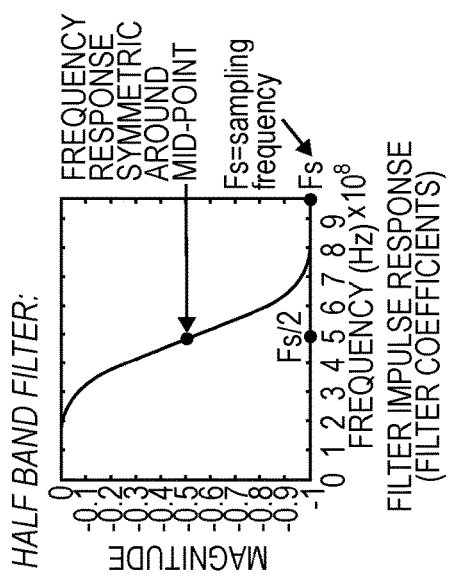
FIG. 20 illustrates a filter impulse response for amplitude versus sample number according to embodiments of the disclosure.

FIG. 20 illustrates a filter impulse response for amplitude versus sample number according to embodiments of the disclosure. In FIG. 20, every second sample away from the center tap (e.g., with a coefficient magnitude of one) has a magnitude of zero.

In certain embodiments, a FIR filter is configured as a half band decimation filter such that the input formatting from the multicast Benes network circuitry performs one of the following operations to generate data in FIR sliding window format (e.g., be execution of a single, respective instruction): 128 point (e.g., taps) rotation (e.g., even or odd rotation) and/or 16×8 sequential+16×8 reverse order sliding window generation.

Figure 21:
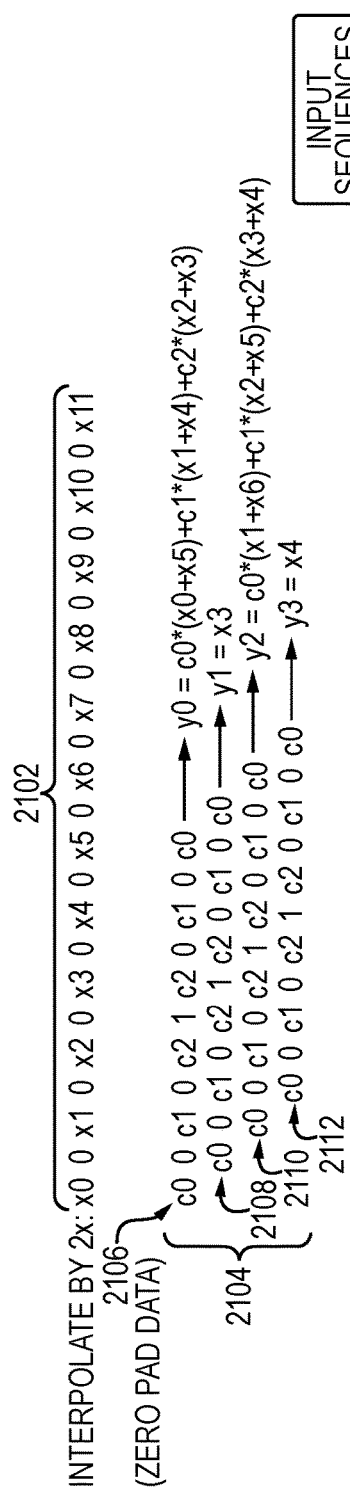
FIG. 21 illustrates a half-band filter (HBF) operation on input samples from multicast Benes network circuitry according to embodiments of the disclosure.

FIG. 21 illustrates a half-band filter (HBF) operation on input samples 2102 from multicast Benes network circuitry according to embodiments of the disclosure. In one embodiment, decoding and executing of a first single instruction causes the generation of the output 2102 as input samples and decoding and executing of a second single instruction causes the generation of the output 2104 as input coefficients. In another embodiment, decoding and executing of a single instruction causes the generation of both of the input samples 2102 and input coefficients 2104. As depicted, elements of input samples 2102 are multiplied by respective elements of input coefficients 2104 with a multiplier circuit to form a product for each element location (e.g., index), adder circuitry produces a resultant element (e.g., y0) for a first proper subset 2106 of element locations, a resultant element (e.g., y1) for a second proper subset 2108 of element locations, a resultant element (e.g., y2) for a third proper subset 2110 of element locations, and a resultant element (e.g., y3) for a fourth proper subset 2112 of element locations, etc. for the entire width of the input samples 2102 and input coefficients 2104 into a packed data destination. In one embodiment, the resultant packed data is a plurality of (e.g., 32) elements (e.g., output samples y0 . . . y31) with partial sums over a plurality of (e.g., 8) coefficients. In certain embodiments, if there are more than a threshold number (e.g., 8) coefficients per phase, the partial sum is continued in the next instruction execution.

Figure 22:
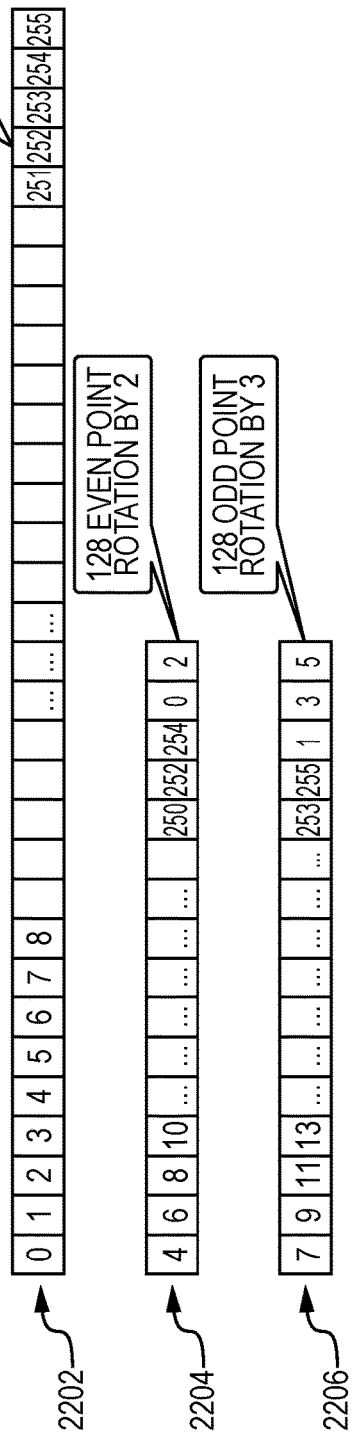
FIG. 22 illustrates an even half-band decimation input formatting mode and an odd half-band decimation input formatting mode for input samples for multicast Benes network circuitry according to embodiments of the disclosure.

FIG. 22 illustrates an even half-band decimation input formatting mode and an odd half-band decimation input formatting mode for input samples 2202 for multicast Benes network circuitry according to embodiments of the disclosure. In certain embodiments, multicast Benes network circuitry is multicast Benes network circuitry 400 in FIG. 4, although the width of the inputs may be greater (or less) than the eight shown in FIG. 4. In one embodiment, multicast Benes network circuitry includes at least 256 inputs (e.g., of 32 bits wide for each input).

In one embodiment, the decoding and execution of an instruction causes multicast Benes network circuitry to be configured to an even half-band decimation input formatting mode, and to thus generate output 2204 where the even (e.g., 0, 2, 4, 6, etc.) indexed elements of input samples 2202 are selected and rotated to the left by two element positions.

In one embodiment, the decoding and execution of an instruction causes multicast Benes network circuitry to be configured to an odd half-band decimation input formatting mode, and to thus generate output 2206 where the odd (e.g., 1, 3, 5, 7, etc.) indexed elements of input samples 2202 are selected and rotated to the left by three element positions.

Figure 23:
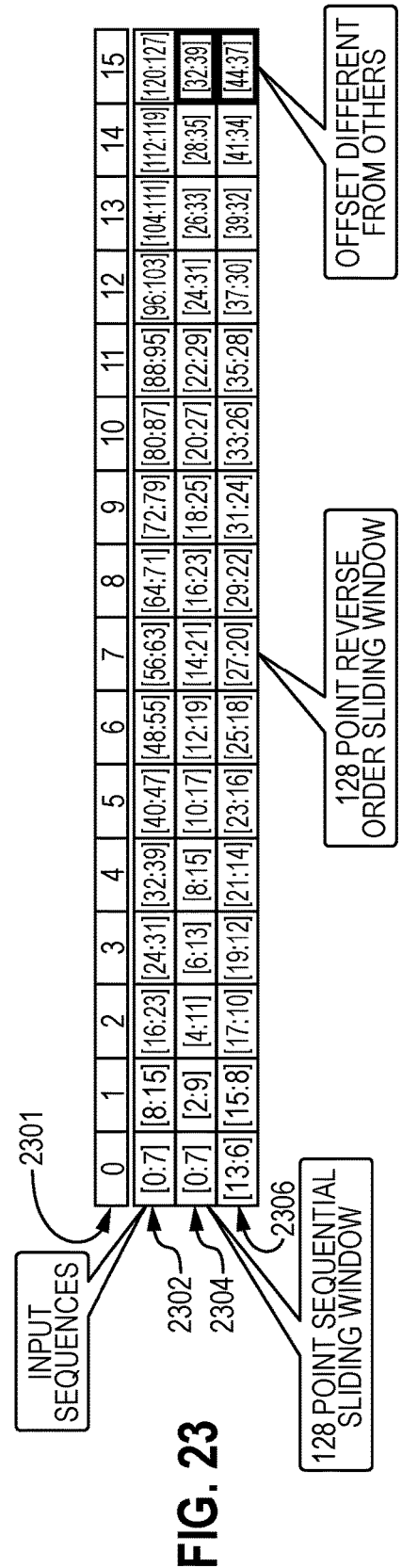
FIG. 23 illustrates a half-band decimation input formatting mode with sequential and reverse order sliding windows for input samples for multicast Benes network circuitry according to embodiments of the disclosure.

FIG. 23 illustrates a half-band decimation input formatting mode with sequential and reverse order sliding windows for input samples 2302 (with corresponding indices 2301) for multicast Benes network circuitry according to embodiments of the disclosure.

In certain embodiments, multicast Benes network circuitry is multicast Benes network circuitry 400 in FIG. 4, although the width of the inputs may be greater (or less) than the eight shown in FIG. 4. In one embodiment, multicast Benes network circuitry includes at least 256 inputs (e.g., of 32 bits wide for each input).

In one embodiment, the decoding and execution of an instruction causes multicast Benes network circuitry to be configured to an even half-band decimation input formatting mode with a sequential sliding window, and to thus generate output 2304 where each element (other than the initial element index 0) begins two bits to the right of the previous element (e.g., element 1 being bits 2:9, element 2 being bits 4:11, etc.) except the last element is different than the others (e.g., it begins four bits to the right of the previous element).

In one embodiment, the decoding and execution of an instruction causes multicast Benes network circuitry to be configured to an odd half-band decimation input formatting mode with a reverse order sliding window, and to thus generate output 2306 where each element begins two bits to the right of the previous element (e.g., element 0 being bits 13:6, element 1 being bits 15:8, etc.) except the last element is different than the others (e.g., it begins three bits to the right of the previous element).

FIG. 24 illustrates a formatting mode for real number sliding windows for input coefficients 2402 (with corresponding indices 2401) and a formatting mode for complex number sliding windows for input coefficients 2402 (with corresponding indices 2401) for multicast Benes network circuitry according to embodiments of the disclosure. In certain embodiments, multicast Benes network circuitry is multicast Benes network circuitry 400 in FIG. 4, although the width of the inputs may be greater (or less) than the eight shown in FIG. 4. In one embodiment, multicast Benes network circuitry includes at least 256 inputs (e.g., of 32 bits wide for each input).

In one embodiment, the decoding and execution of an instruction causes multicast Benes network circuitry to be configured to a formatting mode for real number sliding windows for input coefficients, and to thus generate output 2404 where each element (other than the initial element index 0) begins two bits to the right of the previous element (e.g., element 1 being bits 2:9, element 2 being bits 4:11, etc.) including the last element.

In one embodiment, the decoding and execution of an instruction causes multicast Benes network circuitry to be configured to a formatting mode for complex filter coefficients which, for the same data input 2402 (e.g., and the assistance of fixed wiring), generates outputs 2406A and 2406B with half of a windowing size.

In one embodiment, the decoding and execution of an instruction causes multicast Benes network circuitry to be configured to a formatting mode for complex number sliding windows for input coefficients 2402, and to thus generate output 2406 with a real component 2406A and an imaginary component 2406B.

FIG. 25 illustrates pseudocode 2500 for multi-rate filter chains to be performed on multicast Benes network circuitry according to embodiments of the disclosure. HBF1 indicates a first filter mode (e.g., half band filter (HBF) 1) and HBF2 indicates a second filter mode (e.g., half band filter (HBF) 2). In FIG. 25, HBF1 includes six inputs (e.g., taps 2601A-2601F in FIG. 26) and HBF2 includes three inputs (e.g., taps 2601A-2601C in FIG. 26). Two calls (e.g., two requests to decode and execute an instruction disclosed herein) for each closed herein. FIG. 26 illustrates that an embodiment of an instruction that configures multicast Benes network circuitry as disclosed herein allows changing of the mode (or other control data) of the multicast Benes network circuitry without exiting the software loop.

To generate the control bits in real time, certain embodiments herein decompose this into 3 steps. Note that in certain embodiments, a butterfly circuit of multicast Benes network circuitry is used for implementing certain instructions discussed herein. The details of control bit generation are quite involved. For clarity, only a brief summary with an example of 8 sequences of 16 samples each and window size of 16 is shown below. For more detailed examples, please see the discussion of FIGS. 27A-34 below.

Figure 27A:
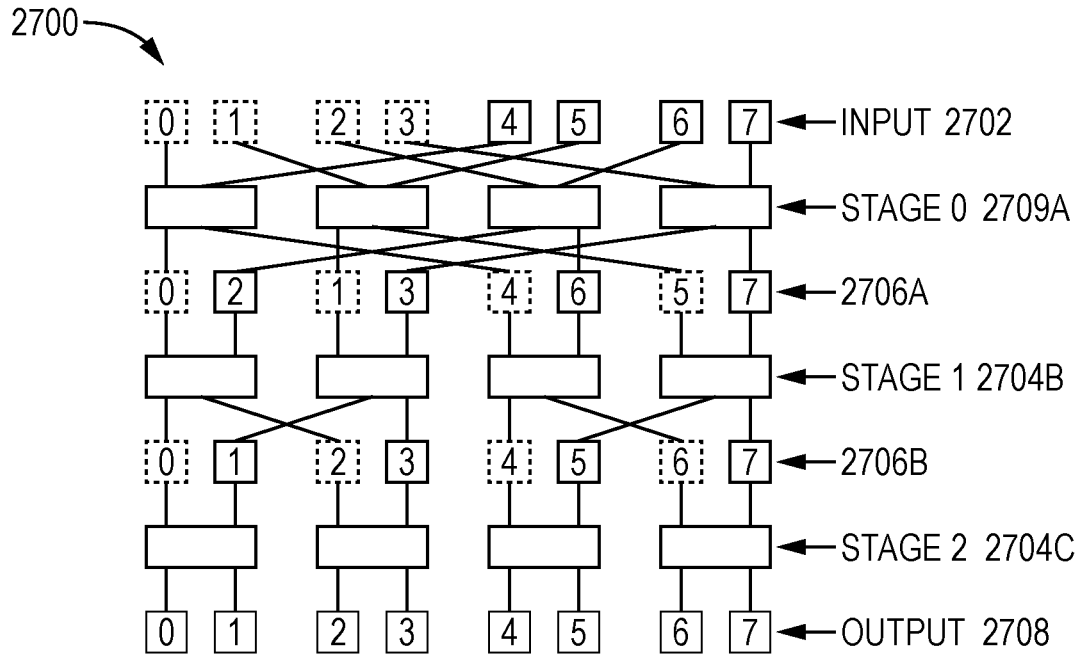
FIG. 27A illustrates a butterfly circuit according to embodiments of the disclosure.

Example Step 1) Coarse selection and cloning to select and clone data needed in a window: stages 0 and 1 (e.g., see stages 0 and 1 in FIG. 27A). In one embodiment, 16 switches are grouped together in this step so that all switches in a group use the same 2 control bits. So, a 128-input butterfly circuit becomes an equivalent 8-input butterfly circuit (with 4 switches per stage). Align the processing such that there are 4 possible "coarse offsets"—32 samples beginning from one of them will contain all 16 samples needed for all 8 functions (with their starting offsets all falling in the 16 sample window). Based on this, set up switch control bits (e.g., C0 and C1) as follows to clone 4 copies of the needed 32 samples (note the C0 and C1 inputs in FIG. 6):

```
C1[0][0:3] = '1111'; // stage0, switches 0,1,2,3: broadcast for all switches in stages 0.
C1[1][0:3] = '1111'; // stage1, switches 0,1,2,3: also broadcast for all switches in stages 1.
//now set up C0 if (stage==0 )
if (coarse offset t==0, 1 or 2)
    C0[0][0:3]='0000'; // always broadcast the left input, i.e., all C0 bits=0
else if (coarse offset t==3) {
    C0[0][0:3]='0001'; //broadcast the left input except for C0[0]
if (stage==1)
    if (t==0) C0[1][0:3] = '0000'; // broadcast the left input,
    else if (t==1) C0[1][0:3] = '0101'; //mixed
    else if (t==2) C0[1][0:3] = '1111'; // broadcast the right input
    else if (t==3) C0[1][0:3] = '1010'; //mixed
```

Example step 2) Fine selection at stage2. For each of the 4 sets of 32 samples from step 1 in this example, next is the generation of 2 sequences of 16 samples with starting offset k0 and k1. The pseudocode to generate the control bits for each block (32 samples, or 16 switches) is as follows:

```
if (t==0 or t==2) { //even coarse offset
    for each switch position i, (0=< i <15)
        if ( i < min(k0,k1)) (C1[2][i], C0[2][i]) = (1, 1). // broadcast the right input
        else if (min (k0, k1) ≤ i ≤ max (k0, k1)) (C1[2][i], C0[2][i]) = (0, (i < k0))
            // swap if (1 < k0),
        else pass through else if ( max (k0, k1)< i ) (C1[2][i], C0[2][i] )
            = (1, 0); // broadcast the left input
} else if (t==1 or t==3) { //odd coarse offset
    C1[2], C0[2]: reverse the left/right input selection rule in even
        coarse offset case above;
}
``` of HBF1 and HBF2 are illustrated, although a single or other plurality of calls may be made for each.

FIG. 26 illustrates input taps and output stages for the multi-rate filter chains pseudocode of FIG. 25 performed on multicast Benes network circuitry according to embodiments of the disclosure. In FIG. 26, each call is an instruction call in certain embodiments, e.g., an instruction dis- Example Step 3) Per segment Rotation: stages 3-6. The samples in each of the resultant sequences from step 2 are out of order in this embodiment. Each of 8 sequences of 16 samples in this embodiment are to be rotated by an amount equal to its offset value. This rotation step can be accomplished using multiple stages of multicast Benes network circuitry (e.g., a butterfly circuit thereof).

In digital signal processing, an operation may involve computing a sum of products of data signal values multiplied by filter coefficients. For a system with fixed coefficients and sequential input data, such as a linear time invariant system, the product takes the form:

$$y(n) = \sum_{l=0}^{L-1} c(l) * x(n+l)$$

where L is the length of the filter.

In a more general case, e.g., a time varying system, the coefficients may be different for each output sample:

$$\sum_{l=0}^{L-1} c(n,l) * x(n+l)$$

To compute this as one operation, the multiplier needs 2 sets of inputs (coefficients (c) and input data (x)):

$c(n,l), l=0,\ldots,L-1$, and $x(l), l=n,\ldots,n+L-1$.

Certain embodiments of circuitry herein allow for multiple outputs to be computed at the same time. To generate M outputs, $y(n), n=0,\ldots,M-1$, the circuitry uses M*L coefficients and M+L−1 input values:

$c(n,l), l=0,\ldots,L-1, n=0,\ldots,M-1$, and $x(l), l=0,\ldots,M+L-2$.

Furthermore, in certain embodiments, the coefficients and input signal values must be ordered to match the arrangement of the multipliers (e.g., multiplier circuits) in the circuitry (e.g., multicast Benes network circuitry of a processor). For example, if the multipliers are arranged so that adjacent products are added to compute an output sample, the data for the first output sample will be grouped together, followed by the data for the second sample, etc.:

$c(0,0),\ldots,c(0,L-1),\ldots,c(M-1,0),\ldots,c(M-1,L-1)$ $x(0),\ldots,x(L-1),x(1),\ldots,x(L),\ldots,x(M-1),\ldots,x(M+L-2)$.

In particular, note that some input signal values (x) are duplicated as part of the ordering.

A further important feature of such circuitry allows for the input data in the sum of products to be non-consecutive. For example, this may happen when (e.g., for efficiency purposes) only the most important terms of the sum are actually computed in certain embodiments. The product will then take the following form (e.g., for a different value L):

$$y(n) = \sum_{l=0}^{L-1} c(n,l) * x(n+k(l))$$

The pattern of the coefficients will look the same as before. The input data is now determined by a set of offsets corresponding to each coefficient, with some allowed span:

$k(0),\ldots,k(L-1)$, where $0 \leq k(l) \leq K$

The input data input array becomes (equation (A)):

$x(k(0)),\ldots,x(k(L-1)),x(1+k(0)),\ldots,x(1+k(L-1)),\ldots,x(M-1+k(0)),\ldots,x(M-1+k(L-1))$.

One way to achieve this arrangement is to have a set of multiplexers that allow any input value in some input range $x(l), l=0,\ldots,N-1, (N \geq M+K-1)$, to be routed to any multiplier. For a large amount of data this will be very costly in hardware resources, both in wiring and switching logic circuitry.

Certain embodiments herein provide for an efficient way of duplicating and reordering the input data to match this format, for an arbitrary sequence of offsets $k(0),\ldots,k(L-1)$, where the offsets satisfy the restrictions $0 \leq k(l) \leq K$ for some maximum allowable range K, but are otherwise unconstrained (in particular, duplication is allowed).

The following describes an embodiment of a circuit which efficiently computes the duplication and ordering of the input data in several steps. The first steps in this embodiment perform a set of cloning and rotation operations to get a transposed version of the desired input, using a butterfly circuit with a series of stages, some with multicast capability. The final step in this embodiment reorders the data with an L-way interleaving operation. The below begins by describing the steps of the data manipulation. This is followed by a description of the circuits used to implement these steps. Then, it addresses the details used to efficiently control these circuits in real time for a given set of input offset values $k(l)$.

Data Manipulation

The desired data array shown in Equation (A) can be perceived as a matrix with M rows and L columns, as shown here:

$$\begin{bmatrix} x(0+k(0)), x(0+k(1)), \ldots, x(0+k(L-1)) \\ x(1+k(0)), x(1+k(1)), \ldots, x(1+k(L-1)) \\ \ldots \ldots \\ x(M-1+k(0)), x(M-1+k(1)), \ldots, x(M-1+k(L-1)) \end{bmatrix}$$

Transpose this matrix to obtain the following array of data (equation (B)):

$x(k(0)),\ldots,x(M-1+k(0)),x(k(1)),\ldots,x(M-1+k(1)),\ldots,x(k(L-1)),\ldots,x(M-1+k(L-1))$.

In matrix form this becomes:

$$\begin{bmatrix} x(0+k(0)), x(1+k(0)), \ldots, x(M-1+k(0)) \\ x(0+k(1)), x(1+k(1)), \ldots, x(M-1+k(1)) \\ \ldots \ldots \\ x(0+k(L-1)), x(1+k(L-1)), \ldots, x(M-1+k(L-1)) \end{bmatrix}$$

With this arrangement, the rows represent L sets of data, each in sequential order, with a programmable offset for its starting point. In certain embodiments, these sets will be easier to derive in this form. The final sequence of Equation (A) is then obtained by a mapping using (e.g., fixed) wiring that is independent of the offsets.

Parameter considerations: as one example, consider a processor architecture in which a multiplier array has a length M*L, so presenting a total of M*L elements to the multipliers. Also assume an input vector of length N=M*L from which the L data sets will be selected. Thus, the data transformation will have input and output size of N=M*L. Further assume that N, M and L are each a power of 2, such that N=2n, M=2m, L=2l. Since processing M samples at a time, assume a granularity of the input sample selection of M samples. The total number of samples to select from is M+K in this example. If assuming that K≤M, then use an input window of length 2M, starting at an offset that is a multiple of M.

With this framework, the problem is now described as follows: start with an input array of N=M*L samples, x(0), x(1), . . . , x(N−1), have a coarse selection of 2M input samples, starting at offset I*M. That is, selecting all of the samples from the set: x(1M), x(1M+1), . . . , x(1M+2M−1), have a fine selection of the L sets of M samples each according to the selection offset parameters k(0), k(1), . . . , k(L−1), and provide an L-way interleave to perform the transpose of Equation (B) to Equation (A).

Under the assumptions above, embodiments herein can accomplish the desired transformation with the following steps: apply the N data samples to the input of a circuit with N inputs and N outputs (in one embodiment, this circuit includes multicast Benes network circuitry, e.g., with both multicast and standard (unicast) stages), in the first l-1 stages of the network, make L/2 copies of the 2M samples (N samples total) starting at offset IM (e.g., this is the coarse select and clone operation), in the next stage of the network, from each set of 2M samples, create 2 subsets, each of length M, each containing the desired samples for the fine selection offsets, in the next m stages, rotate each of the M length sequences to get the samples in the required order, and perform the L-way interleave to generate the data according to Equation (A).

The first l stages require multicast capability in certain embodiments because samples are being duplicated at each stage. In certain embodiments, the final m stages are a simple rotation, e.g., which only use unicast capability of a butterfly (or inverse butterfly) circuit. A transpose operation to get the final output sequence is done with fixed wiring that is independent of the coarse and fine offset values, and thus does not need programmability.

In certain embodiments, multicast Benes network circuitry includes multiple stages with multicast (e.g., all stages or less than all stages including multicast). Certain embodiments herein of a processor include multicast Benes network circuitry with N inputs and N outputs, where the outputs are subsets, with duplication, of the inputs. An N×N crossbar switch that can connect any input to any output may be used, but is very costly to implement in certain embodiments. As an alternative, this disclosure describes a network consisting of a butterfly circuit with n=m+l stages (e.g., which may be followed by a fixed interleave network). Certain embodiments herein assume that some stages of the multicast Benes network circuitry have multicast capability.

FIG. 27A illustrates a butterfly circuit 2700 according to embodiments of the disclosure. Butterfly circuit 2700 is a three-stage butterfly circuit with 8 inputs and 8 outputs. At each stage, pairs of inputs are routed to a switch. In a non-multicast butterfly circuit, each switch can either pass the inputs straight through or swap them (e.g., as discussed above in reference to FIG. 5). In a multicast switch, there is an additional capability of broadcasting either one of the inputs to both of the outputs (e.g., as discussed above in reference to FIG. 5). The nodes are labeled with the flow of data obtained if all switches are in a straight pass-through mode. From this figure, it is seen that in depicted stage 0 2704A, there is the ability to swap data elements with spacing of 4, that is, the element location (e.g., index) pairs 0 & 4, 1 & 5, 2 & 6, and 3 & 7. In depicted stage 1 2704B, there is the ability to swap elements with spacing 2, and in the third (final) depicted stage 2704C, there is the ability to swap adjacent elements.

Figure 27B:
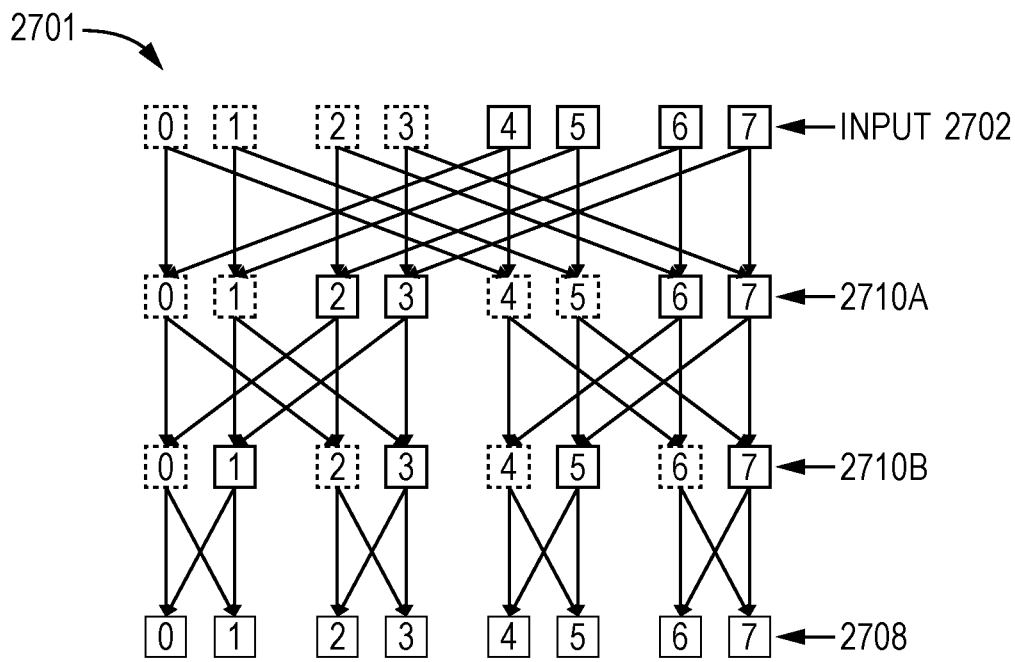
FIG. 27B illustrates a logical diagram of the butterfly circuit of FIG. 27A according to embodiments of the disclosure.

FIG. 27B illustrates a logical diagram 2701 of the butterfly circuit of FIG. 27A according to embodiments of the disclosure. Logical diagram 2701 shows the same data paths, but without explicitly showing the switches. Thus, FIG. 27A, for example, explicitly depicts that the 4 nodes of stage 0 containing the 0 & 4 pair form a single switch element, but this is implied in FIG. 27B. As discussed in reference to FIG. 6 above, using a multicast switch allows four possible switch settings: pass-through each input to a respective output, swap the inputs onto the outputs (e.g., permute), broadcast to both outputs of left input, or broadcast to both outputs of right input. Two (respective) control bits (e.g., C0, C1) can specify which of these four combinations to apply for each switch.

Coarse Selection

Turning now to FIGS. 28-31, embodiments are described for performing a coarse selection of 2M samples, and creating L/2 copies of them. This is illustrated with an example where L=8, l=3. Leave M unspecified for now (e.g., but still a power of 2), each group of M samples is illustrated by a single block in FIGS. 28-34. The input vector contains L*M samples, and so here 8 blocks of M samples each, and select 2 adjacent blocks of size M and make L/2=4 copies, in l−1=2 stages of multicast Benes network circuitry (e.g., a butterfly circuit thereof) with 8M inputs and 8M outputs.

FIG. 28 illustrates performing a two sample, coarse offset of zero with cloning on the butterfly circuit of FIG. 27A according to embodiments of the disclosure. In FIG. 28, an input vector is cloned starting at coarse offset 0, e.g., it clones 4 copies of blocks 0 and 1 as all stage 1 outputs. These operations use the multicast capability of the butterfly switches. Refer to the logical view of the butterfly circuit in FIG. 27B to view how the routing is performed. In depicted stage 0, the elements of block (e.g., index) 0 are written to both blocks 0 and 4, the elements of block 1 are written to both blocks 1 and 5. Blocks 2 and 3 are depicted going to blocks 2, 6 and 3, 7, but these will be overwritten in stage 1. In stage 1, the broadcasting is done in each 4 block subnetwork. Referring to FIGS. 27A and 27B, it is seen that in stage 1 the switches operate on nodes with spacing of 1. So block 0 goes to blocks 0 and 2, block 1 goes to blocks 1 and 3, block 4 (containing a copy of the original 0) goes to blocks 4 and 6, while block 5 is copied to both blocks 5 and 7, completing the 4 copy clone.

FIG. 29 illustrates performing a two sample, coarse offset of two with cloning on the butterfly circuit of FIG. 27A according to embodiments of the disclosure. In FIG. 29, an input vector is cloned starting at coarse offset 2, e.g., it clones 4 copies of blocks 2 and 3 as all stage 1 outputs. These operations use the multicast capability of the butterfly switches. Refer to the logical view of the butterfly circuit in FIG. 27B to view how the routing is performed.

FIGS. 30-31 show examples in which the order of the output blocks is reversed, with offset 1 to clone blocks 1 and 2, and offset 3 to clone blocks 3 and 4. In these embodiments, any odd offset will exhibit this block (e.g., element) reversal. The ensuing discussion illustrates how this affects the creation of the final 8 sets of blocks.

FIG. 30 illustrates performing a two sample, coarse offset of one with cloning and reversal on the butterfly circuit of FIG. 27A according to embodiments of the disclosure. In FIG. 30, an input vector is cloned starting at coarse offset 1, e.g., it clones 4 copies of blocks 1 and 2 as all stage 1 outputs, but in reverse order (block 2 followed by block 1).

These operations use the multicast capability of the butterfly switches. Refer to the logical view of the butterfly circuit in FIG. 27B to view how the routing is performed.

FIG. 31 illustrates performing a two sample, coarse offset of three with cloning and reversal on the butterfly circuit of FIG. 27A according to embodiments of the disclosure. In FIG. 30, an input vector is cloned starting at coarse offset 3, e.g., it clones 4 copies of blocks 3 and 4 as all stage 1 outputs, but in reverse order (block 4 followed by block 3). These operations use the multicast capability of the butterfly switches. Refer to the logical view of the butterfly circuit in FIG. 27B to view how the routing is performed.

Multicast Benes network circuitry (e.g., a butterfly circuit and/or inverse butterfly circuit thereof) may perform many types of data manipulations, but in some cases the complexity of generating the control bits is too high to perform in real time. In order for the sequence extraction to be truly programmable, in certain embodiments it may be necessary to be able to compute the control bits for a given set of offsets in real time. For example, for a coarse select and clone, all multicast switches will have the multicast bit C1 set for both stages 0 and 1 and the control bit C0 will depend on the value of the coarse offset I. In this example, for stage 0, for I=0, 1, 2, always broadcast the left input, so the control bits C0 for each switch are cleared to 0. In this example, for stage 1, for I=0 again broadcast the left input, with C0=0, while for I=2 broadcast the right input, with C0=1. In this example, for stage 1 and I=1, have a mix of right and left broadcasts, R, L, R, L, e.g., 1 0 1 0 (ordered left to right). As a binary integer with least significant bit (lsb) on the right, denote C0=0101, as per the disclosure below.

The pseudo code below for setting the multicast switches indicates by a single bit a block of M bits. C1[s], C0[s] that represent integers where each bit is a switch value for a block of M switches for stage s. In this code, note that in some embodiments the least significant bit (lsb) is on the left, while in the bit maps in FIGS. 32-34 the lsb is on the right. Thus, in this example:

```
C1 [0] = 1 1 1 1;        //all switches multicast for stage 0, i.e., the 0 in [0].
C1 [1] = 1 1 1 1;        //all switches multicast for stage 1, i.e., the 1 in [1].
b0 = (I>>0)&0x1;         // bit 0 of coarse offset I.
b1 = (I>>1)&0x1;         // bit 1 of coarse offset I.
b2 = (I>>2)&0x1;         // bit 2 of coarse offset I.
C0 [0] = (b1&b0)         ? 0 0 1 1 : 0 0 0 0
C0 [0] |= (b2)           ? 1 1 1 1 : 0 0 0 0
C0 [1] = (b0)            ? 0 1 0 1 : 0 0 0 0
C0 [1] ^= (b1)           ? 1 1 1 1 : 0 0 0 0
For example, for I=1, b0 = 1, b1 = b2 = 0. So C0 [0] = 0 0 0 0, C0 [1] = 0 1 0 1, as noted previously.
```

Fine Selection

Turning now to FIGS. 32-34, embodiments are described for performing a fine selection, e.g., after a coarse selection has been performed. In one embodiment (e.g., as discussed in reference to FIGS. 28-31), a coarse select and clone operation has created 4 copies of 2M samples each. In certain embodiments, a fine selection selects 2 sets of M samples each from each block of 2M samples. In one embodiment, a plurality of (e.g., four) identical subnetworks of the butterfly are used, so the following discusses the operation of a single subnetwork of 2M inputs and 2M outputs. In order to better illustrate, next consider the case where M=16, number of stages (m)=4. Thus selecting 8 sets of 16 samples each, for a total of 128 samples, for this illustration.

Thus, in one embodiment, for each block of 32 samples, the circuitry is to generate 2 sets of 16 samples, each with its own offset. Where it is assumed that K≤M, the total span is contained in the block of 32 samples. This means that in this example, for any choice of offset, the 16 desired samples will be among the 32 samples of the block and since certain embodiments have multicast capability, they can create 2 such sequences.

FIG. 32 illustrates performing a coarse offset of two and fine offsets of three and seven with cloning on the butterfly circuit of FIG. 27A according to embodiments of the disclosure. In FIG. 32, the coarse select of 2 means that blocks 2 and 3 cloned, and since each block contains 16 samples, there are now samples 32-63. The fine select offsets of 3 and 7 mean that sequences 35-50 and 39-54 are to be created. The first step of the fine select will result in each 16 sample subnetwork containing a rotated version of the desired sequence, as shown.

FIG. 32 depicts the first stage of a butterfly circuit with 32 inputs and 32 outputs (e.g., stage 0 of the 32 element subnetwork, stage 2 of the larger 128 element network). Referring to the logical view (e.g., from FIG. 27B), each input is connected to the output directly below it, as well as to one output that is 16 samples away. So, for example, input 39 is connected to outputs 39 and 55. In the depicted embodiment, the blocks marked by dotted line boxes are passed through to the output with no duplication, the blocks marked in bold line boxes are broadcast to both possible outputs, and the blocks marked in non-bold line boxes are blocked. To see that this may be done, observe that in this embodiment: each input is used 0, 1, or 2 times in the output. Since the sequence is continuous and of length 16, if an input k is used, then it is known that the input values k+16 and k−16 are not used in this embodiment, and thus when broadcasting to duplicate a sample, the sample blocked will not be missed. For the same reason, if an input k is not used, then it is known that input k+16 or k−16 must be used in certain embodiments. If not, say neither k nor k+16 are used, there would be no way to construct a set of 16 continuous samples from the 32 in this embodiment. From this it follows that for every output position, in certain embodiments, it must take either the input directly above or else an input 16 samples away, so that the butterfly circuit is able to supply all the needed outputs.

As further examples: sample 35 is used in the first sequence (e.g., the 16 blocks on the left), but not in the second, so it is copied once to the output below. This means that the switch controlling the pair 35, 51 will do a pass-through operation on each element. Sample 39 is used in both output sequences. This means that the maximum possible upper limit of either sequence is 39+15=54. This means that it can broadcast 16 samples away to output position 55, blocking input 55, knowing that input 55 is not needed by either output sequence. Sample 55 is used by neither sequence, and output position 55 is filled by the broadcast from sample 39.

FIG. 33 illustrates performing a coarse offset of one and fine offsets of three and seven with cloning and reversal on the butterfly circuit of FIG. 27A according to embodiments of the disclosure. FIG. 33 illustrates the same procedure as in FIG. 32, but with coarse offset 1. The odd coarse offset gives a reversed order for the stage 2 input. With fine select values 3 and 7, sequences 19-34 and 23-38 are sought. Note that in this embodiment, the inputs marked by dotted line boxes are swapped rather than passed through, inputs marked by bold line boxes are broadcast, and the inputs marked by non-bold line boxes are blocked.

FIG. 34 illustrates performing a coarse offset of two and fine offsets of seven and three with cloning on the butterfly circuit of FIG. 27A according to embodiments of the disclosure.

Certain embodiments utilize the following for the setting of control bits for switches in each multicast Benes network circuit (e.g., 32 input and 32 output circuit). In one embodiment, the multicast Benes network circuit includes 2 banks of 16 elements each, which are referred to herein as the left bank (first 16 inputs/outputs) and the right bank (second 16 inputs/outputs). In the examples in FIGS. 32-33 above, the left bank of outputs contains the rotated sequence with offset 3, and the right bank the sequence with offset 7. Within each bank, assign a label l from 0 to 15.

For the case of an even coarse offset (see FIG. 32) in certain embodiments: an output element with label l<offset will take its input from the right bank. For example, in FIG. 32, the first 3 left outputs 48, 49, 50 and the first 7 right outputs 48-54 come from the right bank. In FIG. 34 below, the first 7 left outputs 48-54 and the first 3 right outputs 48-50 come from the right bank.

In certain embodiments, an output element with label l≥offset will take its input from the left bank. In FIG. 32, the left outputs 35-47 and the right outputs 39-47 come from the left bank. In FIG. 34, the left outputs 39-47 and the right outputs 35-47 come from the left bank.

The following describes this in terms of multicast switches. Note that the inputs and outputs from both banks with the same label are controlled by the same switch in certain embodiments. Thus, the below uses the label l to indicate a switch. It is assumed that the left and right offsets are labeled k0 and k1, respectively. In certain embodiments: for a switch with label l<min (k0, k1), both outputs with label l are coming from the right bank. This means the right bank input is broadcast to both outputs, with control bits (C1, C0)=(1, 1). For a switch with label such that min (k0, k1)≤l≤max (k0, k1), the input goes only to a single output, no broadcast, and swap if (1<k0), else pass through. The control bits are (C1, C0)=(0, (1<k0)). For a switch with label such that max (k0, k1)<l, broadcast the left input, with control bits (C1, C0)=(1, 0).

For the case of an odd offset (see FIG. 33): an output element with label l<offset will take its input from the left bank in certain embodiments. For example, in FIG. 33, the first 3 left outputs 32, 33, 34 and the first 7 right outputs 32-38 come from the left bank. An output element with label l≥offset will take its input from the right bank in certain embodiments. In FIG. 33, the left outputs 19-31 and the right outputs 23-31 come from the right bank.

The resulting switch settings in certain embodiments are: for a switch with label l<min (k0, k1), the left bank input is broadcast to both outputs, with control bits (C1, C0)=(1, 0). For a switch with label such that min (k0, k1)≤l≤max (k0, k1) the input goes only to a single output, no broadcast, and pass through if (l<k0), else swap. The control bits are (C1, C0)=(0, (l≥k0)). For a switch with label such that max (k0, k1)<l broadcast the right input, with control bits (C1, C0)=(1, 1).

The above discussed control bit generation is summarized by the following pseudocode. The below uses D0, D1, D2, C0, C1 to denote 16 bit integers, with each bit of C0, C1 corresponding to the control bits of the 16 switches and illustrates each operation for the case of FIG. 32. Note that the integers are presented with the least significant bit (lsb) on the right, but the switches in the diagrams are presented with the lsb on the left.

```
D0 = (1<< (k0)) -1;   // k0 = 3, D0 = 0000 0000 0000 0111
D1 = (1<< (k1)) -1;   // k1 = 7, D1 = 0000 0000 0111 1111
if (Coarse Offset is odd) {D0 = ~D0; D1 = ~D1; }   // Coarse offset is even.
C0 = D0;              // C0 = 0000 0000 0000 0111
C1 = ~(D0 ^ D1);      // C1 = 1111 1111 1000 0111
```

Rotation

In FIGS. 32-34 it is observed that the 2 output sequences are obtained, but each is rotated by an amount equal to the offset value. In certain embodiments, the next step of the fine selection is to rotate each of the 8 output sequences of length 16. In certain embodiments, multicast Benes network circuitry includes a plurality (e.g., 8) of parallel butterfly circuits, for example, each with 16 inputs and 16 outputs, and each a butterfly circuit with 4 stages. With these 4 stages, each sequence may be rotated independently to obtain the transposed output of Equation (B). In one embodiment, this rotation step is accomplished using a butterfly circuit with multicast (e.g., or just unicast) capability. In certain embodiments, a transpose operation is done using an interleaving operation to achieve the results from equation (A). In one embodiment, the processor is any of the processors discussed below.

At least some embodiments of the disclosed technologies can be described in view of the following examples:

Example 1. A processor comprising:
a decoder to decode a single instruction into a decoded single instruction, the single instruction having fields that identify packed input data, packed control data, and a packed data destination; and
an execution unit to execute the decoded single instruction to:
  send the packed control data to respective control inputs of a circuit that comprises an inverse butterfly circuit coupled in series to a butterfly circuit, wherein the inverse butterfly circuit comprises a first plurality of stages of multicast switches and the butterfly circuit comprises a second plurality of stages of multicast switches, each of the first plurality of stages of multicast switches of the inverse butterfly circuit and each of the second plurality of stages of multicast switches of the butterfly circuit comprise a same number of data inputs, and a number of controls bits for each stage is at least the number of data inputs for each stage, read, once from storage (e.g., a register) separate from the circuit, each element of the packed input data as respective inputs of the circuit,
route the packed input data through the circuit according to the packed control data, and
store resultant packed data from the circuit into the packed data destination.

Example 2. The processor of example 1, wherein the execution unit executes the decoded single instruction to route the packed input data through the circuit according to the packed control data that generates a data path sequence of a set of sliding windows from the one read of the packed input data.

Example 3. The processor of example 1, wherein the execution unit executes the decoded single instruction to route the packed input data through the circuit according to the packed control data that generates a data path sequence of a set of sliding windows and a symmetric data path sequence of a set of reverse order sliding windows from the one read of the packed input data from the storage.

Example 4. The processor of example 1, wherein the execution unit executes the decoded single instruction to route the packed input data through the circuit according to the packed control data that generates a data path sequence or a coefficient sequence of a multiphase filter pattern from the one read of the packed input data from the storage.

Example 5. The processor of example 1, wherein the execution unit executes the decoded single instruction to route the packed input data through the circuit according to the packed control data to select every other element of the packed input data as the respective inputs of the circuit, and generate a data path sequence of a set of sliding windows from the every other element of the packed input data.

Example 6. The processor of example 1, wherein the execution unit executes the decoded single instruction to route the packed input data through the circuit according to the packed control data that generates a data path sequence of irregularly spaced samples from the one read of the packed input data from the storage.

Example 7. The processor of example 1, wherein the execution unit executes the decoded single instruction to route the packed input data through the circuit according to the packed control data in a first mode for real numbers and in a second, different mode for complex numbers.

Example 8. The processor of example 1, wherein the execution unit executes a plurality of instances of the single instruction in a same software loop, and the packed input data and the packed control data are passed to the plurality of instances of the single instruction through a pre-computed header.

Example 9. A method comprising:
decoding a single instruction with a decoder of a processor into a decoded single instruction, the single instruction having fields that identify packed input data, packed control data, and a packed data destination; and
executing the decoded single instruction with an execution unit of the processor to:
send the packed control data to respective control inputs of a circuit that comprises an inverse butterfly circuit coupled in series to a butterfly circuit, wherein the inverse butterfly circuit comprises a first plurality of stages of multicast switches and the butterfly circuit comprises a second plurality of stages of multicast switches, each of the first plurality of stages of multicast switches of the inverse butterfly circuit and each of the second plurality of stages of multicast switches of the butterfly circuit comprise a same number of data inputs, and a number of controls bits for each stage is at least the number of data inputs for each stage,
read, once from storage separate from the circuit, each element of the packed input data as respective inputs of the circuit,
route the packed input data through the circuit according to the packed control data, and
store resultant packed data from the circuit into the packed data destination.

Example 10. The method of example 9, wherein the executing the decoded single instruction routes the packed input data through the circuit according to the packed control data that generates a data path sequence of a set of sliding windows from the one read of the packed input data.

Example 11. The method of example 9, wherein the executing the decoded single instruction routes the packed input data through the circuit according to the packed control data that generates a data path sequence of a set of sliding windows and a symmetric data path sequence of a set of reverse order sliding windows from the one read of the packed input data from the storage.

Example 12. The method of example 9, wherein the executing the decoded single instruction routes the packed input data through the circuit according to the packed control data that generates a data path sequence or a coefficient sequence of a multiphase filter pattern from the one read of the packed input data from the storage.

Example 13. The method of example 9, wherein the executing the decoded single instruction routes the packed input data through the circuit according to the packed control data to select every other element of the packed input data as the respective inputs of the circuit, and generates a data path sequence of a set of sliding windows from the every other element of the packed input data.

Example 14. The method of example 9, wherein the executing the decoded single instruction routes the packed input data through the circuit according to the packed control data that generates a data path sequence of irregularly spaced samples from the one read of the packed input data from the storage.

Example 15. The method of example 9, wherein the executing the decoded single instruction routes the packed input data through the circuit according to the packed control data in a first mode for real numbers and in a second, different mode for complex numbers.

Example 16. The method of example 9, wherein the single instruction does not utilize another instruction to program the circuit.

Example 17. A non-transitory machine readable medium that stores code that when executed by a machine causes the machine to perform a method comprising:
decoding a single instruction with a decoder of a processor into a decoded single instruction, the single instruction having fields that identify packed input data, packed control data, and a packed data destination; and
executing the decoded single instruction with an execution unit of the processor to:
send the packed control data to respective control inputs of a circuit that comprises an inverse butterfly circuit coupled in series to a butterfly circuit, wherein the inverse butterfly circuit comprises a first plurality of stages of multicast switches and the butterfly circuit comprises a second plurality of stages of multicast switches, each of the first plurality of stages of multicast switches of the inverse butterfly circuit and each of the second plurality of stages of multicast switches of the butterfly circuit comprise a same number of data inputs, and a number of controls bits for each stage is at least the number of data inputs for each stage, read, once from storage separate from the circuit, each element of the packed input data as respective inputs of the circuit, route the packed input data through the circuit according to the packed control data, and store resultant packed data from the circuit into the packed data destination.

Example 18. The non-transitory machine readable medium of example 17, wherein the executing the decoded single instruction routes the packed input data through the circuit according to the packed control data that generates a data path sequence of a set of sliding windows from the one read of the packed input data.

Example 19. The non-transitory machine readable medium of example 17, wherein the executing the decoded single instruction routes the packed input data through the circuit according to the packed control data that generates a data path sequence of a set of sliding windows and a symmetric data path sequence of a set of reverse order sliding windows from the one read of the packed input data from the storage.

Example 20. The non-transitory machine readable medium of example 17, wherein the executing the decoded single instruction routes the packed input data through the circuit according to the packed control data that generates a data path sequence or a coefficient sequence of a multiphase filter pattern from the one read of the packed input data from the storage.

Example 21. The non-transitory machine readable medium of example 17, wherein the executing the decoded single instruction routes the packed input data through the circuit according to the packed control data to select every other element of the packed input data as the respective inputs of the circuit, and generates a data path sequence of a set of sliding windows from the every other element of the packed input data.

Example 22. The non-transitory machine readable medium of example 17, wherein the executing the decoded single instruction routes the packed input data through the circuit according to the packed control data that generates a data path sequence of irregularly spaced samples from the one read of the packed input data from the storage.

Example 23. The non-transitory machine readable medium of example 17, wherein the executing the decoded single instruction routes the packed input data through the circuit according to the packed control data in a first mode for real numbers and in a second, different mode for complex numbers.

Example 24. The non-transitory machine readable medium of example 17, wherein the single instruction does not utilize another instruction to program the circuit.

Example 25. A processor comprising:

a decoder to decode a single instruction into a decoded single instruction, the single instruction having fields that identify packed input data, packed control data, and a packed data destination; and an execution unit to execute the decoded single instruction to:

send the packed control data to respective control inputs of means that comprises an inverse butterfly circuit coupled in series to a butterfly circuit, wherein the inverse butterfly circuit comprises a first plurality of stages of multicast switches and the butterfly circuit comprises a second plurality of stages of multicast switches, each of the first plurality of stages of multicast switches of the inverse butterfly circuit and each of the second plurality of stages of multicast switches of the butterfly circuit comprise a same number of data inputs, and a number of controls bits for each stage is at least the number of data inputs for each stage, read, once from storage (e.g., a register) separate from the means, each element of the packed input data as respective inputs of the means, route the packed input data through the means according to the packed control data, and store resultant packed data from the means into the packed data destination.

Example 26. The method of example 9, further comprising executing a plurality of instances of the single instruction in a same software loop, wherein the packed input data and the packed control data are passed to the plurality of instances of the single instruction through a pre-computed header.

Example 27. The non-transitory machine readable medium of example 17, further comprising executing a plurality of instances of the single instruction in a same software loop, wherein the packed input data and the packed control data are passed to the plurality of instances of the single instruction through a pre-computed header.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 35A:
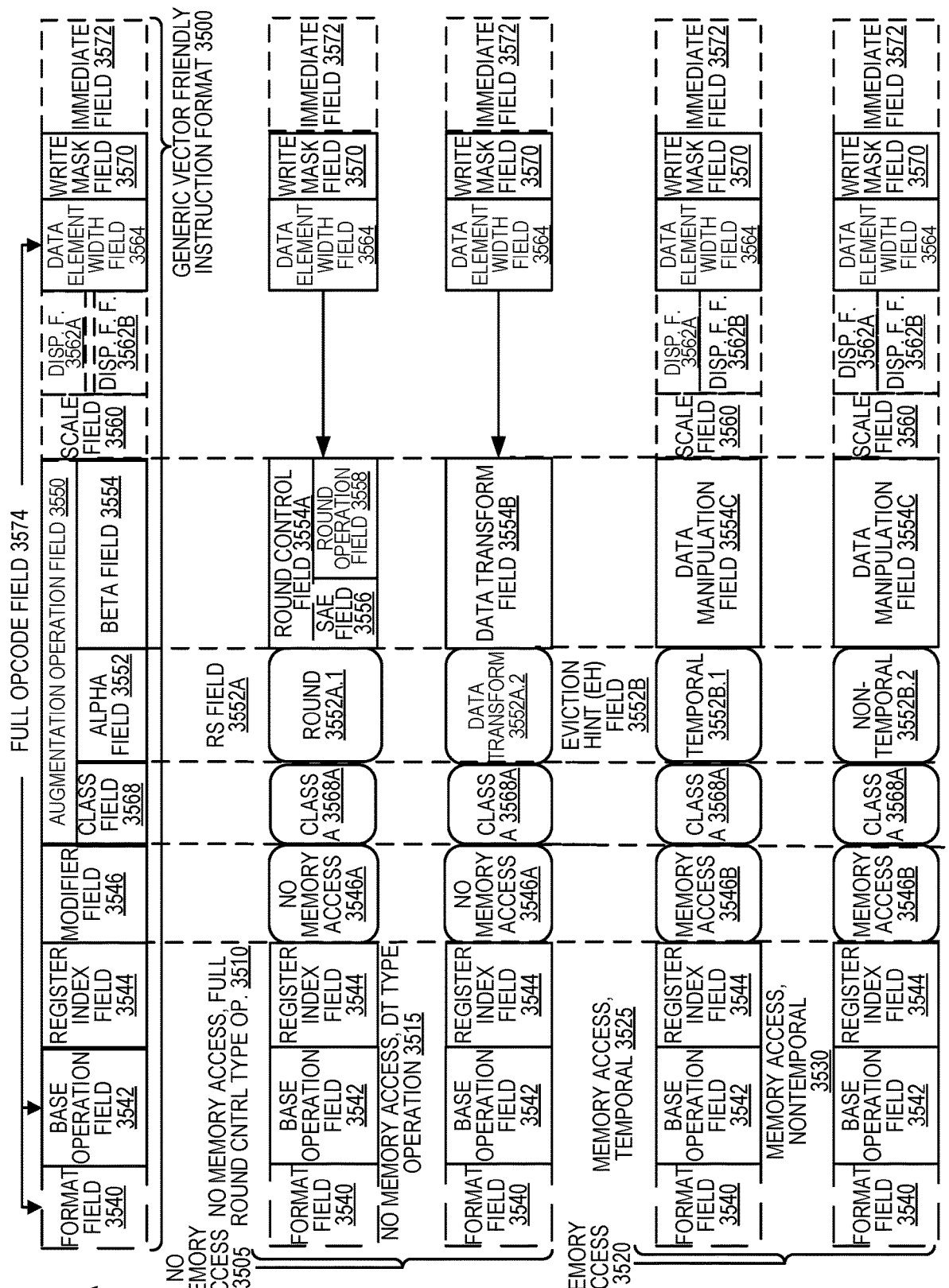
FIG. 35A is a block diagram illustrating a generic vector friendly instruction format and class A instruction templates thereof according to embodiments of the disclosure.
Figure 35B:
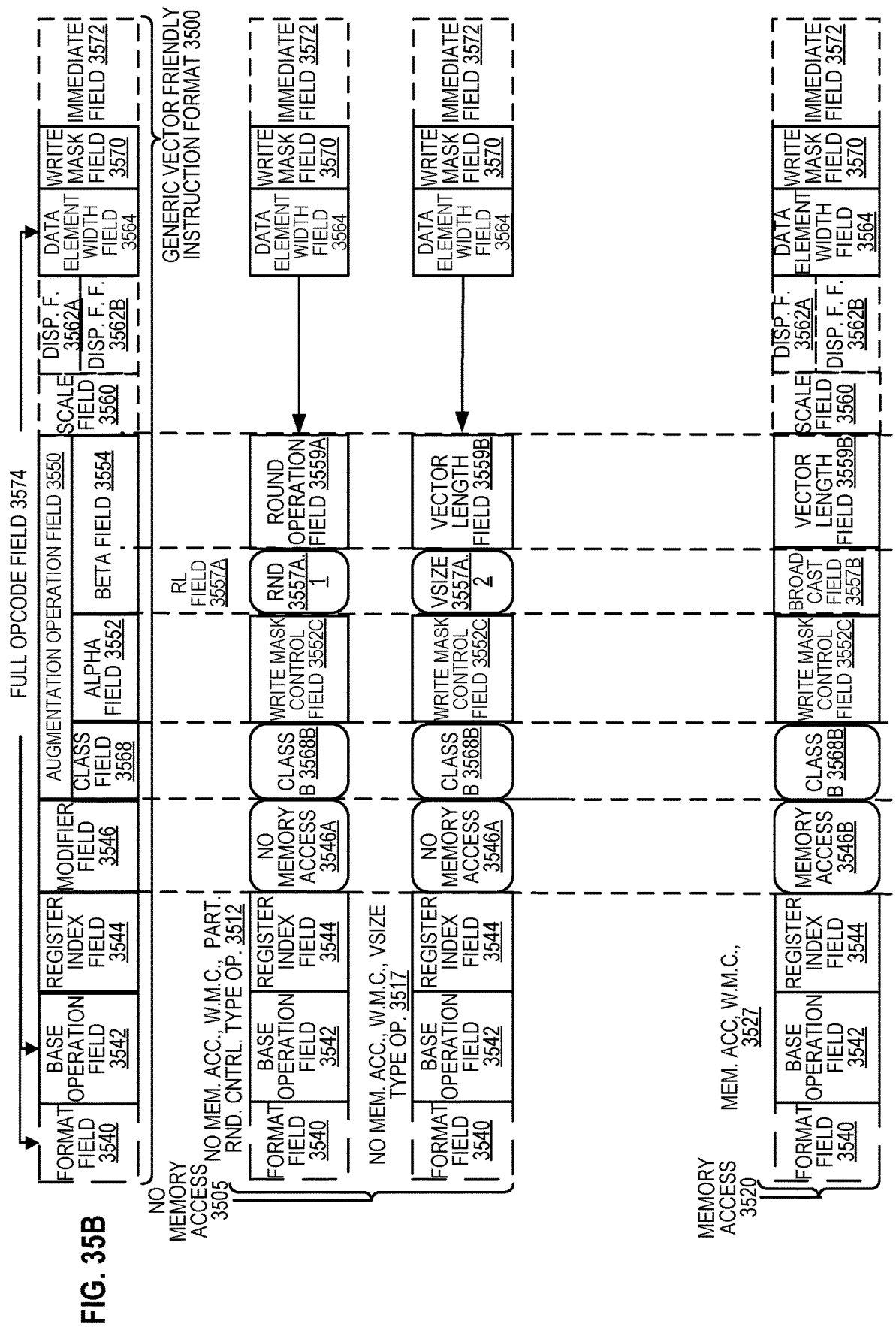
FIG. 35B is a block diagram illustrating the generic vector friendly instruction format and class B instruction templates thereof according to embodiments of the disclosure.

FIGS. 35A-35B are block diagrams illustrating a generic vector friendly instruction format and instruction templates thereof according to embodiments of the disclosure. FIG. 35A is a block diagram illustrating a generic vector friendly instruction format and class A instruction templates thereof according to embodiments of the disclosure; while FIG. 35B is a block diagram illustrating the generic vector friendly instruction format and class B instruction templates thereof according to embodiments of the disclosure. Specifically, a generic vector friendly instruction format 3500 for which are defined class A and class B instruction templates, both of which include no memory access 3505 instruction templates and memory access 3520 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 35A include: 1) within the no memory access 3505 instruction templates there is shown a no memory access, full round control type operation 3510 instruction template and a no memory access, data transform type operation 3515 instruction template; and 2) within the memory access 3520 instruction templates there is shown a memory access, temporal 3525 instruction template and a memory access, non-temporal 3530 instruction template. The class B instruction templates in FIG. 35B include: 1) within the no memory access 3505 instruction templates there is shown a no memory access, write mask control, partial round control type operation 3512 instruction template and a no memory access, write mask control, vsize type operation 3517 instruction template; and 2) within the memory access 3520 instruction templates there is shown a memory access, write mask control 3527 instruction template.

The generic vector friendly instruction format 3500 includes the following fields listed below in the order illustrated in FIGS. 35A-35B.

Format field 3540—a specific value (an instruction format identifier value) in this field uniquely identifies the vector friendly instruction format, and thus occurrences of instructions in the vector friendly instruction format in instruction streams. As such, this field is optional in the sense that it is not needed for an INSTRUCTION set that has only the generic vector friendly instruction format.

Base operation field 3542—its content distinguishes different base operations.

Register index field 3544—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 3546—its content distinguishes occurrences of instructions in the generic vector instruction format that specify memory access from those that do not; that is, between no memory access 3505 instruction templates and memory access 3520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 3550—its content distinguishes which one of a variety of different operations to be performed in addition to the base operation. This field is context specific. In one embodiment of the disclosure, this field is divided into a class field 3568, an alpha field 3552, and a beta field 3554. The augmentation operation field 3550 allows common groups of operations to be performed in a single instruction rather than 2, 3, or 4 instructions.

Scale field 3560—its content allows for the scaling of the index field's content for memory address generation (e.g., for address generation that uses $2^{scale}*index+base$).

Displacement Field 3562A—its content is used as part of memory address generation (e.g., for address generation that uses $2^{scale}*index+base+displacement$).

Displacement Factor Field 3562B (note that the juxtaposition of displacement field 3562A directly over displacement factor field 3562B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 3574 (described later herein) and the data manipulation field 3554C. The displacement field 3562A and the displacement factor field 3562B are optional in the sense that they are not used for the no memory access 3505 instruction templates and/or different embodiments may implement only one or none of the two.

Data element width field 3564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 3570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 3570 allows for partial vector operations, including loads, stores, arithmetic, logical, etc. While embodiments of the disclosure are described in which the write mask field's 3570 content selects one of a number of write mask registers that contains the write mask to be used (and thus the write mask field's 3570 content indirectly identifies that masking to be performed), alternative embodiments instead or additional allow the mask write field's 3570 content to directly specify the masking to be performed.

Immediate field 3572—its content allows for the specification of an immediate. This field is optional in the sense that is it not present in an implementation of the generic vector friendly format that does not support immediate and it is not present in instructions that do not use an immediate.

Class field 3568—its content distinguishes between different classes of instructions. With reference to FIGS. 35A-B, the contents of this field select between class A and class B instructions. In FIGS. 35A-B, rounded corner squares are used to indicate a specific value is present in a field (e.g., class A 3568A and class B 3568B for the class field 3568 respectively in FIGS. 35A-B).

Instruction Templates of Class A

In the case of the non-memory access 3505 instruction templates of class A, the alpha field 3552 is interpreted as an RS field 3552A, whose content distinguishes which one of the different augmentation operation types are to be performed (e.g., round 3552A.1 and data transform 3552A.2 are respectively specified for the no memory access, round type operation 3510 and the no memory access, data transform type operation 3515 instruction templates), while the beta field 3554 distinguishes which of the operations of the specified type is to be performed. In the no memory access 3505 instruction templates, the scale field 3560, the displacement field 3562A, and the displacement scale filed 3562B are not present.

No-Memory Access Instruction Templates—Full Round Control Type Operation

In the no memory access full round control type operation 3510 instruction template, the beta field 3554 is interpreted as a round control field 3554A, whose content(s) provide static rounding. While in the described embodiments of the disclosure the round control field 3554A includes a suppress all floating point exceptions (SAE) field 3556 and a round operation control field 3558, alternative embodiments may support may encode both these concepts into the same field or only have one or the other of these concepts/fields (e.g., may have only the round operation control field 3558).

SAE field 3556—its content distinguishes whether or not to disable the exception event reporting; when the SAE field's 3556 content indicates suppression is enabled, a given instruction does not report any kind of floating-point exception flag and does not raise any floating point exception handler.

Round operation control field 3558—its content distinguishes which one of a group of rounding operations to perform (e.g., Round-up, Round-down, Round-towards-zero and Round-to-nearest). Thus, the round operation control field 3558 allows for the changing of the rounding mode on a per instruction basis. In one embodiment of the disclosure where a processor includes a control register for specifying rounding modes, the round operation control field's 3550 content overrides that register value.

No Memory Access Instruction Templates—Data Transform Type Operation

In the no memory access data transform type operation 3515 instruction template, the beta field 3554 is interpreted as a data transform field 3554B, whose content distinguishes which one of a number of data transforms is to be performed (e.g., no data transform, swizzle, broadcast).

In the case of a memory access 3520 instruction template of class A, the alpha field 3552 is interpreted as an eviction hint field 3552B, whose content distinguishes which one of the eviction hints is to be used (in FIG. 35A, temporal 3552B.1 and non-temporal 3552B.2 are respectively specified for the memory access, temporal 3525 instruction template and the memory access, non-temporal 3530 instruction template), while the beta field 3554 is interpreted as a data manipulation field 3554C, whose content distinguishes which one of a number of data manipulation operations (also known as primitives) is to be performed (e.g., no manipulation; broadcast; up conversion of a source; and down conversion of a destination). The memory access 3520 instruction templates include the scale field 3560, and optionally the displacement field 3562A or the displacement scale field 3562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 3552 is interpreted as a write mask control (Z)

field 3552C, whose content distinguishes whether the write masking controlled by the write mask field 3570 should be a merging or a zeroing.

In the case of the non-memory access 3505 instruction templates of class B, part of the beta field 3554 is interpreted as an RL field 3557A, whose content distinguishes which one of the different augmentation operation types are to be performed (e.g., round 3557A.1 and vector length (VSIZE) 3557A.2 are respectively specified for the no memory access, write mask control, partial round control type operation 3512 instruction template and the no memory access, write mask control, VSIZE type operation 3517 instruction template), while the rest of the beta field 3554 distinguishes which of the operations of the specified type is to be performed. In the no memory access 3505 instruction templates, the scale field 3560, the displacement field 3562A, and the displacement scale filed 3562B are not present.

In the no memory access, write mask control, partial round control type operation 3510 instruction template, the rest of the beta field 3554 is interpreted as a round operation field 3559A and exception event reporting is disabled (a given instruction does not report any kind of floating-point exception flag and does not raise any floating point exception handler).

Round operation control field 3559A—just as round operation control field 3558, its content distinguishes which one of a group of rounding operations to perform (e.g., Round-up, Round-down, Round-towards-zero and Round-to-nearest). Thus, the round operation control field 3559A allows for the changing of the rounding mode on a per instruction basis. In one embodiment of the disclosure where a processor includes a control register for specifying rounding modes, the round operation control field's 3550 content overrides that register value.

In the no memory access, write mask control, VSIZE type operation 3517 instruction template, the rest of the beta field 3554 is interpreted as a vector length field 3559B, whose content distinguishes which one of a number of data vector lengths is to be performed on (e.g., 128, 256, or 512 byte).

In the case of a memory access 3520 instruction template of class B, part of the beta field 3554 is interpreted as a broadcast field 3557B, whose content distinguishes whether or not the broadcast type data manipulation operation is to be performed, while the rest of the beta field 3554 is interpreted the vector length field 3559B. The memory access 3520 instruction templates include the scale field 3560, and optionally the displacement field 3562A or the displacement scale field 3562B.

With regard to the generic vector friendly instruction format 3500, a full opcode field 3574 is shown including the format field 3540, the base operation field 3542, and the data element width field 3564. While one embodiment is shown where the full opcode field 3574 includes all of these fields, the full opcode field 3574 includes less than all of these fields in embodiments that do not support all of them. The full opcode field 3574 provides the operation code (opcode).

The augmentation operation field 3550, the data element width field 3564, and the write mask field 3570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 36 is a block diagram illustrating an exemplary specific vector friendly instruction format according to embodiments of the disclosure. FIG. 36 shows a specific vector friendly instruction format 3600 that is specific in the sense that it specifies the location, size, interpretation, and order of the fields, as well as values for some of those fields. The specific vector friendly instruction format 3600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 35 into which the fields from FIG. 36 map are illustrated.

It should be understood that, although embodiments of the disclosure are described with reference to the specific vector friendly instruction format 3600 in the context of the generic vector friendly instruction format 3500 for illustrative purposes, the disclosure is not limited to the specific vector friendly instruction format 3600 except where claimed. For example, the generic vector friendly instruction format 3500 contemplates a variety of possible sizes for the various fields, while the specific vector friendly instruction format 3600 is shown as having fields of specific sizes. By way of specific example, while the data element width field 3564 is illustrated as a one bit field in the specific vector friendly instruction format 3600, the disclosure is not so limited (that is, the generic vector friendly instruction format 3500 contemplates other sizes of the data element width field 3564).

The generic vector friendly instruction format 3500 includes the following fields listed below in the order illustrated in FIG. 36A.

EVEX Prefix (Bytes 0-3) 3602—is encoded in a four-byte form.

Format Field 3540 (EVEX Byte 0, bits [7:0])—the first byte (EVEX Byte 0) is the format field 3540 and it contains 0x62 (the unique value used for DISTINGUISHING the vector friendly instruction format in one embodiment of the disclosure).

The second-fourth bytes (EVEX Bytes 1-3) include a number of bit fields providing specific capability.

REX field 3605 (EVEX Byte 1, bits [7-5])—consists of a EVEX.R bit field (EVEX Byte 1, bit [7]-R), EVEX.X bit field (EVEX byte 1, bit [6]-X), and 3557BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 3510—this is the first part of the REX' field 3510 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 3615 (EVEX byte 1, bits [3:0]-mmmm)—its content encodes an implied leading opcode byte (OF, OF 38, or OF 3).

Data element width field 3564 (EVEX byte 2, bit [7]-W)—is represented by the notation EVEX.W. EVEX.W is used to define the granularity (size) of the datatype (either 32-bit data elements or 64-bit data elements).

EVEX.vvvv 3620 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 3620 encodes the 4 low-order bits of the first source register specifier stored in inverted (1s complement) form. Depending on the instruction, an extra different EVEX bit field is used to extend the specifier size to 32 registers.

EVEX.0 3568 Class field (EVEX byte 2, bit [2]-U)—If EVEX.0=0, it indicates class A or EVEX.U0; if EVEX.0=1, it indicates class B or EVEX.U1.

Prefix encoding field 3625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 3552 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 3554 (EVEX byte 3, bits [6:4]-SSS, also known as EVEX.$s_{2-0}$, EVEX.$r_{2-0}$, EVEX.rr1, EVEX.LL0, EVEX.LLB; also illustrated with ββββ)—as previously described, this field is context specific.

REX' field 3510—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 3570 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 3630 (Byte 4) is also known as the opcode byte. Part of the opcode is specified in this field.

MOD R/M Field 3640 (Byte 5) includes MOD field 3642, Reg field 3644, and R/M field 3646. As previously described, the MOD field's 3642 content distinguishes between memory access and non-memory access operations. The role of Reg field 3644 can be summarized to two situations: encoding either the destination register operand or a source register operand, or be treated as an opcode extension and not used to encode any instruction operand. The role of R/M field 3646 may include the following: encoding the instruction operand that references a memory address, or encoding either the destination register operand or a source register operand.

Scale, Index, Base (SIB) Byte (Byte 6)—As previously described, the scale field's 3550 content is used for memory address generation. SIB.xxx 3654 and SIB.bbb 3656—the contents of these fields have been previously referred to with regard to the register indexes Xxxx and Bbbb.

Displacement field 3562A (Bytes 7-10)—when MOD field 3642 contains 10, bytes 7-10 are the displacement field 3562A, and it works the same as the legacy 32-bit displacement (disp32) and works at byte granularity.

Displacement factor field 3562B (Byte 7)—when MOD field 3642 contains 01, byte 7 is the displacement factor field 3562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 3562B is a reinterpretation of disp8; when using displacement factor field 3562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 3562B substitutes the legacy x86 instruction set 8-bit displacement. Thus, the displacement factor field 3562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 3572 operates as previously described.

Full Opcode Field

FIG. 36B is a block diagram illustrating the fields of the specific vector friendly instruction format 3600 that make up the full opcode field 3574 according to one embodiment of the disclosure. Specifically, the full opcode field 3574 includes the format field 3540, the base operation field 3542, and the data element width (W) field 3564. The base operation field 3542 includes the prefix encoding field 3625, the opcode map field 3615, and the real opcode field 3630.

Register Index Field

FIG. 36C is a block diagram illustrating the fields of the specific vector friendly instruction format 3600 that make up the register index field 3544 according to one embodiment of the disclosure. Specifically, the register index field 3544 includes the REX field 3605, the REX' field 3610, the MODR/M.reg field 3644, the MODR/M.r/m field 3646, the VVVV field 3620, xxx field 3654, and the bbb field 3656.

Augmentation Operation Field

Figure 36D:
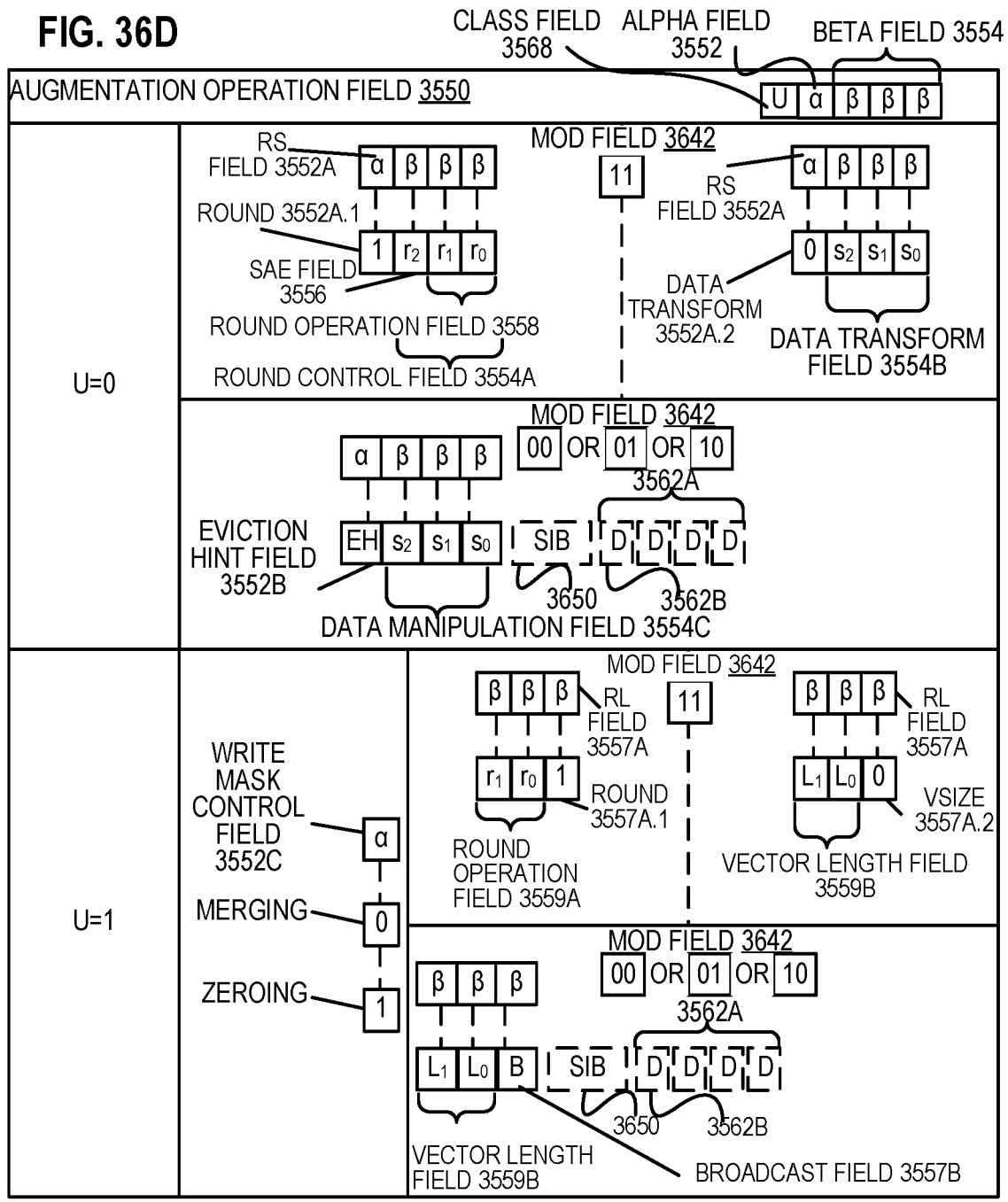
FIG. 36D is a block diagram illustrating the fields of the specific vector friendly instruction format in FIG. 36A that make up the augmentation operation field 3550 according to one embodiment of the disclosure.

FIG. 36D is a block diagram illustrating the fields of the specific vector friendly instruction format 3600 that make up the augmentation operation field 3550 according to one embodiment of the disclosure. When the class (U) field 3568 contains 0, it signifies EVEX.U0 (class A 3568A); when it contains 1, it signifies EVEX.U1 (class B 3568B). When U=0 and the MOD field 3642 contains 11 (signifying a no memory access operation), the alpha field 3552 (EVEX byte 3, bit [7]-EH) is interpreted as the rs field 3552A. When the rs field 3552A contains a 1 (round 3552A.1), the beta field 3554 (EVEX byte 3, bits [6:4]-SSS) is interpreted as the round control field 3554A. The round control field 3554A includes a one bit SAE field 3556 and a two bit round operation field 3558. When the rs field 3552A contains a 0 (data transform 3552A.2), the beta field 3554 (EVEX byte 3, bits [6:4]-SSS) is interpreted as a three bit data transform field 3554B. When U=0 and the MOD field 3642 contains 00, 01, or 10 (signifying a memory access operation), the alpha field 3552 (EVEX byte 3, bit [7]-EH) is interpreted as the eviction hint (EH) field 3552B and the beta field 3554 (EVEX byte 3, bits [6:4]-SSS) is interpreted as a three bit data manipulation field 3554C.

When U=1, the alpha field 3552 (EVEX byte 3, bit [7]-EH) is interpreted as the write mask control (Z) field 3552C. When U=1 and the MOD field 3642 contains 11 (signifying a no memory access operation), part of the beta field 3554 (EVEX byte 3, bit [4]-$S_0$) is interpreted as the RL field 3557A; when it contains a 1 (round 3557A.1) the rest of the beta field 3554 (EVEX byte 3, bit [6-5]-$S_{2-1}$) is interpreted as the round operation field 3559A, while when the RL field 3557A contains a 0 (VSIZE 3557.A2) the rest of the beta field 3554 (EVEX byte 3, bit [6-5]-$S_{2-1}$) is interpreted as the vector length field 3559B (EVEX byte 3, bit [6-5]-$L_{1-0}$). When U=1 and the MOD field 3642 contains 00, 01, or 10 (signifying a memory access operation), the beta field 3554 (EVEX byte 3, bits [6:4]-SSS) is interpreted as the vector length field 3559B (EVEX byte 3, bit [6-5]-$L_{1-0}$) and the broadcast field 3557B (EVEX byte 3, bit [4]-B).

Exemplary Register Architecture

Figure 37:
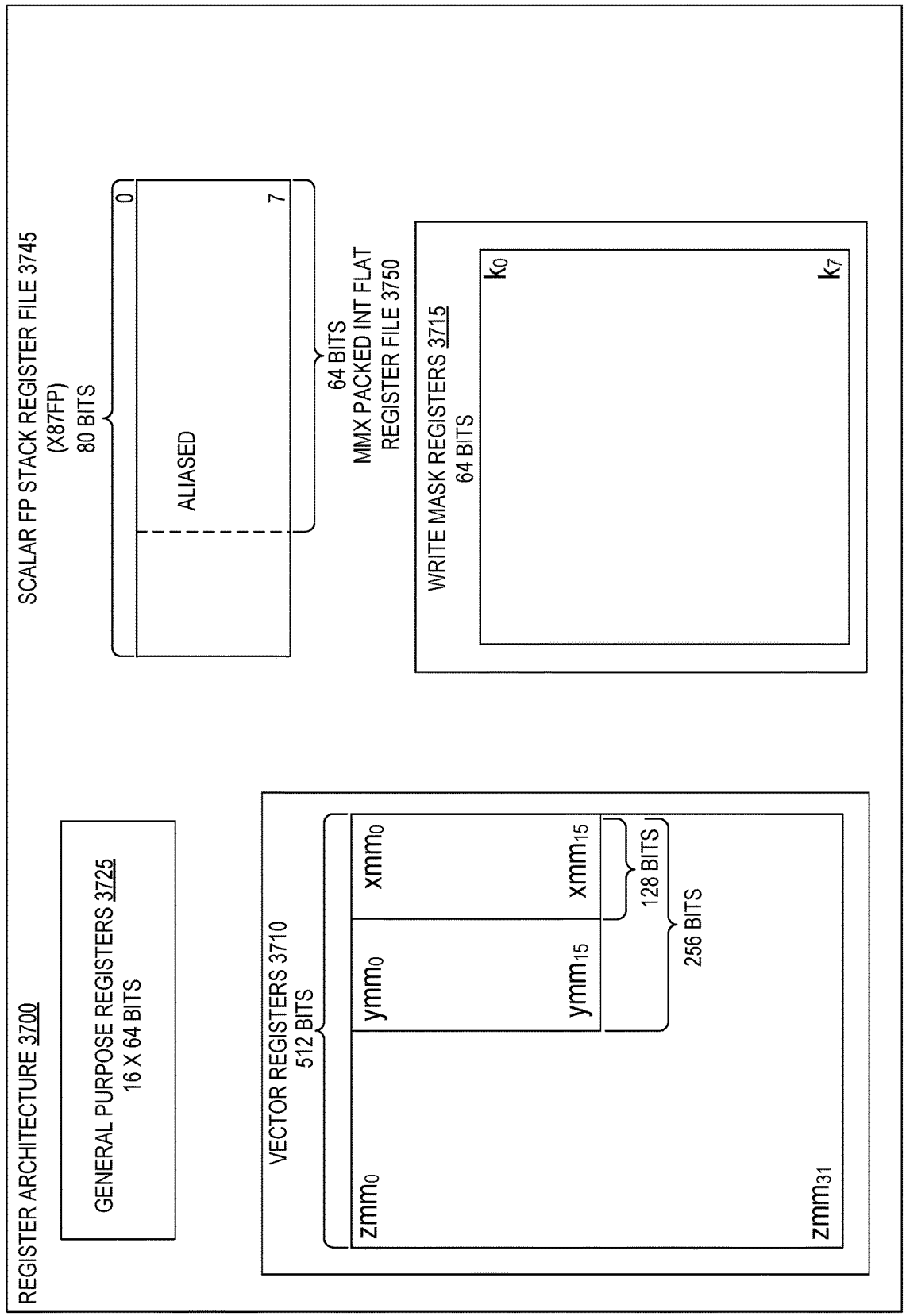
FIG. 37 is a block diagram of a register architecture according to one embodiment of the disclosure

FIG. 37 is a block diagram of a register architecture 3700 according to one embodiment of the disclosure. In the embodiment illustrated, there are 32 vector registers 3710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 3600 operates on these overlaid register file as illustrated in the below tables.

| Adjustable Vector Length | Class | Operations | Registers |
|---|---|---|---|
| Instruction Templates that do not include the vector length field 3559B | A (FIG. 35A; U = 0) | 3510, 3515, 3525, 3530 | zmm registers (the vector length is 64 byte) |
| | B (FIG. 35B; U = 1) | 3512 | zmm registers (the vector length is 64 byte) |
| Instruction templates that do include the vector length field 3559B | B (FIG. 35B; U = 1) | 3517, 3527 | zmm, ymm, or xmm registers (the vector length is 64 byte, 32 byte, or 16 byte) depending on the vector length field 3559B |

In other words, the vector length field 3559B selects between a maximum length and one or more other shorter lengths, where each such shorter length is half the length of the preceding length; and instructions templates without the vector length field 3559B operate on the maximum vector length. Further, in one embodiment, the class B instruction templates of the specific vector friendly instruction format 3600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 3715—in the embodiment illustrated, there are 8 write mask registers (k0 through k7), each 64 bits in size. In an alternate embodiment, the write mask registers 3715 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 3725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3745, on which is aliased the MMX packed integer flat register file 3750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 38A is a block diagram illustrating both an exemplary in-order pipeline and an exemplary register renaming, out-of-order issue/execution pipeline according to embodiments of the disclosure. FIG. 38B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 38A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 38A, a processor pipeline 3800 includes a fetch stage 3802, a length decode stage 3804, a decode stage 3806, an allocation stage 3808, a renaming stage 3810, a scheduling (also known as a dispatch or issue) stage 3812, a register read/memory read stage 3814, an execute stage 3816, a write back/memory write stage 3818, an exception handling stage 3822, and a commit stage 3824.

FIG. 38B shows processor core 3890 including a front end unit 3830 coupled to an execution engine unit 3850, and both are coupled to a memory unit 3870. The core 3890 may be a reduced instruction set computing (RISC) core, a complex instruction set computing (CISC) core, a very long instruction word (VLIW) core, or a hybrid or alternative core type. As yet another option, the core 3890 may be a special-purpose core, such as, for example, a network or communication core, compression engine, coprocessor core, general purpose computing graphics processing unit (GPGPU) core, graphics core, or the like.

The front end unit 3830 includes a branch prediction unit 3832 coupled to an instruction cache unit 3834, which is coupled to an instruction translation lookaside buffer (TLB) 3836, which is coupled to an instruction fetch unit 3838, which is coupled to a decode unit 3840. The decode unit 3840 (or decoder or decoder unit) may decode instructions (e.g., macro-instructions), and generate as an output one or more micro-operations, micro-code entry points, microinstructions, other instructions, or other control signals, which are decoded from, or which otherwise reflect, or are derived from, the original instructions. The decode unit 3840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3890 includes a microcode ROM or other medium that stores microcode for certain macro-instructions (e.g., in decode unit 3840 or otherwise within the front end unit 3830). The decode unit 3840 is coupled to a rename/allocator unit 3852 in the execution engine unit 3850.

The execution engine unit 3850 includes the rename/allocator unit 3852 coupled to a retirement unit 3854 and a set of one or more scheduler unit(s) 3856. The scheduler unit(s) 3856 represents any number of different schedulers, including reservations stations, central instruction window, etc. The scheduler unit(s) 3856 is coupled to the physical register file(s) unit(s) 3858. Each of the physical register file(s) units 3858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3858 comprises a vector registers unit, a write mask registers unit, and a scalar registers unit. These register units may provide architectural vector registers, vector mask registers, and general purpose registers. The physical register file(s) unit(s) 3858 is overlapped by the retirement unit 3854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3854 and the physical register file(s) unit(s) 3858 are coupled to the execution cluster(s) 3860. The execution cluster(s) 3860 includes a set of one or more execution units 3862 and a set of one or more memory access units 3864. The execution units 3862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3856, physical register file(s) unit(s) 3858, and execution cluster(s) 3860 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3864). It should also be understood that where separate pipelines are used, one or more of these pipelines may be out-of-order issue/execution and the rest in-order.

The set of memory access units 3864 is coupled to the memory unit 3870, which includes a data TLB unit 3872 coupled to a data cache unit 3874 coupled to a level 2 (L2) cache unit 3876. In one exemplary embodiment, the memory access units 3864 may include a load unit, a store address unit, and a store data unit, each of which is coupled to the data TLB unit 3872 in the memory unit 3870. The instruction cache unit 3834 is further coupled to a level 2 (L2) cache unit 3876 in the memory unit 3870. The L2 cache unit 3876 is coupled to one or more other levels of cache and eventually to a main memory.

By way of example, the exemplary register renaming, out-of-order issue/execution core architecture may implement the pipeline 3800 as follows: 1) the instruction fetch 3838 performs the fetch and length decoding stages 3802 and 3804; 2) the decode unit 3840 performs the decode stage 3806; 3) the rename/allocator unit 3852 performs the allocation stage 3808 and renaming stage 3810; 4) the scheduler unit(s) 3856 performs the schedule stage 3812; 5) the physical register file(s) unit(s) 3858 and the memory unit 3870 perform the register read/memory read stage 3814; the execution cluster 3860 perform the execute stage 3816; 6) the memory unit 3870 and the physical register file(s) unit(s) 3858 perform the write back/memory write stage 3818; 7) various units may be involved in the exception handling stage 3822; and 8) the retirement unit 3854 and the physical register file(s) unit(s) 3858 perform the commit stage 3824.

The core 3890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 3834/3874 and a shared L2 cache unit 3876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 39B:
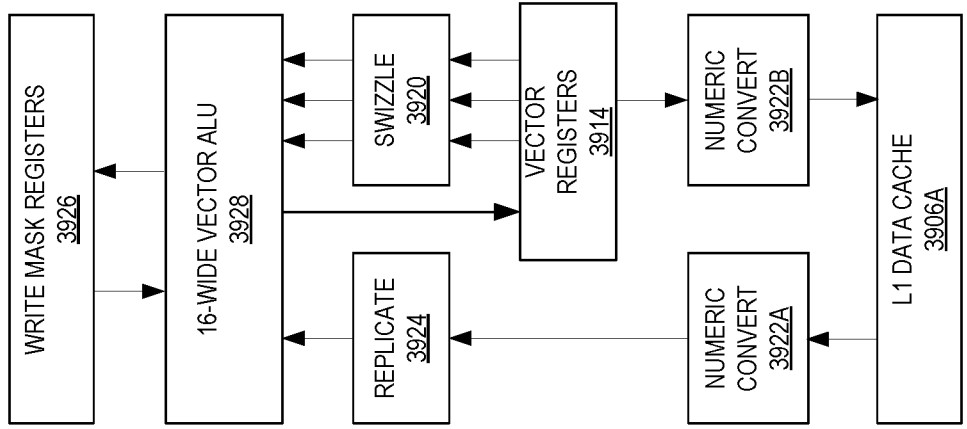
FIG. 39B is an expanded view of part of the processor core in FIG. 39A according to embodiments of the disclosure.
Figure 39A:
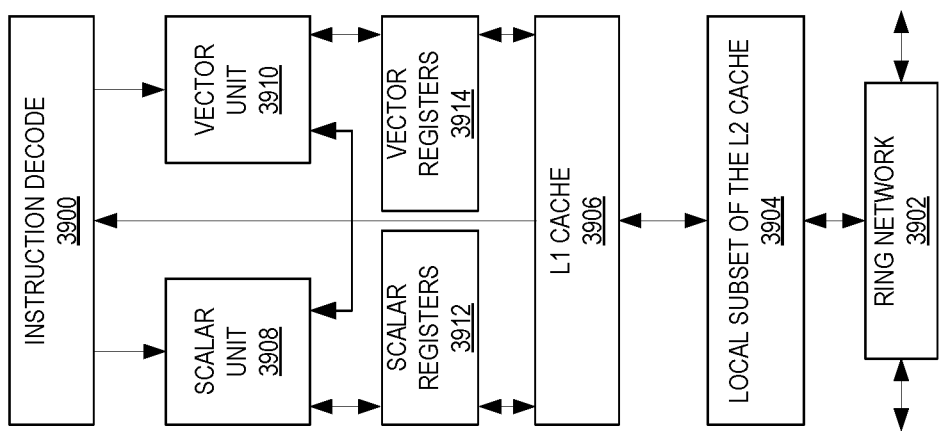
FIG. 39A is a block diagram of a single processor core, along with its connection to the on-die interconnect network and with its local subset of the Level 2 (L2) cache, according to embodiments of the disclosure.

FIGS. 39A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 39A is a block diagram of a single processor core, along with its connection to the on-die interconnect network 3902 and with its local subset of the Level 2 (L2) cache 3904, according to embodiments of the disclosure. In one embodiment, an instruction decode unit 3900 supports the x86 instruction set with a packed data instruction set extension. An L1 cache 3906 allows low-latency accesses to cache memory into the scalar and vector units. While in one embodiment (to simplify the design), a scalar unit 3908 and a vector unit 3910 use separate register sets (respectively, scalar registers 3912 and vector registers 3914) and data transferred between them is written to memory and then read back in from a level 1 (L1) cache 3906, alternative embodiments of the disclosure may use a different approach (e.g., use a single register set or include a communication path that allow data to be transferred between the two register files without being written and read back).

The local subset of the L2 cache 3904 is part of a global L2 cache that is divided into separate local subsets, one per processor core. Each processor core has a direct access path to its own local subset of the L2 cache 3904. Data read by a processor core is stored in its L2 cache subset 3904 and can be accessed quickly, in parallel with other processor cores accessing their own local L2 cache subsets. Data written by a processor core is stored in its own L2 cache subset 3904 and is flushed from other subsets, if necessary. The ring network ensures coherency for shared data. The ring network is bi-directional to allow agents such as processor cores, L2 caches and other logic blocks to communicate with each other within the chip. Each ring datapath is 1012-bits wide per direction.

FIG. 39B is an expanded view of part of the processor core in FIG. 39A according to embodiments of the disclosure. FIG. 39B includes an L1 data cache 3906A part of the L1 cache 3904, as well as more detail regarding the vector unit 3910 and the vector registers 3914. Specifically, the vector unit 3910 is a 16-wide vector processing unit (VPU) (see the 16-wide ALU 3928), which executes one or more of integer, single-precision float, and double-precision float instructions. The VPU supports swizzling the register inputs with swizzle unit 3920, numeric conversion with numeric convert units 3922A-B, and replication with replication unit 3924 on the memory input. Write mask registers 3926 allow predicating resulting vector writes.

Figure 40:
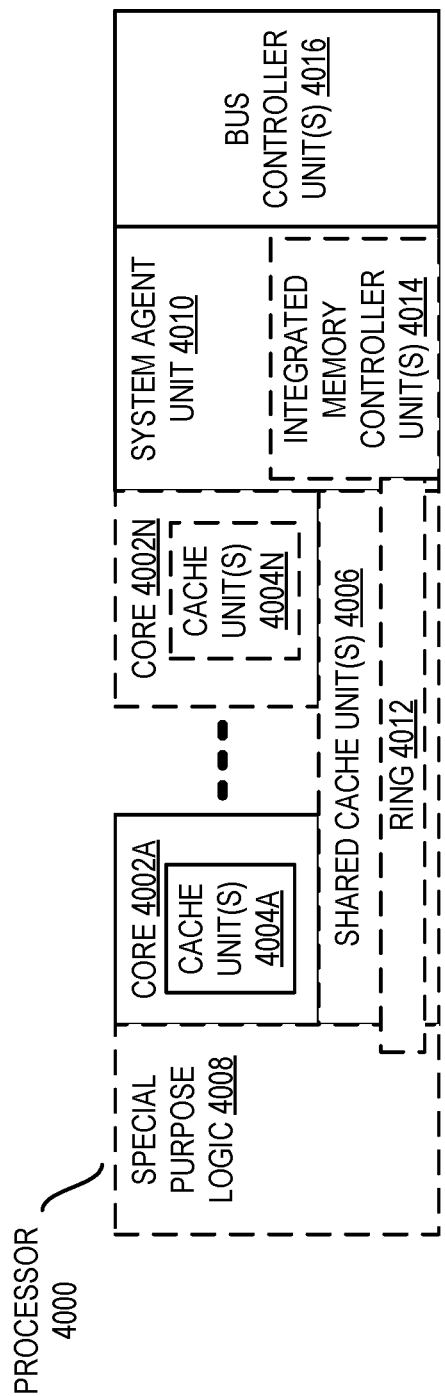
FIG. 40 is a block diagram of a processor that may have more than one core, may have an integrated memory controller, and may have integrated graphics according to embodiments of the disclosure.

FIG. 40 is a block diagram of a processor 4000 that may have more than one core, may have an integrated memory controller, and may have integrated graphics according to embodiments of the disclosure. The solid lined boxes in FIG. 40 illustrate a processor 4000 with a single core 4002A, a system agent 4010, a set of one or more bus controller units 4016, while the optional addition of the dashed lined boxes illustrates an alternative processor 4000 with multiple cores 4002A-N, a set of one or more integrated memory controller unit(s) 4014 in the system agent unit 4010, and special purpose logic 4008.

Thus, different implementations of the processor 4000 may include: 1) a CPU with the special purpose logic 4008 being integrated graphics and/or scientific (throughput) logic (which may include one or more cores), and the cores 4002A-N being one or more general purpose cores (e.g., general purpose in-order cores, general purpose out-of-order cores, a combination of the two); 2) a coprocessor with the cores 4002A-N being a large number of special purpose cores intended primarily for graphics and/or scientific (throughput); and 3) a coprocessor with the cores 4002A-N being a large number of general purpose in-order cores. Thus, the processor 4000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 4000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 4006, and external memory (not shown) coupled to the set of integrated memory controller units 4014. The set of shared cache units 4006 may include one or more mid-level caches, such as level 2 (L2), level 3 (L3), level 4 (L4), or other levels of cache, a last level cache (LLC), and/or combinations thereof. While in one embodiment a ring based interconnect unit 4012 interconnects the integrated graphics logic 4008, the set of shared cache units 4006, and the system agent unit 4010/integrated memory controller unit(s) 4014, alternative embodiments may use any number of well-known techniques for interconnecting such units. In one embodiment, coherency is MAINTAINED between one or more cache units 4006 and cores 4002-A-N.

In some embodiments, one or more of the cores 4002A-N are capable of multithreading. The system agent 4010 includes those components coordinating and operating cores 4002A-N. The system agent unit 4010 may include for example a power control unit (PCU) and a display unit. The PCU may be or include logic and components needed for regulating the power state of the cores 4002A-N and the integrated graphics logic 4008. The display unit is for driving one or more externally connected displays.

The cores 4002A-N may be homogenous or heterogeneous in terms of architecture instruction set; that is, two or more of the cores 4002A-N may be capable of execution the same instruction set, while others may be capable of executing only a subset of that instruction set or a different instruction set.

Exemplary Computer Architectures

FIGS. 41-44 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 41:
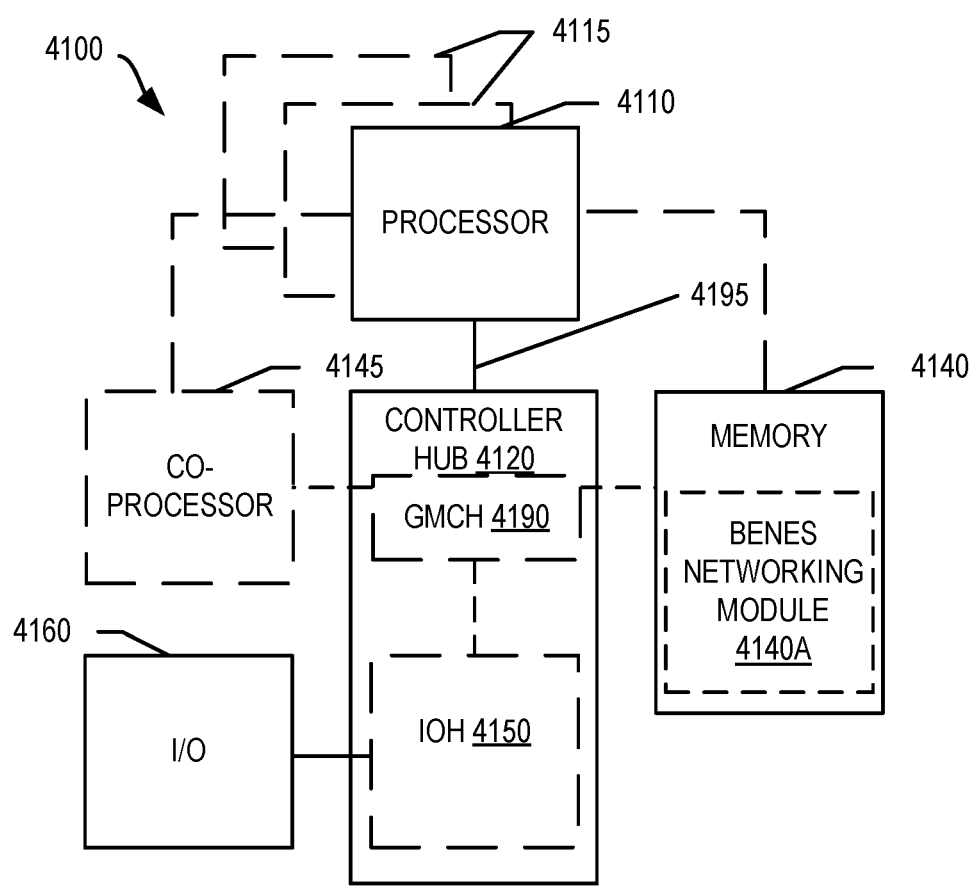
FIG. 41 is a block diagram of a system in accordance with one embodiment of the present disclosure.

Referring now to FIG. 41, shown is a block diagram of a system 4100 in accordance with one embodiment of the present disclosure. The system 4100 may include one or more processors 4110, 4115, which are coupled to a controller hub 4120. In one embodiment the controller hub 4120 includes a graphics memory controller hub (GMCH) 4190 and an Input/Output Hub (IOH) 4150 (which may be on separate chips); the GMCH 4190 includes memory and graphics controllers to which are coupled memory 4140 and a coprocessor 4145; the IOH 4150 is couples input/output (I/O) devices 4160 to the GMCH 4190. Alternatively, one or both of the memory and graphics controllers are integrated within the processor (as described herein), the memory 4140 and the coprocessor 4145 are coupled directly to the processor 4110, and the controller hub 4120 in a single chip with the IOH 4150. Memory 4140 may include a Benes networking module 4140A, for example, to store code that when executed causes a processor to perform any method of this disclosure.

The optional nature of additional processors 4115 is denoted in FIG. 41 with broken lines. Each processor 4110, 4115 may include one or more of the processing cores described herein and may be some version of the processor 4000.

The memory 4140 may be, for example, dynamic random access memory (DRAM), phase change memory (PCM), or a combination of the two. For at least one embodiment, the controller hub 4120 communicates with the processor(s) 4110, 4115 via a multi-drop bus, such as a frontside bus (FSB), point-to-point interface such as Quickpath Interconnect (QPI), or similar connection 4195.

In one embodiment, the coprocessor 4145 is a special-purpose processor, such as, for example, a high-throughput MIC processor, a network or communication processor, compression engine, graphics processor, GPGPU, embedded processor, or the like. In one embodiment, controller hub 4120 may include an integrated graphics accelerator.

There can be a variety of differences between the physical resources 4110, 4115 in terms of a spectrum of metrics of merit including architectural, microarchitectural, thermal, power consumption characteristics, and the like.

In one embodiment, the processor 4110 executes instructions that control data processing operations of a general type. Embedded within the instructions may be coprocessor instructions. The processor 4110 recognizes these coprocessor instructions as being of a type that should be executed by the attached coprocessor 4145. Accordingly, the processor 4110 issues these coprocessor instructions (or control signals representing coprocessor instructions) on a coprocessor bus or other interconnect, to coprocessor 4145. Coprocessor(s) 4145 accept and execute the received coprocessor instructions.

Figure 42:
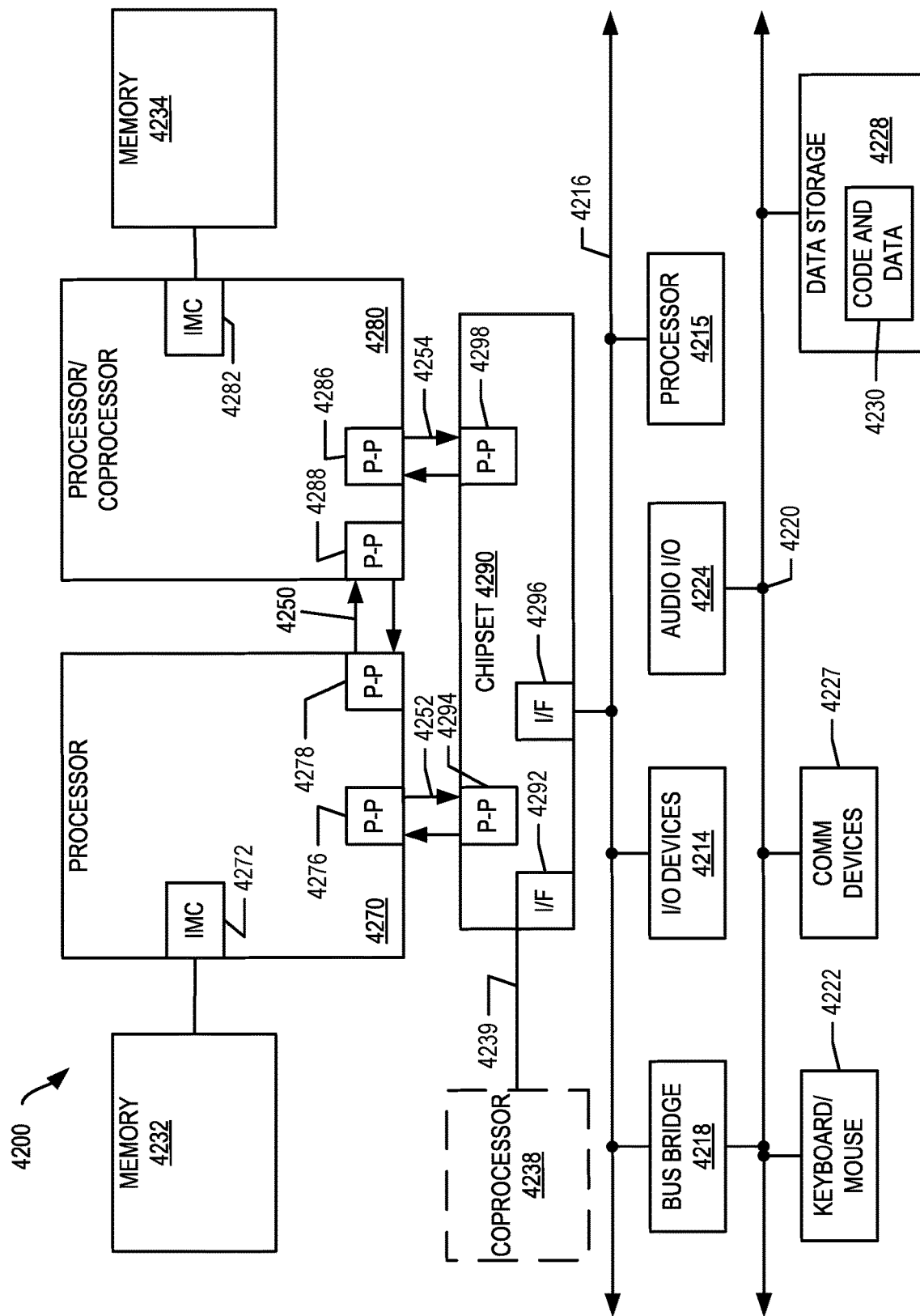
FIG. 42 is a block diagram of a more specific exemplary system in accordance with an embodiment of the present disclosure.

Referring now to FIG. 42, shown is a block diagram of a first more specific exemplary system 4200 in accordance with an embodiment of the present disclosure. As shown in FIG. 42, multiprocessor system 4200 is a point-to-point interconnect system, and includes a first processor 4270 and a second processor 4280 coupled via a point-to-point interconnect 4250. Each of processors 4270 and 4280 may be some version of the processor 4000. In one embodiment of the disclosure, processors 4270 and 4280 are respectively processors 4110 and 4115, while coprocessor 4238 is coprocessor 4145. In another embodiment, processors 4270 and 4280 are respectively processor 4110 coprocessor 4145.

Processors 4270 and 4280 are shown including integrated memory controller (IMC) units 4272 and 4282, respectively. Processor 4270 also includes as part of its bus controller units point-to-point (P-P) interfaces 4276 and 4278; similarly, second processor 4280 includes P-P interfaces 4286 and 4288. Processors 4270, 4280 may exchange information via a point-to-point (P-P) interface 4250 using P-P interface circuits 4278, 4288. As shown in FIG. 42, IMCs 4272 and 4282 couple the processors to respective memories, namely a memory 4232 and a memory 4234, which may be portions of main memory locally attached to the respective processors.

Processors 4270, 4280 may each exchange information with a chipset 4290 via individual P-P interfaces 4252, 4254 using point to point interface circuits 4276, 4294, 4286, 4298. Chipset 4290 may optionally exchange information with the coprocessor 4238 via a high-performance interface 4239. In one embodiment, the coprocessor 4238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 4290 may be coupled to a first bus 4216 via an interface 4296. In one embodiment, first bus 4216 may be a Peripheral Component Interconnect (PCI) bus, or a bus such as a PCI Express bus or another third GENERATION I/O interconnect bus, although the scope of the present disclosure is not so limited.

As shown in FIG. 42, various I/O devices 4214 may be coupled to first bus 4216, along with a bus bridge 4218 which couples first bus 4216 to a second bus 4220. In one embodiment, one or more additional processor(s) 4215, such as coprocessors, high-throughput MIC processors, GPGPU's, accelerators (such as, e.g., graphics accelerators or digital signal processing (DSP) units), field programmable gate arrays, or any other processor, are coupled to first bus 4216. In one embodiment, second bus 4220 may be a low pin count (LPC) bus. Various devices may be coupled to a second bus 4220 including, for example, a keyboard and/or mouse 4222, communication devices 4227 and a storage unit 4228 such as a disk drive or other mass storage device which may include instructions/code and data 4230, in one embodiment. Further, an audio I/O 4224 may be coupled to the second bus 4220. Note that other architectures are possible. For example, instead of the point-to-point architecture of FIG. 42, a system may implement a multi-drop bus or other such architecture.

Figure 43:
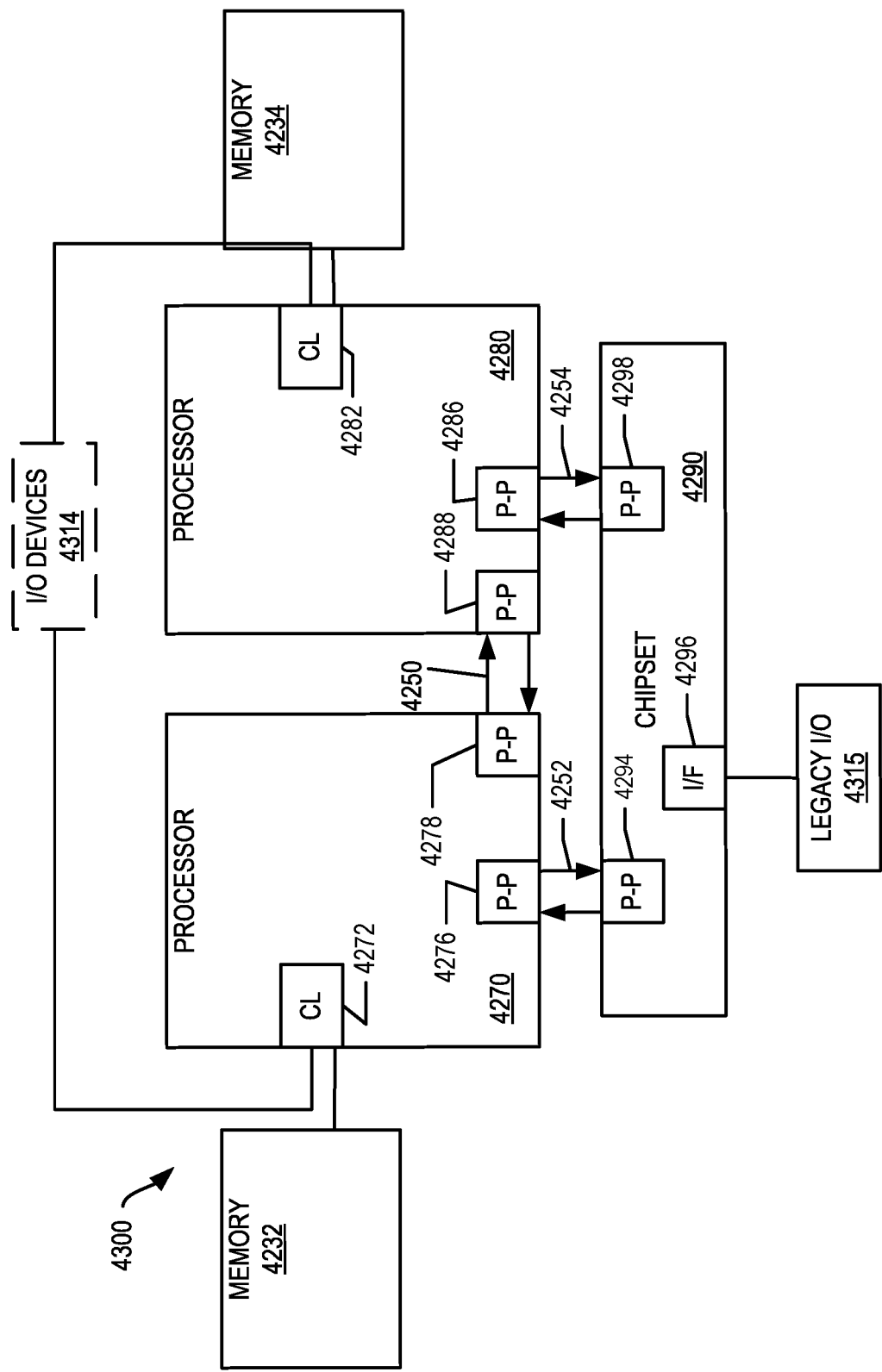
FIG. 43, shown is a block diagram of a second more specific exemplary system in accordance with an embodiment of the present disclosure.

Referring now to FIG. 43, shown is a block diagram of a second more specific exemplary system 4300 in accordance with an embodiment of the present disclosure Like elements in FIGS. 42 and 43 bear like reference numerals, and certain aspects of FIG. 42 have been omitted from FIG. 43 in order to avoid obscuring other aspects of FIG. 43.

FIG. 43 illustrates that the processors 4270, 4280 may include integrated memory and I/O control logic ("CL") 4272 and 4282, respectively. Thus, the CL 4272, 4282 include integrated memory controller units and include I/O control logic. FIG. 43 illustrates that not only are the memories 4232, 4234 coupled to the CL 4272, 4282, but also that I/O devices 4314 are also coupled to the control logic 4272, 4282. Legacy I/O devices 4315 are coupled to the chipset 4290.

Figure 44:
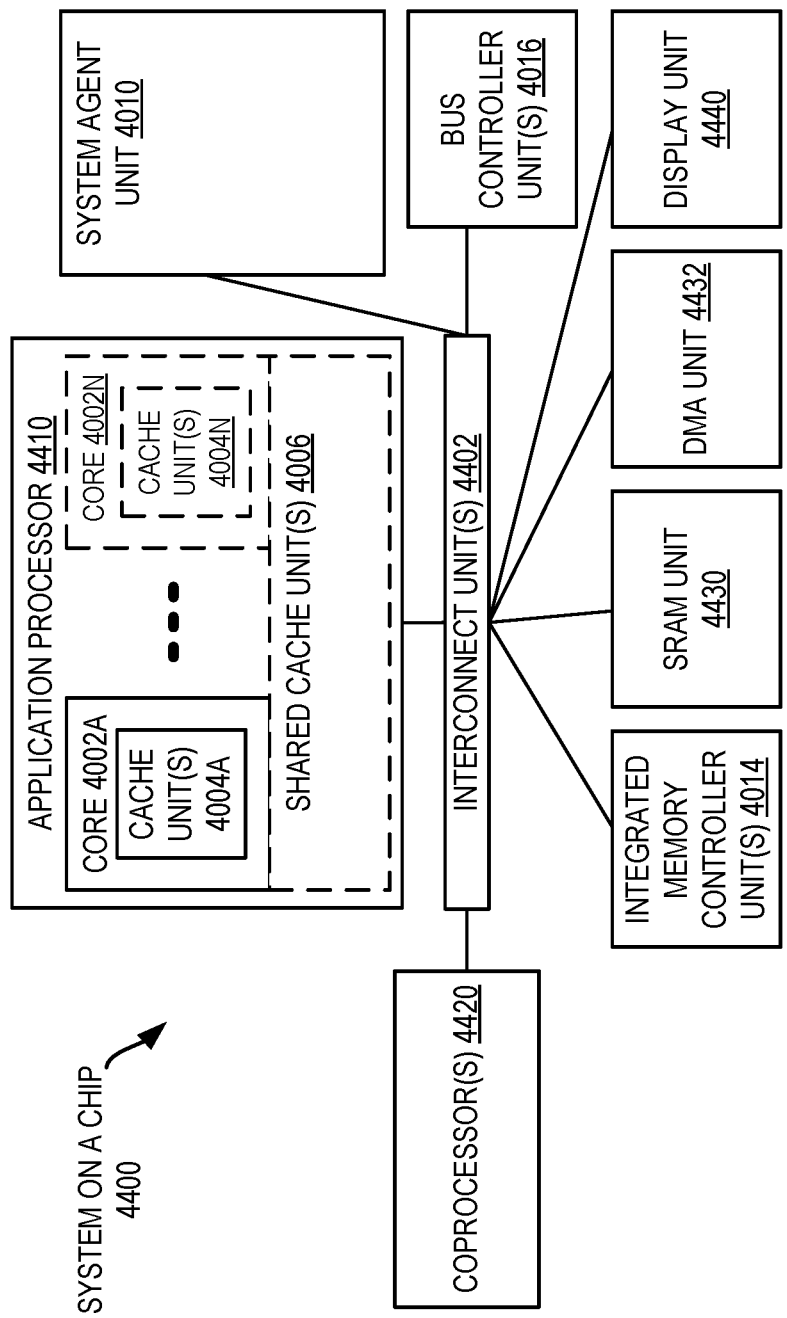
FIG. 44, shown is a block diagram of a system on a chip (SoC) in accordance with an embodiment of the present disclosure.

Referring now to FIG. 44, shown is a block diagram of a SoC 4400 in accordance with an embodiment of the present disclosure. Similar elements in FIG. 40 bear like reference numerals. Also, dashed lined boxes are optional features on more advanced SoCs. In FIG. 44, an interconnect unit(s) 4402 is coupled to: an application processor 4410 which includes a set of one or more cores 202A-N and shared cache unit(s) 4006; a system agent unit 4010; a bus controller unit(s) 4016; an integrated memory controller unit(s) 4014; a set or one or more coprocessors 4420 which may include integrated graphics logic, an image processor, an audio processor, and a video processor; an static random access memory (SRAM) unit 4430; a direct memory access (DMA) unit 4432; and a display unit 4440 for coupling to one or more external displays. In one embodiment, the coprocessor(s) 4420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 4230 illustrated in FIG. 42, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features DESCRIBED herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 45:
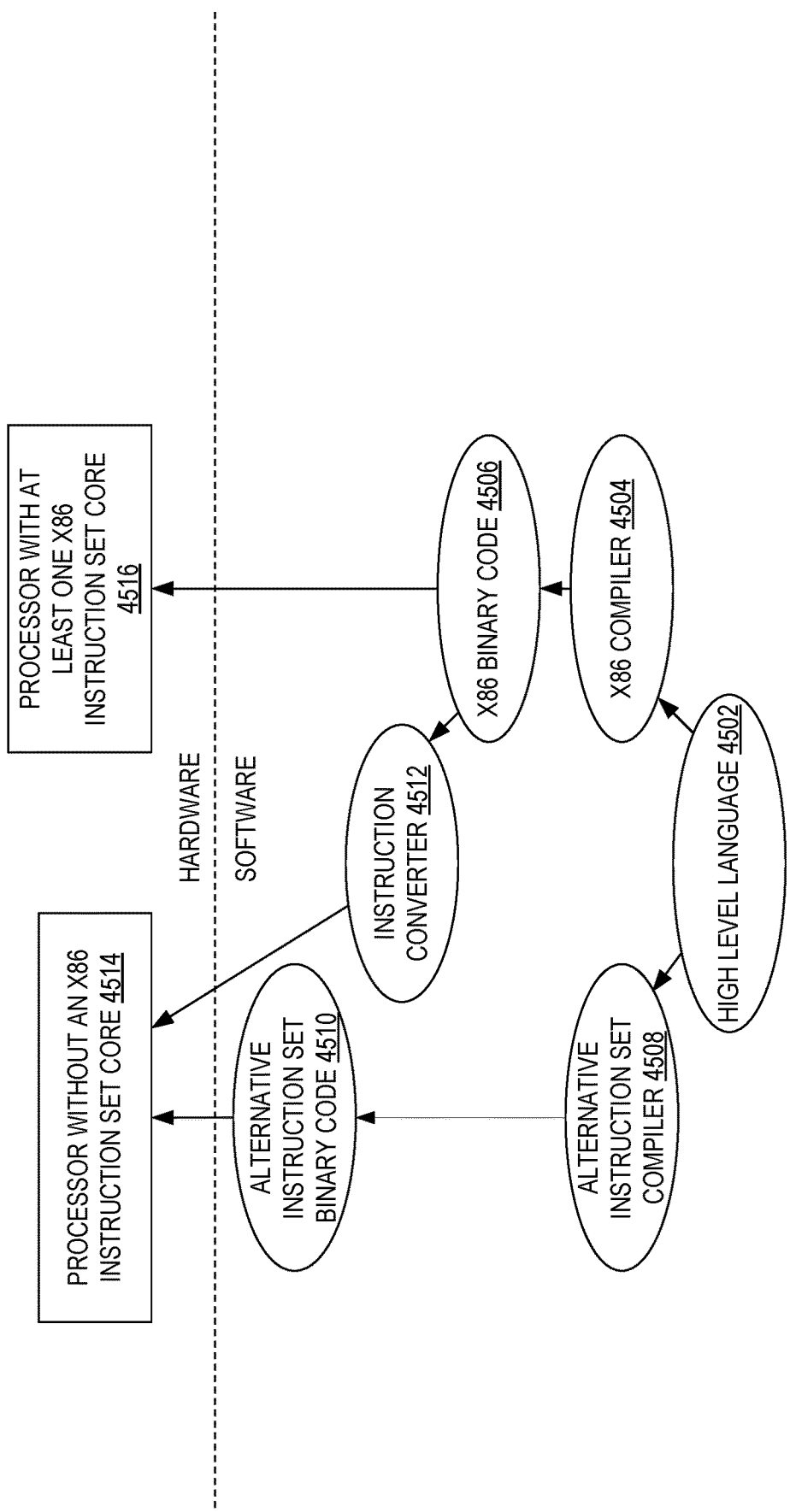
FIG. 45 is a block diagram contrasting the use of a software instruction converter to convert binary instructions in a source instruction set to binary instructions in a target instruction set according to embodiments of the disclosure.

FIG. 45 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 45 shows a program in a high level language 4502 may be compiled using an x86 compiler 4504 to generate x86 binary code 4506 that may be natively executed by a processor with at least one x86 instruction set core 4516. The processor with at least one x86 instruction set core 4516 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 4504 represents a compiler that is operable to generate x86 binary code 4506 (e.g., object code) that can, with or without additional linkage processing, be executed on the processor with at least one x86 instruction set core 4516. Similarly, FIG. 45 shows the program in the high level language 4502 may be compiled using an alternative instruction set compiler 4508 to generate alternative instruction set binary code 4510 that may be natively executed by a processor without at least one x86 instruction set core 4514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 4512 is used to convert the x86 binary code 4506 into code that may be natively executed by the processor without an x86 instruction set core 4514. This converted code is not likely to be the same as the alternative instruction set binary code 4510 because an instruction converter capable of this is difficult to make; however, the converted code will accomplish the general operation and be made up of instructions from the alternative instruction set. Thus, the instruction converter 4512 represents software, firmware, hardware, or a combination thereof that, through emulation, simulation or any other process, allows a processor or other electronic device that does not have an x86 instruction set processor or core to execute the x86 binary code 4506.

What is claimed is:

1. A processor comprising:
a decoder to decode a single instruction into a decoded single instruction, the single instruction having fields that identify packed input data, packed control data, and a packed data destination; and
an execution unit to execute the decoded single instruction to:
send the packed control data to respective control inputs of a circuit that comprises an inverse butterfly circuit coupled in series to a butterfly circuit, wherein the inverse butterfly circuit comprises a first plurality of stages of multicast switches and the butterfly circuit comprises a second plurality of stages of multicast switches
read, once from storage separate from the circuit, each element of the packed input data as respective inputs of the circuit,
route the packed input data through the circuit according to the packed control data, and
store resultant packed data from the circuit into the packed data destination, wherein the execution unit is to execute a plurality of instances of the single instruction in a same software loop, and the packed input data and the packed control data are to be passed to the plurality of instances of the single instruction through a pre-computed header.

2. The processor of claim 1, wherein the execution unit executes the decoded single instruction to route the packed input data through the circuit according to the packed control data that generates a data path sequence of a set of sliding windows from the one read of the packed input data.

3. The processor of claim 1, wherein the execution unit executes the decoded single instruction to route the packed input data through the circuit according to the packed control data that generates a data path sequence of a set of sliding windows and a symmetric data path sequence of a set of reverse order sliding windows from the one read of the packed input data from the storage.

4. The processor of claim 1, wherein the execution unit executes the decoded single instruction to route the packed input data through the circuit according to the packed control data that generates a data path sequence or a coefficient sequence of a multiphase filter pattern from the one read of the packed input data from the storage.

5. The processor of claim 1, wherein the execution unit executes the decoded single instruction to route the packed input data through the circuit according to the packed control data to select every other element of the packed input data as the respective inputs of the circuit, and generate a data path sequence of a set of sliding windows from the every other element of the packed input data.

6. The processor of claim 1, wherein the execution unit executes the decoded single instruction to route the packed input data through the circuit according to the packed control data that generates a data path sequence of irregularly spaced samples from the one read of the packed input data from the storage.

7. The processor of claim 1, wherein the execution unit executes the decoded single instruction to route the packed input data through the circuit according to the packed control data in a first mode for real numbers and in a second, different mode for complex numbers.

8. A method comprising:
decoding a single instruction with a decoder of a processor into a decoded single instruction, the single instruction having fields that identify packed input data, packed control data, and a packed data destination; and
executing a plurality of instances of the decoded single instruction with an execution unit of the processor in a same software loop, wherein the packed input data and the packed control data are passed to the plurality of instances of the single instruction through a pre-computed header, to:
send the packed control data to respective control inputs of a circuit that comprises an inverse butterfly circuit coupled in series to a butterfly circuit, wherein the inverse butterfly circuit comprises a first plurality of stages of multicast switches and the butterfly circuit comprises a second plurality of stages of multicast switches,
read, once from storage separate from the circuit, each element of the packed input data as respective inputs of the circuit,
route the packed input data through the circuit according to the packed control data, and
store resultant packed data from the circuit into the packed data destination.

9. The method of claim 8, wherein the executing the decoded single instruction routes the packed input data through the circuit according to the packed control data that generates a data path sequence of a set of sliding windows from the one read of the packed input data.

10. The method of claim 8, wherein the executing the decoded single instruction routes the packed input data through the circuit according to the packed control data that generates a data path sequence of a set of sliding windows and a symmetric data path sequence of a set of reverse order sliding windows from the one read of the packed input data from the storage.

11. The method of claim 8, wherein the executing the decoded single instruction routes the packed input data through the circuit according to the packed control data that generates a data path sequence or a coefficient sequence of a multiphase filter pattern from the one read of the packed input data from the storage.

12. The method of claim 8, wherein the executing the decoded single instruction routes the packed input data through the circuit according to the packed control data to select every other element of the packed input data as the respective inputs of the circuit, and generates a data path sequence of a set of sliding windows from the every other element of the packed input data.

13. The method of claim 8, wherein the executing the decoded single instruction routes the packed input data through the circuit according to the packed control data that generates a data path sequence of irregularly spaced samples from the one read of the packed input data from the storage.

14. The method of claim 8, wherein the executing the decoded single instruction routes the packed input data through the circuit according to the packed control data in a first mode for real numbers and in a second, different mode for complex numbers.

15. A non-transitory machine readable medium that stores code that when executed by a machine causes the machine to perform a method comprising:
decoding a single instruction with a decoder of a processor into a decoded single instruction, the single instruction having fields that identify packed input data, packed control data, and a packed data destination; and
executing a plurality of instances of the decoded single instruction with an execution unit of the processor in a same software loop, wherein the packed input data and the packed control data are passed to the plurality of instances of the single instruction through a pre-computed header, to:
send the packed control data to respective control inputs of a circuit that comprises an inverse butterfly circuit coupled in series to a butterfly circuit, wherein the inverse butterfly circuit comprises a first plurality of stages of multicast switches and the butterfly circuit comprises a second plurality of stages of multicast switches,
read, once from storage separate from the circuit, each element of the packed input data as respective inputs of the circuit,
route the packed input data through the circuit according to the packed control data, and
store resultant packed data from the circuit into the packed data destination.

16. The non-transitory machine readable medium of claim 15, wherein the executing the decoded single instruction routes the packed input data through the circuit according to the packed control data that generates a data path sequence of a set of sliding windows from the one read of the packed input data.

17. The non-transitory machine readable medium of claim 15, wherein the executing the decoded single instruction routes the packed input data through the circuit according to the packed control data that generates a data path sequence of a set of sliding windows and a symmetric data path sequence of a set of reverse order sliding windows from the one read of the packed input data from the storage.

18. The non-transitory machine readable medium of claim 15, wherein the executing the decoded single instruction routes the packed input data through the circuit according to the packed control data that generates a data path sequence or a coefficient sequence of a multiphase filter pattern from the one read of the packed input data from the storage.

19. The non-transitory machine readable medium of claim 15, wherein the executing the decoded single instruction routes the packed input data through the circuit according to the packed control data to select every other element of the packed input data as the respective inputs of the circuit, and generates a data path sequence of a set of sliding windows from the every other element of the packed input data.

20. The non-transitory machine readable medium of claim 15, wherein the executing the decoded single instruction routes the packed input data through the circuit according to the packed control data that generates a data path sequence of irregularly spaced samples from the one read of the packed input data from the storage.

21. The non-transitory machine readable medium of claim 15, wherein the executing the decoded single instruction routes the packed input data through the circuit according to the packed control data in a first mode for real numbers and in a second, different mode for complex numbers.

* * * * *

UNITED STATES PATENT AND TRADEMARK OFFICE
CERTIFICATE OF CORRECTION

PATENT NO. : 11,334,356 B2
APPLICATION NO. : 16/457994
DATED : May 17, 2022
INVENTOR(S) : Jian-Guo Chen et al.

Page 1 of 1

It is certified that error appears in the above-identified patent and that said Letters Patent is hereby corrected as shown below:

On the Title Page

The inventorship is updated as follows:
(72) Inventors: Jian-Guo Chen, Basking Ridge, NJ (US); David T. Dougherty, Allentown, PA (US); Steven Pinault, Allentown, PA (US); Parakalan Venkataraghavan, Bangalore (IN); Joseph Williams, Holmdel, NJ (US); Meng-Lin Yu, Morganville, NJ (US); Kamran Azadet, San Ramon, CA (US); Eugene Scuteri, Clinton, NJ (US)

Signed and Sealed this
Fourteenth Day of November, 2023

Katherine Kelly Vidal
*Director of the United States Patent and Trademark Office*